United States Patent
Hull et al.

(10) Patent No.: US 8,073,263 B2
(45) Date of Patent: Dec. 6, 2011

(54) MULTI-CLASSIFIER SELECTION AND MONITORING FOR MMR-BASED IMAGE RECOGNITION

(75) Inventors: Jonathan J. Hull, San Carlos, CA (US); Berna Erol, San Jose, CA (US); Jorge Moraleda, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 423 days.

(21) Appl. No.: 12/247,202

(22) Filed: Oct. 7, 2008

(65) Prior Publication Data

US 2009/0076996 A1   Mar. 19, 2009

Related U.S. Application Data

(63) Continuation-in-part of application No. 11/461,017, filed on Jul. 31, 2006, now Pat. No. 7,702,673, and a continuation-in-part of application No. 11/461,279, filed on Jul. 31, 2006, and a continuation-in-part of application No. 11/461,286, filed on Jul. 31, 2006, and a continuation-in-part of application No. 11/461,294, filed on Jul. 31, 2006, and a continuation-in-part of application No. 11/461,300, filed on Jul. 31, 2006, and a continuation-in-part of application No. 11/461,126, filed on Jul. 31, 2006, and a continuation-in-part of application No. 11/461,143, filed on Jul. 31, 2006, and a continuation-in-part of application No. 11/461,268, filed on Jul. 31, 2006, now Pat. No. 7,639,387, and a continuation-in-part of application No. 11/461,272, filed on Jul. 31, 2006, now Pat. No. 8,005,831, and a continuation-in-part of application No. 11/461,064, filed on Jul. 31, 2006, now Pat. No. 7,669,148, and a continuation-in-part of application No. 11/461,075, filed on Jul. 31, 2006, now Pat. No. 7,812,986, and a continuation-in-part of application No. 11/461,090, filed on Jul. 31, 2006, now Pat. No. 7,551,780, and a (Continued)

(51) Int. Cl.
 G06K 9/62 (2006.01)
(52) U.S. Cl. ........ 382/224; 707/705; 707/713; 707/725; 707/751
(58) Field of Classification Search ................. 707/705, 707/706, 711, 713, 725, 737, 741, 751; 382/224
See application file for complete search history.

(56) References Cited

U.S. PATENT DOCUMENTS 1,915,993 A    6/1933   Handel
(Continued)

FOREIGN PATENT DOCUMENTS

CN    1245935    3/2000
(Continued)

OTHER PUBLICATIONS

United States Office Action, U.S. Appl. No. 11/624,466, Jun. 8, 2010, 29 pages.

(Continued)

*Primary Examiner* — John Strege
(74) *Attorney, Agent, or Firm* — Patent Law Works LLP

(57) ABSTRACT

A MMR system that uses multiple classifiers for predicting, monitoring, and adjusting index tables for image recognition comprises a plurality of mobile devices, a pre-processing server or MMR gateway, and an MMR matching unit, and may include an MMR publisher. The MMR matching unit includes a plurality of recognition unit and index table pairs corresponding to classifiers to be applied to received image queries, as well as an image registration unit for storing and monitoring performance data for the classifiers. The MMR matching unit receives the image query and identifies, using a classifier set, a result including a document, the page, and the location on the page corresponding to the image query. The present invention also includes methods for monitoring online performance of a multiple classifier image recognition system, for classifier selection and comparison, and for offline classifier prediction.

12 Claims, 23 Drawing Sheets

Related U.S. Application Data continuation-in-part of application No. 11/461,037, filed on Jul. 31, 2006, and a continuation-in-part of application No. 11/461,085, filed on Jul. 31, 2006, and a continuation-in-part of application No. 11/461,091, filed on Jul. 31, 2006, now Pat. No. 7,885,955, and a continuation-in-part of application No. 11/461,095, filed on Jul. 31, 2006, now Pat. No. 7,917,554, which is a continuation of application No. 11/466,414, filed on Aug. 22, 2006, now Pat. No. 7,587,412, and a continuation-in-part of application No. 11/461,147, filed on Jul. 31, 2006, and a continuation-in-part of application No. 11/461,164, filed on Jul. 31, 2006, and a continuation-in-part of application No. 11/461,024, filed on Jul. 31, 2006, now Pat. No. 7,991,778, which is a continuation-in-part of application No. 11/461,032, filed on Jul. 31, 2006, now Pat. No. 7,672,543, and a continuation-in-part of application No. 11/461,049, filed on Jul. 31, 2006, now Pat. No. 7,920,759, and a continuation-in-part of application No. 11/461,109, filed on Jul. 31, 2006, and a continuation-in-part of application No. 11/827,530, filed on Jul. 11, 2007, and a continuation-in-part of application No. 12/060,194, filed on Mar. 31, 2008, and a continuation-in-part of application No. 12/059,583, filed on Mar. 31, 2008, and a continuation-in-part of application No. 12/060,198, filed on Mar. 31, 2008, and a continuation-in-part of application No. 12/060,200, filed on Mar. 31, 2008, and a continuation-in-part of application No. 12/060,206, filed on Mar. 31, 2008, and a continuation-in-part of application No. 12/121,275, filed on May 15, 2008, and a continuation-in-part of application No. 11/776,510, filed on Jul. 11, 2007, and a continuation-in-part of application No. 11/776,520, filed on Jul. 11, 2007, and a continuation-in-part of application No. 11/776,530, filed on Jul. 11, 2007, and a continuation-in-part of application No. 11/777,142, filed on Jul. 12, 2007, and a continuation-in-part of application No. 12/210,511, filed on Sep. 15, 2008, and a continuation-in-part of application No. 12/210,519, filed on Sep. 15, 2008, and a continuation-in-part of application No. 12/210,532, filed on Sep. 15, 2008, and a continuation-in-part of application No. 12/210,540, filed on Sep. 15, 2008, and a continuation of application No. 11/624,466, filed on Jan. 18, 2007, now Pat. No. 7,970,171.

(56) References Cited

U.S. PATENT DOCUMENTS

| | | |
|---|---|---|
| 5,027,421 A | 6/1991 | Kanno |
| 5,035,302 A * | 7/1991 | Thangavelu ............ 187/382 |
| 5,077,805 A | 12/1991 | Tan |
| 5,109,439 A | 4/1992 | Froessl |
| 5,263,100 A | 11/1993 | Kim et al. |
| 5,392,447 A | 2/1995 | Schlack et al. |
| 5,416,892 A | 5/1995 | Loken-Kim |
| 5,432,864 A | 7/1995 | Lu et al. |
| 5,465,353 A | 11/1995 | Hull et al. |
| 5,493,689 A * | 2/1996 | Waclawsky et al. ............ 710/1 |
| 5,546,502 A | 8/1996 | Hart et al. |
| 5,553,217 A | 9/1996 | Hart et al. |
| 5,579,471 A | 11/1996 | Barber et al. |
| 5,706,097 A | 1/1998 | Schelling et al. |
| 5,752,055 A | 5/1998 | Redpath et al. |
| 5,761,344 A | 6/1998 | Al-Hussein |
| 5,806,005 A | 9/1998 | Hull et al. |
| 5,832,474 A | 11/1998 | Lopresti et al. |
| 5,832,530 A | 11/1998 | Paknad et al. |
| 5,873,077 A | 2/1999 | Kanoh et al. |
| 5,892,843 A | 4/1999 | Zhou et al. |
| 5,899,999 A | 5/1999 | De Bonet |
| 5,905,502 A | 5/1999 | Deering |
| 5,918,012 A | 6/1999 | Astiz et al. |
| 5,956,468 A | 9/1999 | Ancin |
| 5,968,175 A | 10/1999 | Morishita et al. |
| 5,999,915 A | 12/1999 | Nahan et al. |
| 6,035,055 A | 3/2000 | Wang et al. |
| 6,104,834 A | 8/2000 | Hull |
| 6,121,969 A | 9/2000 | Jain et al. |
| 6,138,129 A | 10/2000 | Combs |
| 6,192,157 B1 | 2/2001 | Prebble |
| 6,208,771 B1 | 3/2001 | Jared et al. |
| 6,223,171 B1 | 4/2001 | Chaudhuri et al. |
| 6,253,201 B1 | 6/2001 | Abdel-Mottaleb et al. |
| 6,301,386 B1 | 10/2001 | Zhu et al. |
| 6,332,039 B1 | 12/2001 | Bando et al. |
| 6,345,274 B1 | 2/2002 | Zhu et al. |
| 6,353,822 B1 | 3/2002 | Lieberman |
| 6,363,381 B1 | 3/2002 | Lee et al. |
| 6,393,142 B1 | 5/2002 | Swain et al. |
| 6,397,213 B1 | 5/2002 | Cullen et al. |
| 6,405,172 B1 | 6/2002 | Baker et al. |
| 6,408,257 B1 | 6/2002 | Harrington et al. |
| 6,411,953 B1 | 6/2002 | Ganapathy et al. |
| 6,448,979 B1 | 9/2002 | Schena et al. |
| 6,457,026 B1 | 9/2002 | Graham et al. |
| 6,460,036 B1 | 10/2002 | Herz |
| 6,470,264 B2 | 10/2002 | Bide |
| 6,504,571 B1 | 1/2003 | Narayanaswami et al. |
| 6,537,324 B1 | 3/2003 | Tabata et al. |
| 6,567,799 B2 | 5/2003 | Sweet et al. |
| 6,574,375 B1 | 6/2003 | Cullen et al. |
| 6,574,644 B2 | 6/2003 | Hsu et al. |
| 6,584,223 B1 | 6/2003 | Shiiyama |
| 6,611,862 B2 | 8/2003 | Reisman |
| 6,732,915 B1 | 5/2004 | Nelson et al. |
| 6,751,343 B1 | 6/2004 | Ferrell et al. |
| 6,753,883 B2 | 6/2004 | Schena et al. |
| 6,766,363 B1 | 7/2004 | Rothschild |
| 6,799,201 B1 | 9/2004 | Lee et al. |
| 6,804,332 B1 | 10/2004 | Miner et al. |
| 6,804,659 B1 | 10/2004 | Graham et al. |
| 6,824,057 B2 | 11/2004 | Rathus et al. |
| 6,827,267 B2 | 12/2004 | Rathus et al. |
| 6,830,187 B2 | 12/2004 | Rathus et al. |
| 6,834,804 B2 | 12/2004 | Rathus et al. |
| 6,842,755 B2 | 1/2005 | Maslov |
| 6,843,411 B2 | 1/2005 | Rathus et al. |
| 6,859,909 B1 | 2/2005 | Lerner et al. |
| 6,865,302 B2 | 3/2005 | Chang |
| 6,866,196 B1 | 3/2005 | Rathus et al. |
| 6,922,699 B2 | 7/2005 | Schuetze et al. |
| 6,929,182 B2 | 8/2005 | Rathus et al. |
| 6,940,491 B2 | 9/2005 | Incertis Carro |
| 6,963,358 B2 | 11/2005 | Cohen et al. |
| 6,964,374 B1 | 11/2005 | Djuknic et al. |
| 6,980,962 B1 | 12/2005 | Arganbright et al. |
| 6,993,573 B2 | 1/2006 | Hunter |
| 7,013,309 B2 | 3/2006 | Chakraborty et al. |
| 7,031,965 B1 | 4/2006 | Moriya et al. |
| 7,051,086 B2 | 5/2006 | Rhoads et al. |
| 7,089,487 B2 | 8/2006 | Tsai |
| 7,092,953 B1 | 8/2006 | Haynes |
| 7,134,095 B1 | 11/2006 | Smith et al. |
| 7,150,399 B2 | 12/2006 | Barrus et al. |
| 7,167,574 B2 | 1/2007 | Kim |
| 7,174,031 B2 | 2/2007 | Rhoads et al. |
| 7,185,274 B1 | 2/2007 | Rubin et al. |
| 7,206,820 B1 | 4/2007 | Rhoads et al. |
| 7,232,057 B2 | 6/2007 | Rathus et al. |
| 7,236,632 B2 | 6/2007 | Erol et al. |
| 7,240,279 B1 | 7/2007 | Chartier et al. |
| 7,249,123 B2 | 7/2007 | Elder et al. |
| 7,251,689 B2 | 7/2007 | Wesley |
| 7,263,205 B2 | 8/2007 | Lev |

| | | |
|---|---|---|
| 7,305,435 B2 | 12/2007 | Hamynen |
| 7,310,779 B2 | 12/2007 | Carro |
| 7,337,175 B2 * | 2/2008 | Comps et al. .................. 707/725 |
| 7,359,094 B1 | 4/2008 | Sayuda |
| 7,363,580 B2 | 4/2008 | Tabata et al. |
| 7,366,979 B2 | 4/2008 | Spielberg et al. |
| 7,386,789 B2 | 6/2008 | Chao et al. |
| 7,392,287 B2 | 6/2008 | Ratcliff, III |
| 7,406,214 B2 | 7/2008 | Rhoads et al. |
| 7,421,153 B1 | 9/2008 | Ronca et al. |
| 7,421,155 B2 | 9/2008 | King et al. |
| 7,437,023 B2 | 10/2008 | King et al. |
| 7,450,760 B2 | 11/2008 | Molnar et al. |
| 7,458,014 B1 | 11/2008 | Rubin et al. |
| 7,489,415 B2 | 2/2009 | Furuta et al. |
| 7,509,386 B2 | 3/2009 | Miyashita |
| 7,546,524 B1 | 6/2009 | Bryar et al. |
| 7,567,262 B1 | 7/2009 | Clemens et al. |
| 7,593,605 B2 | 9/2009 | King et al. |
| 7,593,961 B2 | 9/2009 | Eguchi et al. |
| 7,613,686 B2 | 11/2009 | Rui |
| 7,644,078 B2 * | 1/2010 | Sastry et al. ..................... 706/20 |
| 7,668,405 B2 | 2/2010 | Gallagher |
| 7,680,850 B2 * | 3/2010 | Oda .............................. 707/706 |
| 7,684,622 B2 | 3/2010 | Fisher et al. |
| 7,707,039 B2 | 4/2010 | King et al. |
| 7,761,436 B2 | 7/2010 | Norton et al. |
| 7,765,231 B2 | 7/2010 | Rathus et al. |
| 7,872,669 B2 | 1/2011 | Darrell et al. |
| 7,882,113 B2 * | 2/2011 | Yaeger ........................... 707/752 |
| 7,882,177 B2 | 2/2011 | Wei et al. |
| 7,930,292 B2 | 4/2011 | Nakajima |
| 2001/0011276 A1 | 8/2001 | Durst Jr. et al. |
| 2001/0013546 A1 | 8/2001 | Ross |
| 2001/0024514 A1 | 9/2001 | Matsunaga |
| 2001/0042030 A1 | 11/2001 | Ito et al. |
| 2001/0042085 A1 | 11/2001 | Peairs et al. |
| 2001/0043741 A1 | 11/2001 | Mahoney et al. |
| 2001/0049700 A1 | 12/2001 | Ichikura |
| 2002/0038430 A1 | 3/2002 | Edwards et al. |
| 2002/0052872 A1 | 5/2002 | Yada |
| 2002/0054059 A1 | 5/2002 | Schneiderman |
| 2002/0073236 A1 | 6/2002 | Helgeson et al. |
| 2002/0102966 A1 | 8/2002 | Lev et al. |
| 2002/0118379 A1 | 8/2002 | Chakraborty et al. |
| 2002/0146176 A1 | 10/2002 | Meyers |
| 2002/0154148 A1 | 10/2002 | Inoue et al. |
| 2002/0157028 A1 | 10/2002 | Koue et al. |
| 2002/0191003 A1 | 12/2002 | Hobgood et al. |
| 2002/0191848 A1 | 12/2002 | Boose et al. |
| 2002/0194264 A1 | 12/2002 | Uchiyama et al. |
| 2003/0025714 A1 | 2/2003 | Ebersole et al. |
| 2003/0110130 A1 | 6/2003 | Pelletier |
| 2003/0110216 A1 | 6/2003 | Althin et al. |
| 2003/0112930 A1 | 6/2003 | Bosik et al. |
| 2003/0121006 A1 | 6/2003 | Tabata et al. |
| 2003/0122922 A1 | 7/2003 | Saffer et al. |
| 2003/0126147 A1 | 7/2003 | Essafi et al. |
| 2003/0128375 A1 | 7/2003 | Ruhl et al. |
| 2003/0151674 A1 | 8/2003 | Lin |
| 2003/0152293 A1 | 8/2003 | Bresler et al. |
| 2003/0187886 A1 | 10/2003 | Hull et al. |
| 2003/0193530 A1 | 10/2003 | Blackman et al. |
| 2003/0212585 A1 | 11/2003 | Kyoya et al. |
| 2003/0229857 A1 | 12/2003 | Sayuda et al. |
| 2004/0017482 A1 | 1/2004 | Weitman |
| 2004/0027604 A1 | 2/2004 | Jeran et al. |
| 2004/0042667 A1 | 3/2004 | Lee et al. |
| 2004/0102898 A1 | 5/2004 | Yokota et al. |
| 2004/0122811 A1 | 6/2004 | Page |
| 2004/0133582 A1 | 7/2004 | Howard et al. |
| 2004/0139391 A1 | 7/2004 | Stumbo et al. |
| 2004/0143644 A1 | 7/2004 | Berton et al. |
| 2004/0199531 A1 | 10/2004 | Kim et al. |
| 2004/0201706 A1 | 10/2004 | Shimizu et al. |
| 2004/0205347 A1 | 10/2004 | Erol et al. |
| 2004/0215689 A1 | 10/2004 | Dooley et al. |
| 2004/0221244 A1 | 11/2004 | Baldino |
| 2004/0238621 A1 | 12/2004 | Beenau et al. |
| 2004/0243514 A1 | 12/2004 | Wankmueller |
| 2004/0260625 A1 | 12/2004 | Usami et al. |
| 2004/0260680 A1 | 12/2004 | Best et al. |
| 2005/0012960 A1 | 1/2005 | Eden et al. |
| 2005/0080693 A1 | 4/2005 | Foss et al. |
| 2005/0086188 A1 | 4/2005 | Hillis et al. |
| 2005/0086224 A1 | 4/2005 | Franciosa et al. |
| 2005/0089246 A1 | 4/2005 | Luo |
| 2005/0100219 A1 | 5/2005 | Berkner et al. |
| 2005/0135483 A1 | 6/2005 | Nair |
| 2005/0160115 A1 | 7/2005 | Starkweather |
| 2005/0160258 A1 | 7/2005 | O'Shea et al. |
| 2005/0165747 A1 | 7/2005 | Bargeron et al. |
| 2005/0165784 A1 | 7/2005 | Gomez et al. |
| 2005/0182773 A1 | 8/2005 | Feinsmith et al. |
| 2005/0185060 A1 | 8/2005 | Neven |
| 2005/0185225 A1 | 8/2005 | Brawn et al. |
| 2005/0190273 A1 | 9/2005 | Toyama et al. |
| 2005/0190972 A1 | 9/2005 | Thomas et al. |
| 2005/0198095 A1 | 9/2005 | Du et al. |
| 2005/0216257 A1 | 9/2005 | Tanabe et al. |
| 2005/0234851 A1 | 10/2005 | King et al. |
| 2005/0273812 A1 | 12/2005 | Sakai |
| 2005/0288859 A1 | 12/2005 | Golding et al. |
| 2005/0288911 A1 | 12/2005 | Porikli |
| 2005/0289182 A1 | 12/2005 | Pandian et al. |
| 2005/0289447 A1 | 12/2005 | Hadley et al. |
| 2006/0002607 A1 | 1/2006 | Boncyk et al. |
| 2006/0012677 A1 | 1/2006 | Neven et al. |
| 2006/0020630 A1 | 1/2006 | Stager et al. |
| 2006/0023945 A1 | 2/2006 | King et al. |
| 2006/0026140 A1 | 2/2006 | King et al. |
| 2006/0041605 A1 | 2/2006 | King et al. |
| 2006/0043188 A1 | 3/2006 | Kricorissian |
| 2006/0048059 A1 | 3/2006 | Etkin |
| 2006/0053097 A1 | 3/2006 | King et al. |
| 2006/0061806 A1 | 3/2006 | King et al. |
| 2006/0070120 A1 | 3/2006 | Aoki et al. |
| 2006/0074828 A1 * | 4/2006 | Heumann et al. ................ 706/20 |
| 2006/0085477 A1 | 4/2006 | Phillips et al. |
| 2006/0104515 A1 | 5/2006 | King et al. |
| 2006/0112092 A1 | 5/2006 | Ziou et al. |
| 2006/0116555 A1 | 6/2006 | Pavlidis et al. |
| 2006/0119880 A1 | 6/2006 | Dandekar et al. |
| 2006/0122884 A1 | 6/2006 | Graham et al. |
| 2006/0122983 A1 | 6/2006 | King et al. |
| 2006/0140475 A1 | 6/2006 | Chin et al. |
| 2006/0143176 A1 | 6/2006 | Mojsilovic et al. |
| 2006/0150079 A1 | 7/2006 | Albornoz et al. |
| 2006/0190812 A1 | 8/2006 | Ellenby et al. |
| 2006/0200480 A1 | 9/2006 | Harris et al. |
| 2006/0218225 A1 | 9/2006 | Hee Voon et al. |
| 2006/0227992 A1 | 10/2006 | Rathus et al. |
| 2006/0240862 A1 | 10/2006 | Neven et al. |
| 2006/0251292 A1 | 11/2006 | Gokturk et al. |
| 2006/0251339 A1 | 11/2006 | Gokturk et al. |
| 2006/0253439 A1 | 11/2006 | Ren et al. |
| 2006/0253491 A1 | 11/2006 | Gokturk et al. |
| 2006/0262352 A1 | 11/2006 | Hull et al. |
| 2006/0262962 A1 | 11/2006 | Hull et al. |
| 2006/0262976 A1 | 11/2006 | Hart et al. |
| 2006/0285172 A1 | 12/2006 | Hull et al. |
| 2006/0285755 A1 | 12/2006 | Hager et al. |
| 2006/0285772 A1 | 12/2006 | Hull et al. |
| 2006/0286951 A1 | 12/2006 | Nagamoto et al. |
| 2006/0294049 A1 | 12/2006 | Sechrest et al. |
| 2007/0036469 A1 | 2/2007 | Kim et al. |
| 2007/0041668 A1 | 2/2007 | Todaka |
| 2007/0053513 A1 | 3/2007 | Hoffberg |
| 2007/0115373 A1 | 5/2007 | Gallagher et al. |
| 2007/0150466 A1 | 6/2007 | Brave et al. |
| 2007/0165904 A1 | 7/2007 | Nudd et al. |
| 2007/0175998 A1 | 8/2007 | Lev |
| 2007/0233613 A1 | 10/2007 | Barrus et al. |
| 2007/0271247 A1 | 11/2007 | Best et al. |
| 2007/0276845 A1 | 11/2007 | Geilich |
| 2008/0010605 A1 | 1/2008 | Frank |
| 2008/0071767 A1 | 3/2008 | Grieselhuber et al. |
| 2008/0267504 A1 | 10/2008 | Schloter et al. |

| | | | |
|---|---|---|---|
| 2008/0288476 | A1 | 11/2008 | Kim et al. |
| 2008/0296362 | A1 | 12/2008 | Lubow |
| 2008/0310717 | A1 | 12/2008 | Saathoff et al. |
| 2009/0152357 | A1 | 6/2009 | Lei et al. |
| 2009/0235187 | A1 | 9/2009 | Kim et al. |
| 2009/0254643 | A1 | 10/2009 | Terheggen et al. |
| 2009/0265761 | A1 | 10/2009 | Evanitsky |
| 2010/0013615 | A1 | 1/2010 | Hebert et al. |
| 2011/0121069 | A1 | 5/2011 | Lindahl et al. |

FOREIGN PATENT DOCUMENTS

| | | |
|---|---|---|
| EP | 0706283 A | 4/1996 |
| EP | 1229496 A2 | 8/2002 |
| EP | 1555626 A2 | 7/2005 |
| EP | 1662064 A1 | 5/2006 |
| EP | 1783681 | 5/2007 |
| JP | 10-228468 A | 8/1998 |
| JP | 2000-165645 A | 6/2000 |
| JP | 2001230916 | 8/2001 |
| WO | WO 99/05658 A1 | 2/1999 |
| WO | WO 2004/072897 A2 | 8/2004 |
| WO | WO 2005/043270 A2 | 5/2005 |
| WO | WO 2007/073347 A1 | 6/2007 |
| WO | 2008129373 | 10/2008 |

OTHER PUBLICATIONS

United States Office Action, U.S. Appl. No. 11/827,530, Jun. 9, 2010, 35 pages.
United States Office Action, U.S. Appl. No. 11/461,294, Jun. 11, 2010, 19 pages.
United States Office Action, U.S. Appl. No. 11/461,300, Jun. 11, 2010, 20 pages.
United States Office Action, U.S. Appl. No. 11/461,024, Jul. 14, 2010, 29 pages.
United States Office Action, U.S. Appl. No. 11/461,049, Jul. 28, 2010, 27 pages.
United States Office Action, U.S. Appl. No. 11/461,279, Aug. 5, 2010, 37 pages.
United States Office Action, U.S. Appl. No. 11/461,286, Aug. 5, 2010, 28 pages.
United States Office Action, U.S. Appl. No. 12/240,596, Aug. 6, 2010, 32 pages.
Japanese Office Action, Japanese Application No. 2004-293962, Aug. 24, 2010, 3 pages.
Extended European Search Report, Application No. 09178280.5-2201/2202646, Aug. 31, 2010, 6 pages.
United States Office Action, U.S. Appl. No. 11/461,143, Aug. 18, 2010, 9 pages.
United States Office Action, U.S. Appl. No. 11/461,272, Aug. 23, 2010, 31 pages.
United States Office Action, U.S. Appl. No. 11/461,126, Sep. 3, 2010, 28 pages.
United States Notice of Allowance, U.S. Appl. No. 11/461,095, Sep. 27, 2010, 29 pages.
United States Office Action, U.S. Appl. No. 12/060,194, Oct. 1, 2010, 29 pages.
United States Office Action, U.S. Appl. No. 11/461,294, Oct. 7, 2010, 17 pages.
United States Office Action, U.S. Appl. No. 11/461,300, Oct. 6, 2010, 20 pages.
United States Office Action, U.S. Appl. No. 11/827,530, Oct. 7, 2010, 21 pages.
United States Office Action, U.S. Appl. No. 11/624,466, Oct. 14, 2010, 11 pages.
United States Notice of Allowance, U.S. Appl. No. 11/461,091, Oct. 18, 2010, 31 pages.
United States Notice of Allowance, U.S. Appl. No. 11/461,024, Nov. 15, 2010, 10 pages.
United States Notice of Allowance, U.S. Appl. No. 11/461,049, Nov. 16, 2010, 10 pages.
United States Notice of Allowability, U.S. Appl. No. 11/461,091, Nov. 17, 2010, 22 pages.
United States Office Action, U.S. Appl. No. 11/777,142, Nov. 10, 2010, 17 pages.

European Search Report, European Application No. 09156089.6, Jun. 19, 2009, 8 pages.
Marques, O. et al., "Content-Based Image and Video Retrieval, Video Content Representation, Indexing, and Retrieval, a Survey of Content-Based Image Retrieval Systems, CBVQ (Content-Based Visual Query)," Content-Based Image and Video Retrieval [Multimedia Systems and Applications Series], Apr. 1, 2002, pp. 15-117, vol. 21, Kluwer Academic Publishers Group, Boston, USA.
U.S. Appl. No. 10/813,901, filed Mar. 30, 2004, Erol et al.
Aggarwal, M et al., "On Cosine-fourth and Vignetting Effects in Real Lenses," ICCV Proceedings, IEEE, 2001, vol. 1, pp. 472-479, [online] Retrieved from the Internet<URL: http://www.metaverselab.org/classis/635/reading/aggarwal-iccv.pdf>.
Akenine-Moller, T. et al., "Real-Time Rendering," A.K. Peters, Natick, MA, $2^{nd}$ Edition, 2002, pp. 70-84.
Archive of "Barcodepedia.com—the online barcode database," [online] [Archived by http://archive.org on Jul. 9, 2006; Retrieved on Aug. 18, 2008] Retrieved from the Internet<http://web.archive.org/web/20060709101455/http://en. barcodepedia.com/>.
Baba, M. et al., "Shadow Removal from a Real Image Based on Shadow Density," Poster at SIGGRAPH2004, Updated Aug. 16, 2004, 4 pages, [online] Retrieved from the Internet<URL:http://www.cv.its.hiroshima-cu.ac.jp/baba/Shadow/poster04-02.pdf>.
Baird, H.S., "Document Image Defect Models and Their Uses," Proc., IAPR $2^{nd}$ International Conference on Document Analysis and Recognition, Tsukuba Science City, Japan, Oct. 20-22, 1993, 7 pages.
Baird, H., "Document Image Defect Models," in Proc. Of IAPR Workshop on Syntactic and Structural Pattern Recognition, Murray Hill, NJ, Jun. 1990, Structured Document Image Analysis, Springer-Verlag, pp. 546-556.
Baird, H., "The State of the Art of Document Image Degradation Modeling," In Proc. Of the $4^{th}$ IAPR International Workshop on Document Analysis Systems, Rio de Janeiro, Brazil, 2000, pp. 1-16, [online] Retrieved from the Internet<URL:http://www2.parc.xerox.com/istl/members/baird/das00.pas.gz>.
Barney Smith, E.H. et al., "Text Degradations and OCR Training," International Conference on Document Analysis and Recognition 2005, Seoul, Korea, Aug. 2005, 5 pages, [online] Retrieved from the Internet<URL:http://coen.boisestate.edu/EBarneySmith/Papers/ICDAR05_submit.pdf>.
Bouget, J., "Camera Calibration Toolbox for Matlab," Online Source, Updated Jul. 24, 2006, 6 pages, [online] Retrieved from the Internet<URL:http:www.vision.caltech.edu/bougetj/calib_doc/index.html#ref>.
Boukraa, M. et al., "Tag-Based Vision: Assisting 3D Scene Analysis with Radio-Frequency Tags," Jul. 8, 2002, Proceedings of the Fifth International Conference on Information Fusion, Piscataway, N.J., IEEE, Jul. 8-11, 2002, pp. 412-418.
Boyd, S., "EE263: Introduction to Linear Dynamical Systems," Online Lecture Notes, Stanford University, Spring Quarter, 2006-2007, Accessed on Sep. 11, 2006, 4 pages, [online] Retrieved from the Internet<URL:http://www.standford/edu/class/ee263/#lectures>.
Brassil, J. et al., "Hiding Information in Document Images," Proc. Conf. Information Sciences and Systems (CISS-95), Mar. 1995, Johns Hopkins University, Baltimore, MD, pp. 482-489.
"Call for Papers: ICAT 2007," $17^{th}$ International Conference on Artificial Reality and Telexistence, 2007, [Online] [Retrieved on Nov. 4, 2008] Retrieved from the Internet<URL:http://www.idemployee.id.tue.nl/g.w.m.rauterberg/conferences/ICAT2007-CfP.pdf>.
Constantini, R. et al., "Virtual Sensor Design," Proceedings of the SPIE, vol. 5301, 2004, pp. 408-419, Retrieved from the Internet<URL:http://ivrgwww.epfl.ch/publications/cs04.pdf>.
Cover, T.M. et al., "Nearest Neighbor Pattern Classification," IEEE Transactions on Information Theory, Jan. 1967, pp. 21-27, vol. IT-13, No. 1.
Davis, M. et al., "Towards Context-Aware Face Recognition," Proceedings of the 13th Annual ACM International Conference on Multimedia, Nov. 6-11, 2005, pp. 483-486, vol. 13.
Doermann, D. et al., "Progress in Camera-Based Document Image Analysis," Proceedings of the Seventh International Conference on Document Analysis and Recognition, ICDAR 2003, 11 pages,

[online] Retrieved from the Internet<URL:http://www.cse.salford.ac.uk/prima/ICDAR2003/Papers/0111_keynote_III_doermann_d.pdf>.

Erol, B. et al., "Linking Multimedia Presentations with Their Symbolic Source Documents: Algorithm and Applications," Nov. 2-8, 2003, pp. 498-507, [Online] [Retrieved on Oct. 15, 2008] Retrieved from the Internet<URL:http://rii.ricoh.com/{hull/pubs/p225_erol.pdf>.

Esposito, F. et al., "Machine Learning Methods for Automatically Processing Historical Documents: from Paper Acquisition to XML Transformation," Proceedings of the First International Workshop on Document Image Analysis for Libraries (DIAL '04), IEEE, 2004, pp. 1-8.

European Partial Search Report, European Application No. EP07015093.3, Dec. 17, 2007, 7 pages.

European Search Report, European Application No. 08160125.4, Oct. 13, 2008, 5 pages.

European Search Report, European Application No. 06796845.3, Oct. 30, 2008, 12 pages.

European Search Report, European Application No. 06796844.6, Oct. 30, 2008, 12 pages.

European Search Report, European Application No. 06796848.7, Oct. 31, 2008, 12 pages.

European Search Report, European Application No. 06796846.1, Nov. 5, 2008, 11 pages.

European Search Report, European Application No. 08159971.4, Nov. 14, 2008, 6 pages.

European Search Report, European Application No. 08160115.5, Nov. 12, 2008, 6 pages.

European Search Report, European Application No. 08160130.4, Nov. 12, 2008, 7 pages.

European Search Report, European Application No. 08160112.2, Nov. 10, 2008, 7 pages.

European Search Report, European Application No. 07252397, Oct. 15, 2007, 7 pages.

Ho, T.K. et al., "Decision Combination in Multiple Classifier Systems," IEEE Transactions on Pattern Analysis and Machine Intelligence, Jan. 1994, pp. 66-75, vol. 16, No. 1.

Ho, T.K. et al., "Evaluation of OCT Accuracy Using Synthetic Data," Proceedings of the 4$^{th}$ Annual Symposium on Document Analysis and Information Retrieval, Apr. 24-26, 1995, pp. 413-422. [online] Retrieved from the Internet<URL:http://citeseer.ist.psu.edu/cache/papers/cs/2303/http:zSzzSzcm.bell-labs.comzSzcmzSzcszSzwhozSzhsbzSzeoasd.pdf/ho95evaluation.pdf>.

Hull, J.J., "Document Image Matching and Retrieval with Multiple Distortion-Invariant Descriptors," International Association for Pattern Recognition Workshop on Document Analysis Systems, Jan. 1, 1995, pp. 375-396.

Hull, J.J. et al., "Document Image Matching Techniques," Apr. 30, 1997, pp. 31-35, [Online] [Retrieved on May 2, 1997] Retrieved from the Internet<URL:http://rii.ricoch.com/hull/pubs/hull_sdiut97.pdf>.

Hull, J. J., "Document Image Similarity and Equivalence Detection," International Journal on Document Analysis and Recognition, 1998, pp. 37-42, Springer-Verlag.

Hull, J., "Document Image Skew Detection: Survey and Annotated Bibliography," Document Analysis Systems II, World Scientific, 1998, pp. 40-64.

Hull, J.J. et al., "Paper-Based Augmented Reality," 17$^{th}$ International Conference on Artificial Reality and Telexistence, Nov. 1, 2007, pp. 205-209.

Kanungo, T. et al., "A Downhill Simplex Algorithm for Estimating Morphological Degradation Model Parameters," University of Maryland Technical Report, LAMP-RT-066, Feb. 2001, 15 pages, [online] Retrieved from the Internet<URL: http://lampsrv01.umiacs.umd.edu/pubs/TechReports/LAMP_066/LAMP_066.pdf>.

Kanungo, T. et al., "Global and Local Document Degradation Models," Document Analysis and Recognition, 1993, Proceedings of the Second International Conference on Volume, Oct. 20-22, 1993, pp. 730-734.

Khoubyari, S. et al., "Font and Funct on Word Ident ficat on n Document Recogn t on," Computer Vision and Image Understanding, Jan. 1996, pp. 66-74, vol. 63, No. 1.

Khoubyari, S. et al., "Keyword Location and Noisy Document Images," Second Annual Symposium on Document Analysis and Information Retrieval, Las Vegas, NV, Apr. 26-28, 1993, pp. 217-231.

Kopec, G.E. et al., "Document Image Decoding Using Markov Source Models," IEEE Transactions on Pattern Analysis and Machine Intelligence, Jun. 1994, pp. 602-617, vol. 16, No. 6.

Li, Y. et al., "Validation of Image Defect Models for Optical Character Recognition," IEEE Trans. Pattern Anal. Mach. Intell. 18, 2, Feb. 1996, pp. 99-108, [online] Retrieved from the Internet<URL: http://www.cs.cmu.edu/afs/cs/usdandrewt/papers/Validate/journal.ps.gz>.

Liang, J. et al., "Flattening Curved Documents in Images," In Proc. Of the IEEE Conf. on Computer Vision and Pattern Recognition (CVPR), 2005, 8 pages, [online] Retrieved from the Internet<URL: http://www.cfar.umd.edu/~daniel/daniel_papersfordownload/liang-j_cpyr2005.pdf>.

Lu, Y. et al., "Document Retrieval from Compressed Images," Pattern Recognition, 2003, pp. 987-996, vol. 36.

McDonald, G., "Third Voice: Invisible Web Graffiti," PC World, May 18, 1999, [online] [Retrieved on Nov. 14, 2006] Retrieved from the Internet<URL: http://www.pcworld.com/news/article/0,aid,11016,00.asp>.

Microsoft Computer Dictionary (5$^{th}$ ed.), 2002, "Hyperlink" Definition, pp. 260-261.

"Mobile Search Engines," Sonera MediaLab, Nov. 15, 2002, pp. 1-12.

"Mobile Video Managed Service," Vidiator, 2008, [online] [Retrieved on Aug. 29, 2008] Retrieved from the Internet<URL: http://www.vidiator.com/services/managed_mobile_video.aspx>.

Mukherjea, S. et al., "AMORE: A World Wide Web Image Retrieval Engine," C&C Research Laboratories, NEC USA Inc., Baltzer Science Publishers BV, World Wide Web 2, 1999, pp. 115-132.

Pavlidis, T., "Effects of Distortions on the Recognition Rate of a Structural OCR System," In Pro. Conf. on Comp. Vision and Pattern Recog., IEEE, Washington, DC, 1983, pp. 303-309.

PCT International Search Report and Written Opinion, PCT/JP2006/316810, Oct. 10, 2006, 9 pages.

PCT International Search Report and Written Opinion, PCT/JP2006/316811, Oct. 10, 2006, 9 pages.

PCT International Search Report and Written Opinion, PCT/JP2006/316812, Oct. 10, 2006, 9 pages.

PCT International Search Report and Written Opinion, PCT/JP2006/316814, Oct. 10, 2006, 11 pages.

Sato, T. et al., "High Resolution Video Mosaicing for Documents and Photos by Estimating Camera Motion," Proceedings of the SPIE 5299, 246, 2004, 8 pages, [online] Retrieved from the Internet<URL: http://yokoya.naist.jp/paper/datas/711/spie2004.pdf>.

Schalkoff, R.J., "Syntactic Pattern Recognition (SYNTPR) Overview," Pattern Recognition: Statistical, Structural and Neural Approaces, Jan. 1, 1992, pp. 127-150, vol. 3, Wiley.

Sivic, J. et al., "Video Google: A Text Retrieval Approach to Object Matching in Videos," Proceedings of the Ninth IEEE International Conference on Computer Vision (ICCV 2003), 2-Volume Set, 2003, IEEE, pp. 1-8.=.

Stoyanov, D., "Camera Calibration Tools," Online Source, Updated Aug. 24, 2006, Accessed Aug. 31, 2006, 12 pages, [online] Retrieved from the Internet<URL:http://ubimon.doc.ic.ac.uk/dvs/index.php?m=581>.

Veltkamp, R. et al., "Content-Based Image Retrieval Systems: A Survey," Department of Computing Science, Utrecht University, Oct. 28, 2002, pp. 1-62.

Wikipedia Online Definition, "Optical Character Recognition," Sep. 14, 2008, pp. 1-7, [online] [Retrieved on Sep. 14, 2008] Retrieved from the Internet<URL:http://en.wikipedia.org/wiki/Optical_character_recognition>.

Wikipedia Online Encyclopedia,"Automatic Identification and Data Capture," Jul. 21, 2008, pp. 1-2, [Online] [Retrieved on Sep. 27, 2008] Retrieved from the Internet<URL:http://en.wikipedia.org/wiki/Automatic_identification_and_data_capture>.

Zhang, Z., "A Flexible New Technique for Camera Calibration," IEEE Transactions on Pattern Analysis and Machine Intelligence, Nov. 2000, pp. 1330-1334, vol. 22, No. 11.

Zheng, Q.-F. et al., "Effective and Efficient Object-Based Image Retrieval Using Visual Phases," Proceedings of the 14th Annual ACM International Conference on Multimedia, MM'06, Oct. 23-27, 2006, Santa Barbara, CA, pp. 77-80.

Zi, G., "Groundtruth Generation and Document Image Degradation," University of Maryland Language and Media Processing Laboratory Technical report (LAMP-TR-121), May 2005, 72 pages, [online] Retrieved from the Internet<URL:http://lampsrv01.umiacs.umd.edu/pubs/TechReports/LAMP_121/LAMP_121.pdf>=.

U.S. Office Action, U.S. Appl. No. 11/776,520, Dec. 7, 2010, 43 pages.

U.S. Office Action, U.S. Appl. No. 12/719,437, Dec. 9, 2010, 38 pages.

U.S. Office Action, U.S. Appl. No. 11/776,510, Dec. 10, 2010, 39 pages.

U.S. Office Action, U.S. Appl. No. 11/461,126, Dec. 23, 2010, 30 pages.

U.S. Office Action, U.S. Appl. No. 11/461,279, Jan. 7, 2011, 44 pages.

U.S. Office Action, U.S. Appl. No. 12/240,596, Jan. 21, 2011, 21 pages.

U.S. Office Action, U.S. Appl. No. 11/461,286, Jan. 21, 2011, 34 pages.

U.S. Office Action, U.S. Appl. No. 11/461,143, Feb. 4, 2011, 16 pages.

European Search Report, European Application No. 09170045.0, Nov. 24, 2009, 4 pages.

Roth, M.T. et al., "The Garlic Project," Proc. of the 1996 ACM SIGMOD International Conference on Management of Data, Montreal, Quebec, Canada, Jun. 4, 1996, pp. 557.

Archive of Scanbuy Solutions | Optical Intelligence for your Mobile Devices, Scanbuy® Inc., www.scanbuy.com/website/solutions_summary.htm, [Online] [Archived by http://archive.org on Jun. 19, 2006; Retrieved on Mar. 3, 2009] Retrieved from the Internet<URL: http://web.archive.org/web/20060619172549/http://www.scanbuy.com/website/solutions_su...>.

Canny, J., "A Computational Approach to Edge Detection," IEEE Transactions on Pattern Analysis and Machine Intelligence, Nov. 1986, pp. 679-714, vol. PAMI-8, No. 6.

Di Stefano, L. et al., "A Simple and Efficient Connected Components Labeling Algorithm," International Conference on Image Analysis and Processing, 1999, pp. 322-327.

Duda, R. O. et al., "Use of the Hough Transformation to Detect Lines and Curves In Pictures," Communications of the ACM, Jan. 1972, pp. 11-15, vol. 15, No. 1.

Erol, B. et al., "Prescient Paper: Multimedia Document Creation with Document Image Matching," 17th International Conference on Pattern Recognition, Aug. 23-26, 2004, Cambridge, UK.

Erol, B. et al., "Retrieval of Presentation Recordings with Digital Camera Images," IEEE Conference on Computer Vision and Pattern Recognition, Jun. 27-Jul. 2, 2004.

Ezaki, N. et al., "Text Detection from Natural Scene Images: Towards A System for Visually Impaired Persons," Proc. of 17th Int. Conf. on Pattern Recognition (ICRP 2004), IEEE Computer Society, Aug. 23-26, 2004, Cambridge, UK, pp. 683-686, vol. II.

Fadoua, D. et al., "Restoring Ink Bleed-Through Degraded Document Images Using a Recursive Unsupervised Classification Technique," Lecture Notes in Computer Science 3872, Document Analysis Systems VII, 7th International Workshop, DAS 2006, Feb. 13-15, 2006, Nelson, New Zealand, Bunke, H. et al. (eds.), pp. 38-49.

Freund, Y. et al., "A Short Introduction to Boosting," Journal of Japanese Society for Artificial Intelligence, Sep. 1999, pp. 771-780, vol. 14, No. 5.

Hjelmas, E. et al., "Face Detection: A Survey," Computer Vision and Image Understanding, 2001, pp. 236-274, vol. 83.

Hull, J.J., "Document Image Matching on CCITT Group 4 Compressed Images," SPIE Conference on Document Recognition IV, Feb. 8, 1997, pp. 82-87.

Jagannathan, L. et al., Perspective Correction Methods for Camera Based Document Analysis, Proc. First Int. Workshop on Camera-based Document Analysis and Recognition, 2005, pp. 148-154.

Jain, A.K. et al., "An Introduction to Biometric Recognition," IEEE Transactions on Circuits and Systems for Video Technology, Jan. 2004, pp. 4-20, vol. 14, No. 1.

Po, L.-M. et al., "A Novel Four-Step Search Algorithm for Fast Block Motion Estimation," IEEE Transactions on Circuits and Systems for Video Technology, Jun. 1996, pp. 313-317, vol. 6, Issue 3.

Rangarajan, K. et al. "Optimal Corner Detector," 1988, IEEE, pp. 90-94.

Rosin, P.L. et al., "Image Difference Threshold Strategies and Shadow Detection," Proceedings of the 6th British Machine Vision Conference, 1995, 10 pages.

Sezgin, M. et al., "Survey Over Image Thresholding Techniques and Quantitative Performance Evaluation," Journal of Electronic Imaging, Jan. 2004, pp. 146-165, vol. 13, No. 1.

Triantafyllidis, G.A. et al., "Detection of Blocking Artifacts of Compressed Still Images," Proceedings of the 11th International Conference on Image Analysis and Processing (ICIAP '01), IEEE, 2001, pp. 1-5.

U.S. Appl. No. 10/696,735, filed Oct. 28, 2003, Erol, B. et al., "Techniques for Using a Captured Image for the Retrieval of Recorded Information," 58 pages.

Zanibbi, R. et al. "A Survey of Table Recognition," International Journal on Document Analysis and Recognition, 2004, pp. 1-33.

Zhao, W. et al., Face Recognition: A Literature Survey, ACM Computing Surveys (CSUR), 2003, pp. 399-458, vol. 35, No. 4.

Liu, Y. et al., "Automatic Texture Segmentation for Texture-Based Image Retrieval," IEEE, Jan. 5-7, 2004, pp. 285-288.

Liu, T. et al., "A Fast Image Segmentation Algorithm for Interactive Video Hotspot Retrieval," IEEE, 2001, pp. 3-8.

Wikipedia Online Encyclopedia, "Image Scanner," Last Modified Feb. 9, 2010, pp. 1-9, [Online] [Retrieved on Feb. 13, 2010] Retrieved from the Internet<URL:http://en.wikipedia.org/wiki/Image_scanner>.

Wikipedia Online Encyclopedia, "Waypoint," Last Modified Feb. 13, 2010, pp. 1-4, [Online] Retrieved on Feb. 13, 2010 Retrieved from the Internet<URL:http://en.wikipedia.org/wiki/Waypoint>.

Erol, B. et al., "Linking Presentation Documents Using Image Analysis," IEEE, Nov. 9-12, 2003, pp. 97-101, vol. 1.

Hull, J.J. et al., "Visualizing Multimedia Content on Paper Documents: Components of Key Frame Selection for Video Paper," Proceedings of the Seventh International Conference on Document Analysis and Recognition (ICDAR'03), IEEE, 2003, 4 pages.

Japanese Office Action, Japanese Patent Application No. 200910138044.X, Jan. 26, 2011, 6 pages.

U.S. Notice of Allowance, U.S. Appl. No. 11/624,466, Feb. 22, 2011, 12 pages.

U.S. Notice of Allowance, U.S. Appl. No. 11/461,272, Feb. 23, 2011, 28 pages.

U.S. Office Action, U.S. Appl. No. 12/060,194, Feb. 25, 2011, 18 pages.

U.S. Office Action, U.S. Appl. No. 12/879,933, Mar. 2, 2011, 7 pages.

U.S. Office Action, U.S. Appl. No. 12/210,519, Mar. 14, 2011, 38 pages.

U.S. Notice of Allowance, U.S. Appl. No. 11/461,024, Mar. 16, 2011, 12 pages.

U.S. Office Action, U.S. Appl. No. 11/461,300, Mar. 18, 2011, 25 pages.

U.S. Office Action, U.S. Appl. No. 11/777,142, Mar. 18, 2011, 21 pages.

U.S. Office Action, U.S. Appl. No. 11/461,037, Mar. 30, 2011, 29 pages.

U.S. Office Action, U.S. Appl. No. 12/210,511, Apr. 4, 2011, 49 pages.

U.S. Office Action, U.S. Appl. No. 11/461,126, Apr. 12, 2011, 27 pages.

U.S. Office Action, U.S. Appl. No. 11/461,294, Apr. 12, 2011, 23 pages.

U.S. Office Action, U.S. Appl. No. 12/210,540, Apr. 15, 2011, 45 pages.

U.S. Office Action, U.S. Appl. No. 12/340,124, Apr. 15, 2011, 48 pages.

Antonacopoulos et al., "Flexible Page Segmentation Using the Background", Proceedings of the IAPR International Conference on Pattern Recognition, Jerusalem, Oct. 9-13, 1994. Conference B: Pattern Recognition and Neural Networks; [Proceedings of the IAPR International Conference on Pattern Recognition], Los Alamitos, IEE, vol. 2, Oct. 9, 1994, pp. 339-344, XP000509905, ISBN: 978-0-8186-6272-0.

Reniers et al., "Skeleton-based Hierarchical Shape Segmentation", IEEE International Conference on Shape Modeling and Applications. SMI'07, Jun. 1, 2007, Computer Society, pp. 179-188, XP031116745, ISBN: 978-0-7695-2815-1.

Rademacher, "View-Dependent Geometry", Computer Graphics Proceedings, Annual Conference Series, Siggraph 99, Los Angeles, California Aug. 8-13, 1999, pp. 439-446, XP001024743.

U.S. Patent Office Action, U.S. Appl. No. 12/121,275, Apr. 20, 2011, 44 pages.

U.S. Patent Office Action, U.S. Appl. No. 11/776,520, Apr. 28, 2011, 10 pages.

Extended European Search Report, European Patent Application No. 082523770, May 2, 2011, 6 pages.

U.S. Patent Office Action, U.S. Appl. No. 11/776,510, May 12, 2011, 20 pages.

U.S. Patent Office Action, U.S. Appl. No. 12/210,519, Jun. 16, 2011, 22 pages.

U.S. Patent Office Action, U.S. Appl. No. 12/060,194, Jun. 27, 2011, 18 pages.

United States Office Action, U.S. Appl. No. 11/461,279, Jul. 8, 2011, 46 pages.

United States Office Action, U.S. Appl. No. 11/461,286, Jul. 15, 2011, 37 pages.

United States Office Action, U.S. Appl. No. 11/461,126, Jul. 22, 2011, 35 pages.

United States Office Action, U.S. Appl. No. 11/461,143, Aug. 11, 2011, 20 pages.

United States Office Action, U.S. Appl. No. 11/776,530, Aug. 19, 2011, 54 pages.

United States Office Action, U.S. Appl. No. 12/253,715, Aug. 31, 2011, 58 pages.

United States Office Action, U.S. Appl. No. 12/060,198, Sep. 1, 2011, 87 pages.

United States Office Action, U.S. Appl. No. 12/060,200, Sep. 2, 2011, 65 pages.

United States Notice of Allowance, U.S. Appl. No. 11/776,510, Sep. 22, 2011, 11 pages.

United States Office Action, U.S. Appl. No. 11/777,142, Sep. 23, 2011, 22 pages.

United States Office Action, U.S. Appl. No. 12/210,511, Sep. 28, 2011, 25 pages.

United States Office Action, U.S. Appl. No. 12/247,205, Oct. 6, 2011, 56 pages.

United States Office Action, U.S. Appl. No. 12/342,330, Oct. 7, 2011, 47 pages.

* cited by examiner

MULTI-CLASSIFIER SELECTION AND MONITORING FOR MMR-BASED IMAGE RECOGNITION

CROSS REFERENCE TO RELATED APPLICATIONS

This application is a continuation-in-part of U.S. patent application Ser. No. 11/461,017, titled "System And Methods For Creation And Use Of A Mixed Media Environment," filed Jul. 31, 2006; U.S. patent application Ser. No. 11/461,279, titled "Method And System For Image Matching In A Mixed Media Environment," filed Jul. 31, 2006; U.S. patent application Ser. No. 11/461,286, titled "Method And System For Document Fingerprinting Matching In A Mixed Media Environment," filed Jul. 31, 2006; U.S. patent application Ser. No. 11/461,294, titled "Method And System For Position-Based Image Matching In A Mixed Media Environment," filed Jul. 31, 2006; U.S. patent application Ser. No. 11/461,300, titled "Method And System For Multi-Tier Image Matching In A Mixed Media Environment," filed Jul. 31, 2006; U.S. patent application Ser. No. 11/461,126, titled "Integration And Use Of Mixed Media Documents," filed Jul. 31, 2006; U.S. patent application Ser. No. 11/461,143, titled "User Interface For Mixed Media Reality," filed Jul. 31, 2006; U.S. patent application Ser. No. 11/461,268, titled "Authoring Tools Using A Mixed Media Environment," filed Jul. 31, 2006; U.S. patent application Ser. No. 11/461,272, titled "System And Methods For Creation And Use Of A Mixed Media Environment With Geographic Location Information," filed Jul. 31, 2006; U.S. patent application Ser. No. 11/461,064, titled "System And Methods For Portable Device For Mixed Media System," filed Jul. 31, 2006; U.S. patent application Ser. No. 11/461,075, titled "System And Methods For Use Of Voice Mail And Email In A Mixed Media Environment," filed Jul. 31, 2006; U.S. patent application Ser. No. 11/461,090, titled "System And Method For Using Individualized Mixed Document," filed Jul. 31, 2006; U.S. patent application Ser. No. 11/461,037, titled "Embedding Hot Spots In Electronic Documents," filed Jul. 31, 2006; U.S. patent application Ser. No. 11/461,085, titled "Embedding Hot Spots In Imaged Documents," filed Jul. 31, 2006; U.S. patent application Ser. No. 11/461,091, titled "Shared Document Annotation," filed Jul. 31, 2006; U.S. patent application Ser. No. 11/461,095, titled "Visibly-Perceptible Hot Spots In Documents," filed Jul. 31, 2006; U.S. patent application Ser. No. 11/466,414, titled "Mixed Media Reality Brokerage Network and Methods of Use," filed Aug. 22, 2006; U.S. patent application Ser. No. 11/461,147, titled "Data Organization and Access for Mixed Media Document System," filed Jul. 31, 2006; U.S. patent application Ser. No. 11/461,164, titled "Database for Mixed Media Document System," filed Jul. 31, 2006; U.S. patent application Ser. No. 11/461,024, titled "Triggering Actions With Captured Input In A Mixed Media Environment," filed Jul. 31, 2006; U.S. patent application Ser. No. 11/461,032, titled "Triggering Applications Based On A Captured Text In A Mixed Media Environment," filed Jul. 31, 2006; U.S. patent application Ser. No. 11/461,049, titled "Triggering Applications For Distributed Action Execution And Use Of Mixed Media Recognition As A Control Input," filed Jul. 31, 2006; U.S. patent application Ser. No. 11/461,109, titled "Searching Media Content For Objects Specified Using Identifiers," filed Jul. 31, 2006; U.S. patent application Ser. No. 11/827,530, titled "User Interface For Three-Dimensional Navigation," filed Jul. 11, 2007; U.S. patent application Ser. No. 12/060,194, titled "Document-Based Networking With Mixed Media Reality," filed Mar. 31, 2008; U.S. patent application Ser. No. 12/059,583, titled "Invisible Junction Feature Recognition For Document Security Or Annotation," filed Mar. 31, 2008; U.S. patent application Ser. No. 12/060,198, titled "Document Annotation Sharing," filed Mar. 31, 2008; U.S. patent application Ser. No. 12/060,200, titled "Ad Hoc Paper-Based Networking With Mixed Media Reality," filed Mar. 31, 2008; U.S. patent application Ser. No. 12/060,206, titled "Indexed Document Modification Sharing With Mixed Media Reality," filed Mar. 31, 2008; U.S. patent application Ser. No. 12/121,275, titled "Web-Based Content Detection In Images, Extraction And Recognition," filed May 15, 2008; U.S. patent application Ser. No. 11/776,510, titled "Invisible Junction Features For Patch Recognition," filed Jul. 11, 2007; U.S. patent application Ser. No. 11/776,520, titled "Information Retrieval Using Invisible Junctions and Geometric Constraints," filed Jul. 11, 2007; U.S. patent application Ser. No. 11/776,530, titled "Recognition And Tracking Using Invisible Junctions," filed Jul. 11, 2007; and U.S. patent application Ser. No. 11/777,142, titled "Retrieving Documents By Converting Them to Synthetic Text," filed Jul. 12, 2007; U.S. patent application Ser. No. 11/624,466, titled "Synthetic Image and Video Generation from Ground Truth Data," filed Jan. 18, 2007; U.S. patent application Ser. No. 12/210,511, titled "Architecture For Mixed Media Reality Retrieval Of Locations And Registration Of Images," filed Sep. 15, 2008; U.S. patent application Ser. No. 12/210,519, titled "Automatic Adaption Of An Image Recognition System To Image Capture Devices," filed Sep. 15, 2008; U.S. patent application Ser. No. 12/210,532, titled "Computation Of A Recognizability Score (Quality Predictor) For Image Retrieval," filed Sep. 15, 2008; U.S. patent application Ser. No. 12/210,540, titled "Combining Results Of Image Retrieval Processes" filed Sep. 15, 2008; and is related to U.S. patent application Ser. No. 12/240,596, titled "Multiple Index Mixed Media Reality Recognition Using Unequal Priority Indexes," filed Sep. 29, 2008; all of which are incorporated by reference herein in their entirety.

BACKGROUND OF THE INVENTION

1. Field of the Invention

The invention relates to techniques for indexing and searching for mixed media documents formed from at least two media types, and more particularly, to recognizing images and other data using multiple-index Mixed Media Reality (MMR) recognition that uses printed media in combination with electronic media to retrieve mixed media documents.

2. Background of the Invention

Document printing and copying technology has been used for many years in many contexts. By way of example, printers and copiers are used in commercial office environments, in home environments with personal computers, and in document printing and publishing service environments. However, printing and copying technology has not been thought of previously as a means to bridge the gap between static printed media (i.e., paper documents), and the "virtual world" of interactivity that includes the likes of digital communication, networking, information provision, advertising, entertainment and electronic commerce.

Printed media has been the primary source of communicating information, such as news papers and advertising information, for centuries. The advent and ever-increasing popularity of personal computers and personal electronic devices, such as personal digital assistant (PDA) devices and cellular telephones (e.g., cellular camera phones), over the past few years has expanded the concept of printed media by making it available in an electronically readable and searchable form and by introducing interactive multimedia capabilities, which are unparalleled by traditional printed media.

Unfortunately, a gap exists between the electronic multimedia-based world that is accessible electronically and the physical world of print media. For example, although almost everyone in the developed world has access to printed media and to electronic information on a daily basis, users of printed media and of personal electronic devices do not possess the tools and technology required to form a link between the two (i.e., for facilitating a mixed media document).

Moreover, there are particular advantageous attributes that conventional printed media provides such as tactile feel, no power requirements, and permanency for organization and storage, which are not provided with virtual or digital media. Likewise, there are particular advantageous attributes that conventional digital media provides such as portability (e.g., carried in storage of cell phone or laptop) and ease of transmission (e.g., email).

One particular problem in the prior art is that the image recognition process is computationally very expensive and can require seconds if not minutes to accurately recognize the page and location of a pristine document from an input query image. This can especially be a problem with a large data set, for example, millions of pages of documents. Thus, there is a need for mechanisms to improve the accuracy, and thus speed, with which recognition can be performed.

SUMMARY OF THE INVENTION

The present invention overcomes the deficiencies of the prior art with an MMR system that uses multiple classifiers for predicting, monitoring, and adjusting index tables for image recognition. The system is particularly advantageous because it provides more accurate search results. The system is also advantageous because its unique architecture can be easily adapted and updated.

In one embodiment, the MMR system comprises a plurality of mobile devices, a computer, a pre-processing server or MMR gateway, and an MMR matching unit. Some embodiments also include an MMR publisher. The mobile devices are communicatively coupled to the pre-processing server or MMR gateway to send retrieval requests including image queries and other contextual information. The pre-processing server or MMR gateway processes the retrieval request and generates an image query that is passed on to the MMR matching unit. The MMR matching unit includes a plurality of recognition unit and index table pairs corresponding to classifiers to be applied to received image queries, as well as an image registration unit for storing and monitoring performance data for the classifiers. The MMR matching unit receives the image query and identifies, using a classifier set, a result including a document, the page, and the location on the page corresponding to the image query. A recognition result is returned and performance data for the classifiers used is stored and analyzed.

The present invention also includes a number of novel methods including a method for monitoring online performance of a multiple classifier image recognition system, for classifier selection and comparison, and for offline classifier prediction.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1A:
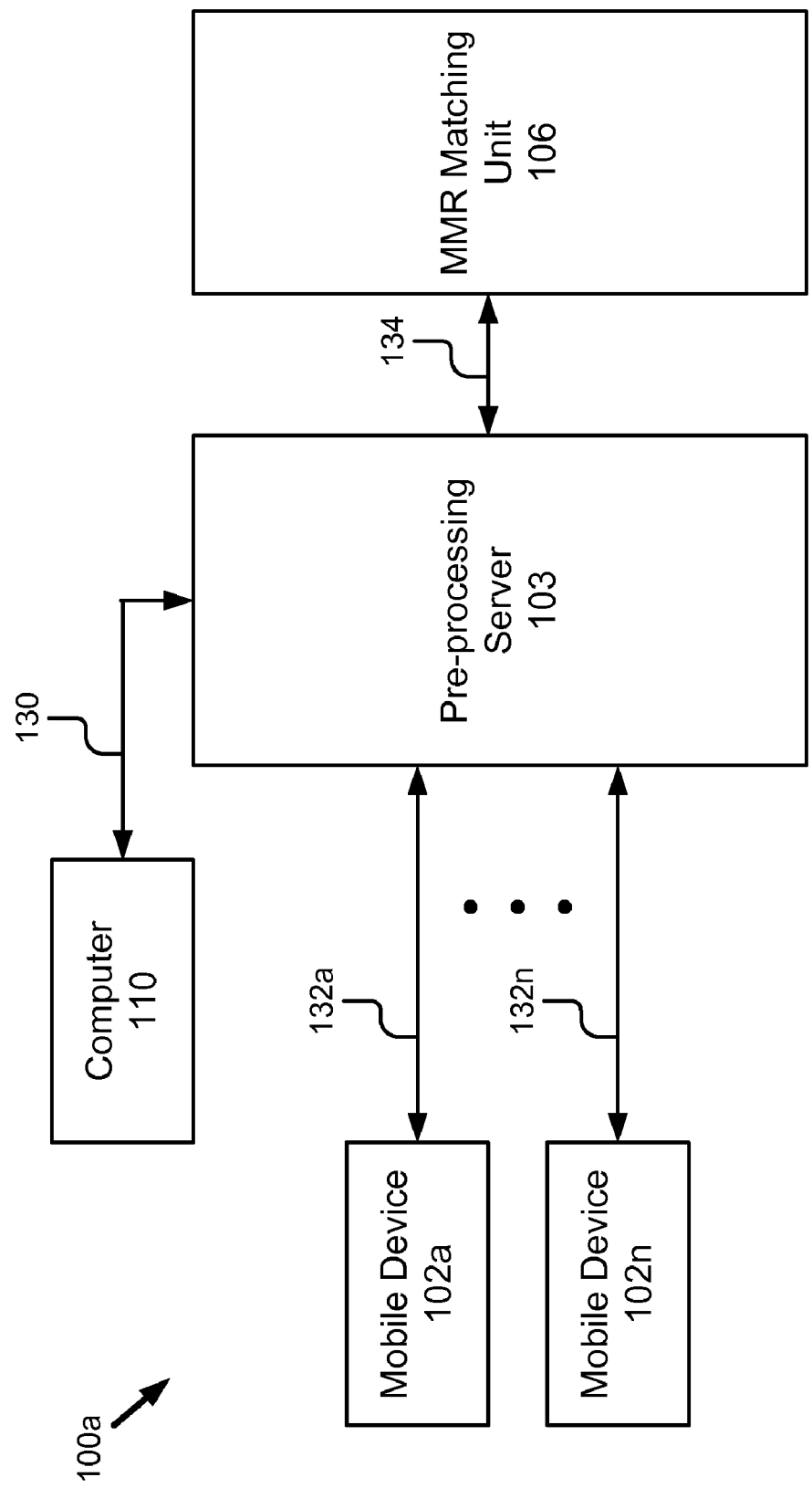
FIG. 1A is a block diagram of one embodiment of a system of mixed media reality using multiple classifiers in accordance with the present invention.

An architecture for a mixed media reality (MMR) system 100 capable of receiving query images and returning document pages and location as well as receiving images, hot spots, and other data and adding such information to the MMR system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to use with a conventional mass media publisher, in particular a newspaper publisher. However, the present invention applies to any type of computing systems and data processing in which multiple types of media including electronic media and print media are used.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the context of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described without reference to any particular programming language. It will be appreciated that a variety of programming languages may be used to implement the teachings of the invention as described herein.

System Overview

FIG. 1A shows an embodiment of an MMR system 100*a* in accordance with the present invention. The MMR system 100*a* comprises a plurality of mobile devices 102*a*-102*n*, a pre-processing server 103, and an MMR matching unit 106. In an alternative embodiment, the pre-processing server 103 and its functionality are integrated into the MMR matching unit 106. The present invention provides an MMR system 100*a* for image recognition in an adaptable multi-classifier system. The MMR system 100*a* is particularly advantageous because its unique architecture can be easily adapted and updated to provide more accurate search results.

The mobile devices 102*a*-102*n* are communicatively coupled by signal lines 132*a*-132*n*, respectively, to the pre-processing server 103 to send a "retrieval request." A retrieval request includes one or more of "image queries," other contextual information, and metadata. In one embodiment, an image query is an image in any format, or one or more features of an image. Examples of image queries include still images, video frames and sequences of video frames. The mobile devices 102*a*-102*n* are mobile computing devices such as mobile phones, which include a camera to capture images. It should be understood that the MMR system 100*a* will be utilized by hundreds or even millions of users. Thus, even though only two mobile devices 102*a*, 102*n* are shown, those skilled in the art will appreciate that the pre-processing server 103 may be simultaneously coupled to, receive and respond to retrieval requests from numerous mobile devices 102*a*-102*n*. Alternate embodiments for the mobile devices 102*a*-102*n* are described in more detail below with reference to FIGS. 2A and 2B.

As noted above, the pre-processing server 103 is able to couple to hundreds if not millions of mobile computing devices 102*a*-102*n* and service their retrieval requests. The pre-processing server 103 also may be communicatively coupled to the computer 110 by signal line 130 for administration and maintenance of the pre-processing server 103. The computer 110 can be any conventional computing device such as a personal computer. The main function of the pre-processing server 103 is processing retrieval requests from the mobile devices 102*a*-102*n* and returning recognition results back to the mobile devices 102*a*-102*n*. In one embodiment, the recognition results include one or more of a Boolean value (true/false) and if true, a page ID, and a location on the page. In other embodiments, the recognition results also include one or more from the group of actions, a message acknowledging that the recognition was successful (or not) and consequences of that decision, such as the sending of an email message, a document, actions defined within a portable document file, addresses such as URLs, binary data such as video, information capable of being rendered on the mobile device 102, menus with additional actions, raster images, image features, etc. The pre-processing server 103 generates an image query and recognition parameters from the retrieval request according to one embodiment, and passes them on to the MMR matching unit 106 via signal line 134. The pre-processing server 103 also may perform some image tracking computation according to one embodiment. Embodiments and operation of the pre-processing server 103 are described in greater detail below with reference to FIG. 3A.

The MMR matching unit 106 receives the image query from the pre-processing server 103 on signal line 134 and sends it to one or more of recognition units to identify a result including a document, the page and the location on the page corresponding to the image query, referred to generally throughout this application as the "retrieval process." The result is returned from the MMR matching unit 106 to the pre-processing server 103 on signal line 134. In addition to the result, the MMR matching unit 106 may also return other related information such as hotspot data. The MMR matching unit 106 also includes components for receiving new content and updating and reorganizing index tables used in the retrieval process. The process of adding new content to the MMR matching unit 106 is referred to generally throughout this application as the "registration process." Various embodiments of the MMR matching unit 106 and is components are described in more detail below with reference to FIG. 4A-8.

Figure 1B:
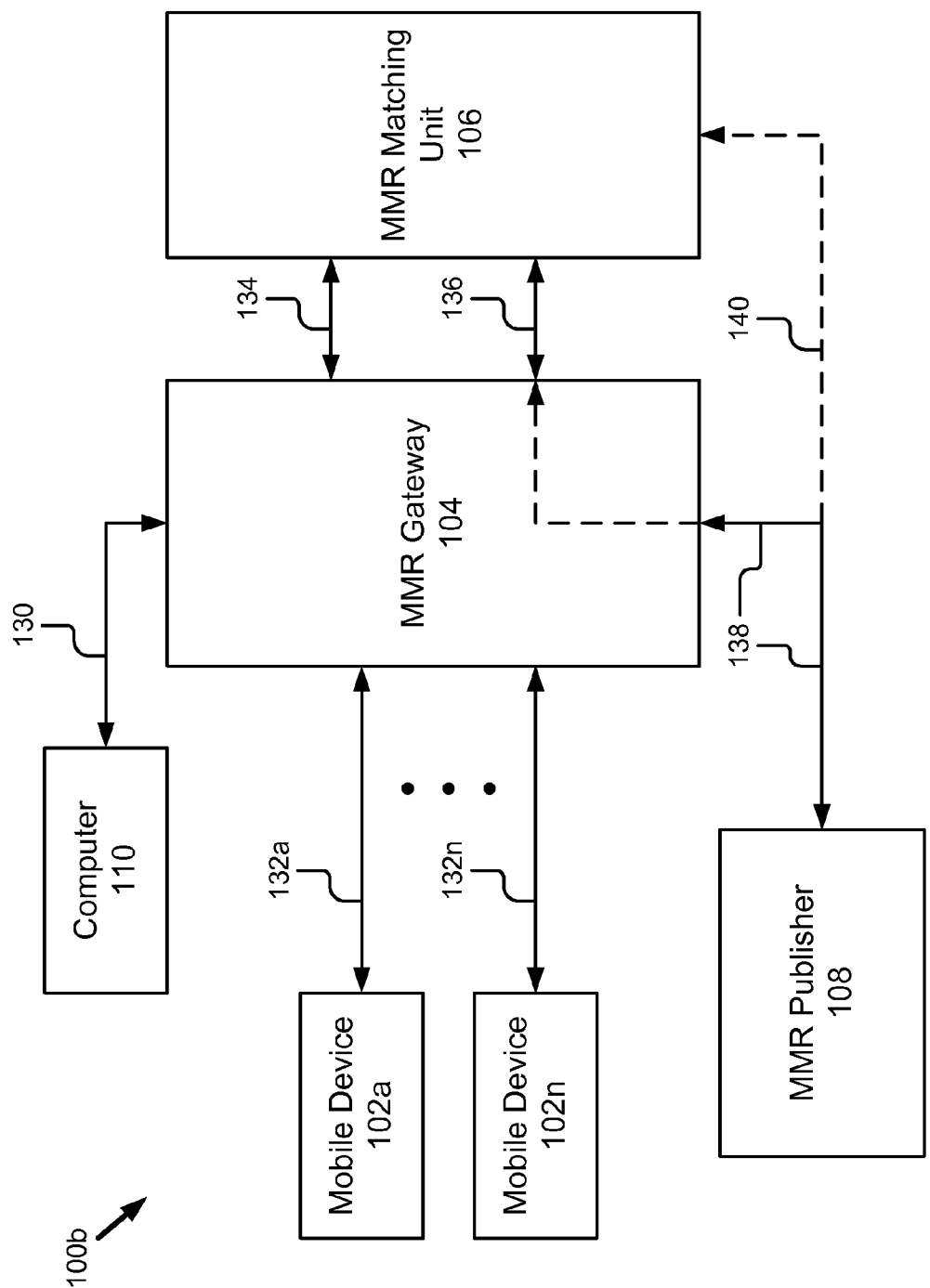
FIG. 1B is a block diagram of another embodiment of a system of mixed media reality using multiple classifiers in accordance with the present invention.

FIG. 1B shows an embodiment of a MMR system 100*b* in accordance with the present invention. The MMR system 100*b* comprises a plurality of mobile devices 102*a*-102*n*, an MMR gateway 104, an MMR matching unit 106, an MMR publisher 108 and a computer 110. The present invention provides, in one aspect, an MMR system 100*b* for use in newspaper publishing. The MMR system 100*b* for newspaper publishing is particularly advantageous because provides an automatic mechanism for a newspaper publisher to register images and content with the MMR system 100*b*. The MMR system 100*b* for newspaper publishing is also advantageous because it has a unique architecture adapted to respond to image queries formed of image portions or pages of a printed newspaper.

The mobile devices 102*a*-102*n* are similar to those described above, except that they are communicatively coupled by signal lines 132*a*-132*n*, respectively, to the MMR gateway 104 to send a "retrieval request," rather than to the pre-processing server 103. It should be understood that the MMR system 100*b* will be utilized by hundreds or even millions of users that receive a traditional publication such as a daily newspaper.

As noted above, the MMR gateway 104 is able to couple to hundreds if not millions of mobile computing devices 102*a*-102*n* and service their retrieval requests. The MMR gateway 104 is also communicatively coupled to the computer 110 by signal line 130 for administration and maintenance of the MMR gateway 104 and running business applications. In one embodiment, the MMR gateway 104 creates and presents a web portal for access by the computer 110 to run business applications as well as access logs of use of the MMR system 100*b*. The computer 110 can be any conventional computing device such as a personal computer. The main function of the MMR gateway 104 is processing retrieval requests from the mobile devices 102*a*-102*n* and returning recognition results back to the mobile devices 102*a*-102*n*. The types of recognition results produced by the MMR gateway 104 are similar to those described above in conjunction with pre-processing server 103. The MMR gateway 104 processes received retrieval requests by performing user authentication, accounting, analytics and other communication. The MMR gateway 104 also generates an image query and recognition parameters from the retrieval request, and passes them on to the MMR matching unit 106 via signal line 134. Embodiments and operation of the MMR gateway 104 are described in greater detail below with reference to FIG. 3B.

The MMR matching unit 106 is similar to that described above in conjunction with FIG. 1A, except that the MMR matching unit 106 receives the image query from the MMR gateway 104 on signal line 134 as part of the "retrieval process." The result is returned from the MMR matching unit 106 to the MMR gateway 104 on signal line 134. In one embodiment, the MMR matching unit 106 is coupled to the output of the MMR publisher 108 via signal lines 138 and 140 to provide new content used to update index tables of the MMR matching unit 106. In an alternate embodiment, the MMR publisher 108 is coupled to the MMR gateway 104 by signal line 138 and the MMR gateway 104 is in turn coupled by signal line 136 to the MMR matching unit 106. In this alternate environment, MMR gateway 104 extracts augmented data such as hotspot information, stores it and passes the image page references and other information to the MMR matching unit 106 for updating of the index tables.

The MMR publisher 108 includes a conventional publishing system used to generate newspapers or other types of periodicals. In one embodiment, the MMR publisher 108 also includes components for generating additional information needed to register images of printed documents with the MMR system 100. The information provided by the MMR publisher 108 to the MMR matching unit 106 includes an image file, bounding box data (x,y coordinates of the boxes that surround characters or words), hotspot data, and a unique page identification number. In the symbols of embodiment, this is a document in portable document format by Adobe Corp. of San Jose Calif. and bounding box information.

Mobile Device 102

Figure 2A:
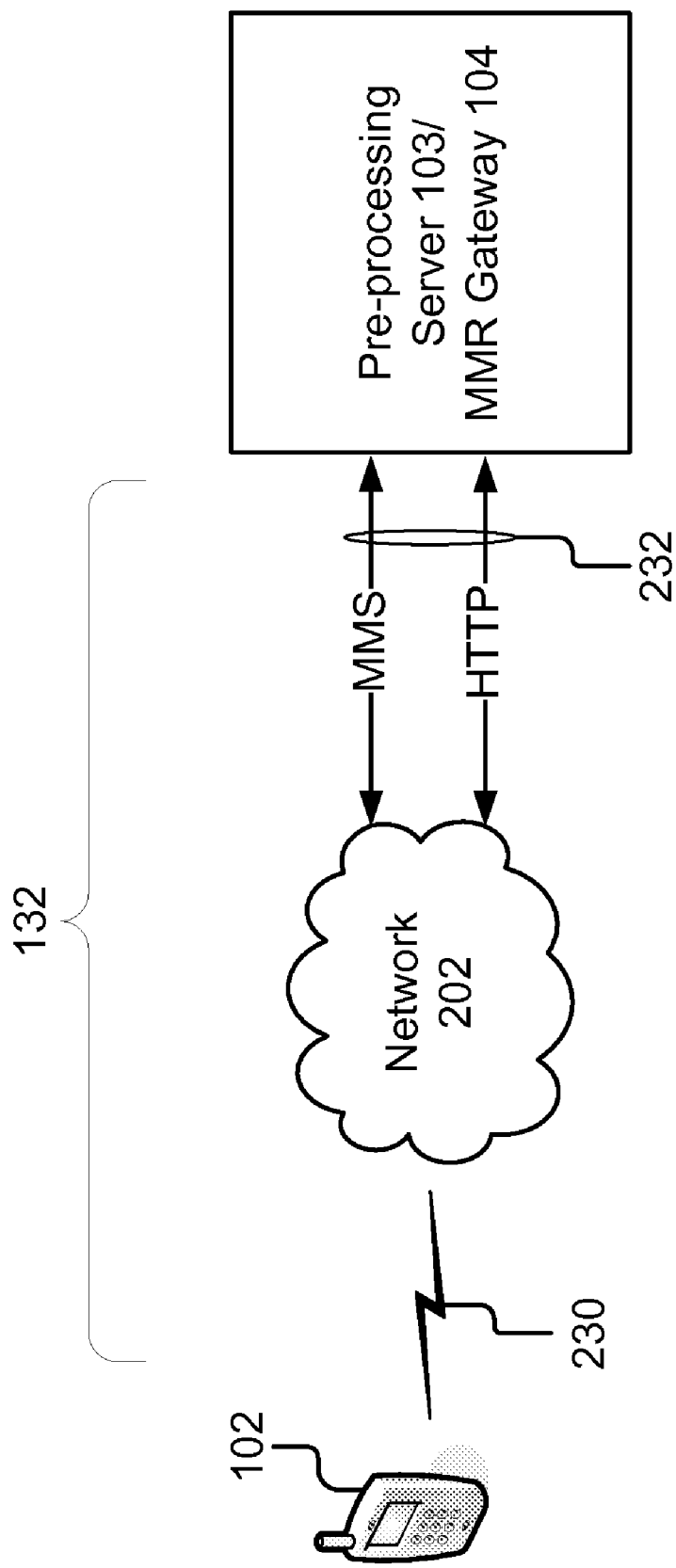
FIG. 2A is a block diagram of a first embodiment of a mobile device, network, and pre-processing server or MMR gateway configured in accordance with the present invention.
Figure 2B:
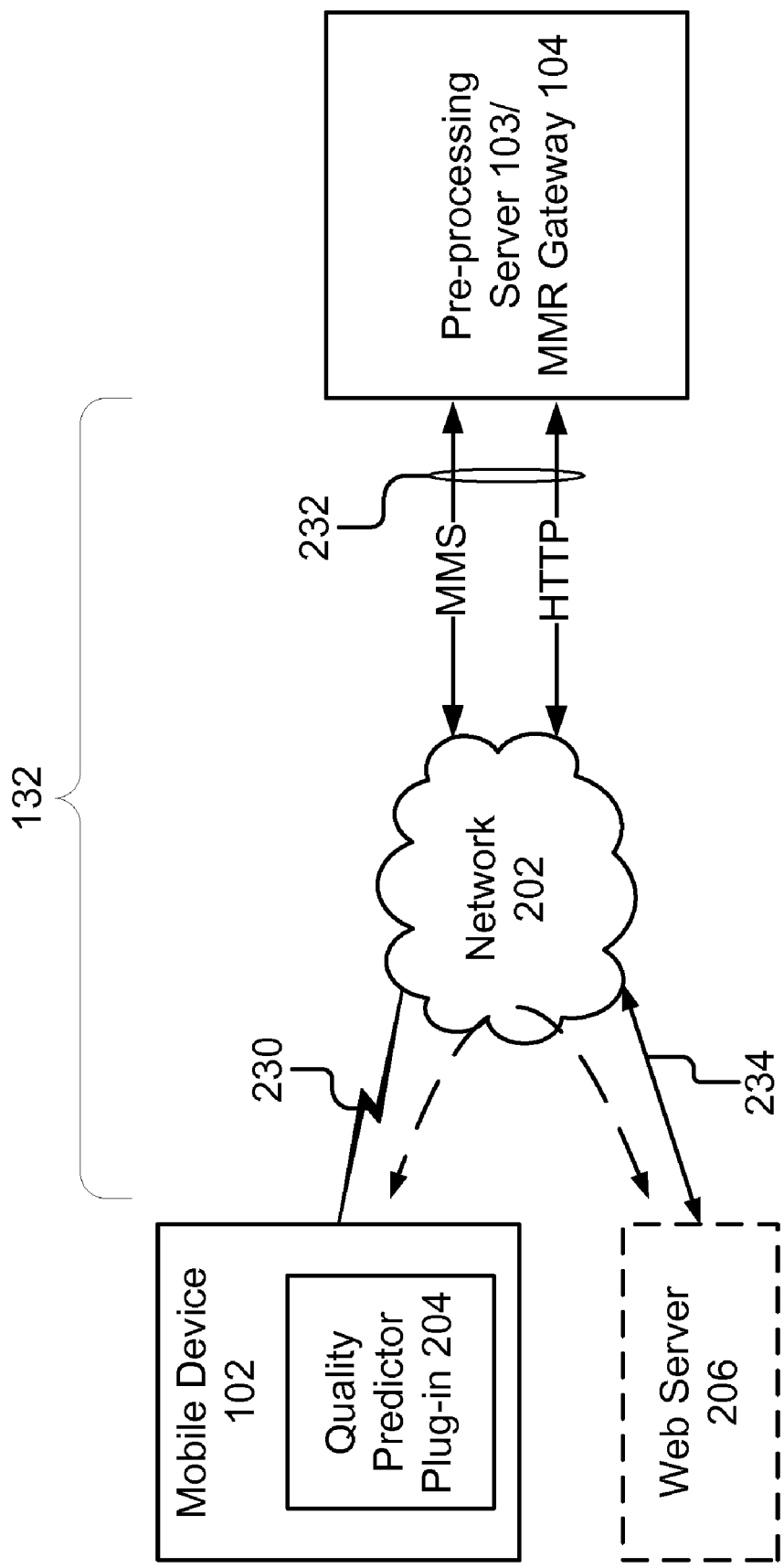
FIG. 2B is a block diagram of a second embodiment of a mobile device, network, and pre-processing server or MMR gateway configured in accordance with the present invention.

Referring now to FIGS. 2A and 2B, the first and second embodiments of the mobile device 102 will be described.

FIG. 2A shows a first embodiment of the coupling 132 between the mobile device 102 and the pre-processing server 103 or MMR gateway 104, according to the above-described embodiments of system 100*a*, 100*b*. In the embodiment of FIG. 2A, the mobile device 102 is any mobile phone (or other portable computing device with communication capability) that includes a camera. For example, the mobile device 102 may be a smart phone such as the Blackberry® manufactured and sold by Research In Motion. The mobile device 102 is adapted for wireless communication with the network 202 by a communication channel 230. The network 202 is a conventional type such as a cellular network maintained by wireless carrier and may include a server. In this embodiment, the mobile device 102 captures an image and sends the image to the network 202 over communications channel 230 such as by using a multimedia messaging service (MMS). The network 202 can also use the communication channel 230 to return results such as using MMS or using a short message service (SMS). As illustrated, the network 202 is in turn coupled to the pre-processing server 103 or MMR gateway 104 by signal lines 232. Signal lines 232 represent a channel for sending MMS or SMS messages as well as a channel for receiving hypertext transfer protocol (HTTP) requests and sending HTTP responses. Those skilled in the art will recognize that this is just one example of the coupling between the mobile device 102 and the pre-processing server 103 or MMR gateway 104. In an alternate embodiment for example, Bluetooth®, WiFi, or any other wireless communication protocol may be used as part of communication coupling between the mobile device 102 and the pre-processing server 103 or MMR gateway 104. The mobile device 102 and the pre-processing server 103 or MMR gateway 104 could be coupled in many other ways understood by those skilled in the art (e.g., direct data connection, SMS, WAP, email) so long as the mobile device 102 is able to transmit images to the pre-processing server 103 or MMR gateway 104 and the pre-processing server 103 or MMR gateway 104 is able to respond by sending document identification, page number, and location information.

Referring now to FIG. 2B, a second embodiment of the mobile device 102 is shown. In this second embodiment, the mobile device 102 is a smart phone such as the iPhone™ manufactured and sold by Apple Computer Inc. of Cupertino Calif. The second embodiment has a number of components similar to those of the first embodiment, and therefore, like reference numbers are used to reference like components with the same or similar functionality. Notable differences between the first embodiment and the second embodiment include a quality predictor plug-in 204 that is installed on the mobile device 102, and a Web server 206 coupled by signal line 234 to the network 202. The quality predictor plug-in 204 analyzes the images captured by the mobile device 102. The quality predictor plug-in 204 provides additional information produced by its analysis and includes that information as part of the retrieval request sent to the pre-processing server 103 or MMR gateway 104 to improve the accuracy of recognition. In an alternate embodiment, the output of the quality predictor plug-in 204 is used to select which images are transmitted from the mobile device 102 to the pre-processing server 103 or MMR gateway 104. For example, only those images that have a predicted quality above a predetermined threshold (e.g., images capable of being recognized) are transmitted from the mobile device 102 to the pre-processing server 103 or MMR gateway 104. Since transmission of images requires significant bandwidth and the communication channel 230 between the mobile device 102 and the network 202 may have limited bandwidth, using the quality predictor plug-in 204 to select which images to transmit is particularly advantageous.

The second embodiment shown in FIG. 2B also illustrates how the results returned from the pre-processing server 103 or MMR gateway 104, or other information provided by the quality predictor plug-in 204, can be used by the mobile device 102 to access hotspot or augmented information available on a web server 206. In such a case, the results from the pre-processing server 103 or MMR gateway 104 or output of the quality predictor plug-in 204 would include information that can be used to access Web server 206 such as with a conventional HTTP request and using web access capabilities of the mobile device 102.

It should be noted that regardless of whether the first embodiment or the second embodiment of the mobile device 102 is used according to FIGS. 2A and 2B, the mobile device 102 generates a retrieval request that includes: a query image, a user or device ID, a command, and other contact information such as device type, software, plug-ins, location (for example if the mobile device includes a GPS capability), device and status information (e.g., device model, macro lens on/off status, autofocus on/off, vibration on/off, tilt angle, etc), context-related information (weather at the phone's location, time, date, applications currently running on the phone), user-related information (e.g., id number, preferences, user subscriptions, user groups and social structures, action and action-related meta data such as email actions and emails waiting to be sent), etc.

Pre-processing Server 103

Figure 3A:
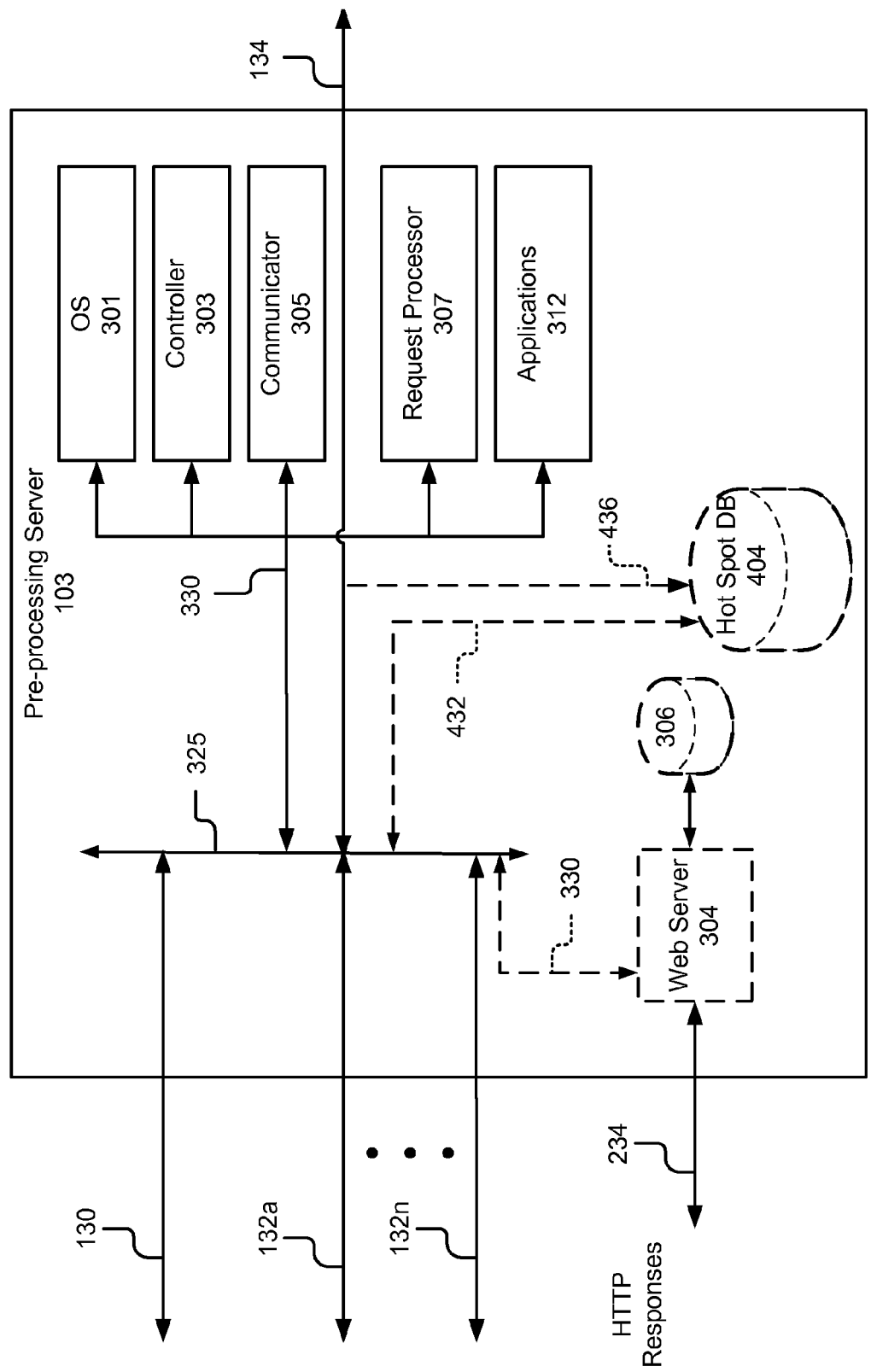
FIG. 3A is a block diagram of an embodiment of a pre-processing server in accordance with the present invention.

Referring now to FIG. 3A, one embodiment of the pre-processing server 103 is shown. This embodiment of the pre-processing server 103 comprises an operating system (OS) 301, a controller 303, a communicator 305, a request processor 307, and applications 312, connected to system bus 325. Optionally, the pre-processing server 103 also may include a web server 304, a database 306, and/or a hotspot database 404.

As noted above, one of the primary functions of the pre-processing server 103 is to communicate with many mobile devices 102 to receive retrieval requests and send responses including a status indicator (true=recognized/false=not recognized), a page identification number, a location on the page and other information, such as hotspot data. A single pre-processing server 103 can respond to hundreds or millions of retrieval requests. For convenience and ease of understanding only a single pre-processing server 103 is shown in FIGS. 1A and 3A, however, those skilled in the art will recognize that in other embodiments any number of pre-processing servers 103 may be utilized to service the needs of a multitude of mobile devices 102. More particularly, the pre-processing server 103 system bus 325 is coupled to signal lines 132a-132n for communication with various mobile devices 102. The pre-processing server 103 receives retrieval requests from the mobile devices 102 via signal lines 132a-132n and sends responses back to the mobile devices 102 using the same signal lines 132a-132n. In one embodiment, the retrieval request includes: a command, a user identification number, an image, and other context information. For example, other context information may include: device information such as the make, model or manufacturer of the mobile device 102; location information such as provided by a GPS system that is part of the mobile device or by triangulation; environmental information such as time of day, temperature, weather conditions, lighting, shadows, object information; and placement information such as distance, location, tilt, and jitter.

The pre-processing server 103 is also coupled to signal line 130 for communication with the computer 110. Again, for convenience and ease of understanding only a single computer 110 and signal line 130 are shown in FIGS. 1A and 3A, but any number of computing devices may be adapted for communication with the pre-processing server 103. The pre-processing server 103 facilitates communication between the computer 110 and the operating system (OS) 301, a controller 303, a communicator 305, a request processor 307, and applications 312. The OS 301, controller 303, communicator 305, request processor 307, and applications 312 are coupled to system bus 325 by signal line 330.

The pre-processing server 103 processes the retrieval request and generates an image query and recognition parameters that are sent via signal line 134, which also is coupled to system bus 325, and to the MMR matching unit 106 for recognition. The pre-processing server 103 also receives recognition responses from the MMR matching unit 106 via signal line 134. More specifically, the request processor 307 processes the retrieval request and sends information via signal line 330 to the other components of the pre-processing server 103 as will be described below.

The operating system 301 is preferably a custom operating system that is accessible to computer 110, and otherwise configured for use of the pre-processing server 103 in conjunction with the MMR matching unit 106. In an alternate embodiment, the operating system 301 is one of a conventional type such as, WINDOWS®, Mac OS X®, SOLARIS®, or LINUX® based operating systems. The operating system 301 is connected to system bus 325 via signal line 330.

The controller 303 is used to control the other modules 305, 307, 312, per the description of each below. While the controller 303 is shown as a separate module, those skilled in the art will recognize that the controller 303 in another embodiment may be distributed as routines in other modules. The controller 303 is connected to system bus 325 via signal line 330.

The communicator 305 is software and routines for sending data and commands among the pre-processing server 103, mobile devices 102, and MMR matching unit 106. The communicator 305 is coupled to signal line 330 to send and receive communications via system bus 325. The communicator 305 communicates with the request processor 307 to issue image queries and receive results.

The request processor 307 processes the retrieval request received via signal line 330, performs preprocessing and issues image queries sent to MMR matching unit 106 via signal line 134. In various embodiments, the preprocessing may include feature extraction and recognition parameter definition. The request processor 307 also sends information via signal line 330 to the other components of the pre-processing server 103. The request processor 307 is connected to system bus 325 via signal line 330.

The one or more applications 312 are software and routines for providing functionality related to the processing of MMR documents. The applications 312 can be any of a variety of types, including without limitation, drawing applications, word processing applications, electronic mail applications, search application, financial applications, and business applications adapted to utilize information related to the processing of retrieval quests and delivery of recognition responses such as but not limited to accounting, groupware, customer relationship management, human resources, outsourcing, loan origination, customer care, service relationships, etc. In addition, applications 312 may be used to allow for annotation, linking additional information, audio or video clips, building e-communities or social networks around the documents, and associating educational multimedia with recognized documents.

System bus 325 represents a shared bus for communicating information and data throughout pre-processing server 103. System bus 325 may represent one or more buses including an industry standard architecture (ISA) bus, a peripheral component interconnect (PCI) bus, a universal serial bus (USB), or some other bus known in the art to provide similar functionality. Additional components may be coupled to pre-processing server 103 through system bus 325 according to various embodiments.

The pre-processing server 103 optionally also includes a web server 304, a database 306, and/or a hotspot database 404 according to various embodiments.

The web server 304 is a conventional type and is responsible for accepting HTTP requests from web clients and sending responses along with data contents, such as web pages, documents, and linked objects (images, etc.) The Web server 304 is coupled to data store 306 such as a conventional database. The Web server 304 is adapted for communication via signal line 234 to receive HTTP requests from any communication device, e.g., mobile devices 102, across a network such as the Internet. The Web server 304 also is coupled to signal line 330 as described above to receive Web content associated with hotspots for storage in the data store 306 and then for later retrieval and transmission in response to HTTP requests. Those skilled in the art will understand that inclusion of the Web server 304 and data store 306 as part of the pre-processing server 103 is merely one embodiment and that the Web server 304 and the data store 306 may be operational in any number of alternate locations or configuration so long as the Web server 304 is accessible to mobile devices 102 and computers 110 via the Internet.

In one embodiment, the pre-processing server 103 also includes a hotspot database 404. The hotspot database 404 is shown in FIG. 3A with dashed lines to reflect that inclusion in the pre-processing server 103 is an alternate embodiment. The hotspot database 404 is coupled by signal line 436 to receive the recognition responses via line 134. The hotspot database 404 uses these recognition responses to query the database and output via line 432 and system bus 325 the hotspot content corresponding to the recognition responses. This hotspot content is included with the recognition responses sent to the requesting mobile device 102.

MMR Gateway 104

Figure 3B:
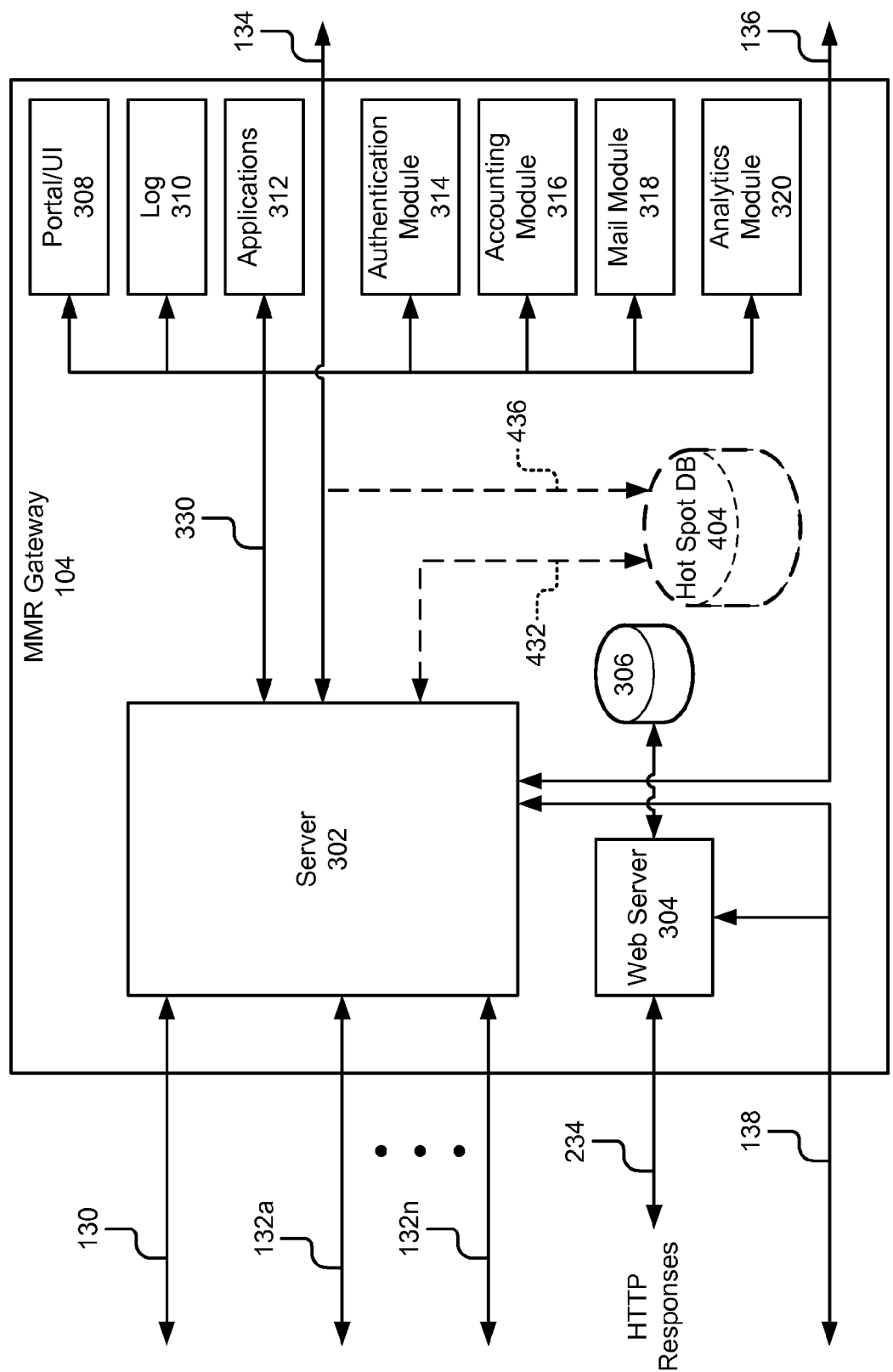
FIG. 3B is a block diagram of an embodiment of an MMR gateway in accordance with the present invention.

Referring now to FIG. 3B, one embodiment of the MMR gateway 104 is shown. This embodiment of the MMR gateway 104 comprises a server 302, a Web server 304, a data store 306, a portal module 308, a log 310, one or more applications 312, an authentication module 314, an accounting module 316, a mail module 318, and an analytics module 320.

As noted above, one of the primary functions of the MMR gateway 104 is to communicate with many mobile devices 102 to receive retrieval requests and send responses including a status indicator (true=recognized/false=not recognized), a page identification number, a location on the page and other information such as hotspot data. A single MMR gateway 104 can respond to hundreds or millions of retrieval requests. For convenience and ease of understanding only a single MMR gateway 104 is shown in FIGS. 1B and 3B, however, those skilled in the art will recognize that in other embodiments any number of MMR gateways 104 may be utilized to service the needs of a multitude of mobile devices 102. More particularly, the server 302 of the MMR gateway 104 is coupled to signal lines 132a-132n for communication with various mobile devices 102. The server 302 receives retrieval requests from the mobile devices 102 via signal lines 132a-132n and sends responses back to the mobile devices 102 using the same signal lines 132a-132n. In one embodiment, the retrieval request includes: a command, a user identification number, an image and other context information. For example, other context information may include: device information such as the make, model or manufacturer of the mobile device 102; location information such as provided by a GPS system that is part of the mobile device or by triangulation; environmental information such as time of day, temperature, weather conditions, lighting, shadows, object information; and placement information such as distance, location, tilt, and jitter.

The server 302 is also coupled to signal line 130 for communication with the computer 110. Again, for convenience and ease of understanding only a single computer 110 and signal line 130 are shown in FIGS. 1B and 3B, but any number of computing devices may be adapted for communication with the server 302. The server 302 facilitates communication between the computer 110 and the portal module 308, the log module 310 and the applications 312. The server 302 is coupled to the portal module 308, the log module 310 and the applications 312 by signal line 330. As will be described in more detail below, the module cooperates with the server 302 to present a web portal that provides a user experience for exchanging information. The Web portal 308 can also be used for system monitoring, maintenance and administration.

The server 302 processes the retrieval request and generates an image query and recognition parameters that are sent via signal line 134 to the MMR matching unit 106 for recognition. The server 302 also receives recognition responses from the MMR matching unit 106 via 5 signal line 134. The server 302 also processes the retrieval request and sends information via signal line 330 to the other components of the MMR gateway 104 as will be described below. The server 302 is also adapted for communication with the MMR publisher 108 by signal line 138 and the MMR matching unit 106 via signal line 136. The signal line 138 provides a path for the MMR publisher 108 to send Web content for hotspots to the Web server 304 and to provide other information to the server 302. In one embodiment, the server 302 receives information from the MMR publisher 108 and sends that information via signal line 136 for registration with the MMR matching unit 106.

The web server 304 is a conventional type and is responsible for accepting requests from clients and sending responses along with data contents, such as web pages, documents, and linked objects (images, etc.) The Web server 304 is coupled to data store 306 such as a conventional database. The Web server 304 is adapted for communication via signal line 234 to receive HTTP requests from any communication device across a network such as the Internet. The Web server 304 is also coupled to signal line 138 as described above to receive Web content associated with hotspots for storage in the data store 306 and then for later retrieval and transmission in response to HTTP requests. Those skilled in the art will understand that inclusion of the Web server 304 and data store 306 as part of the MMR gateway 104 is merely one embodiment and that the Web server 304 and the data store 306 may be operational in any number of alternate locations or configuration so long as the Web server 304 is accessible to mobile devices 102 and computers 110 via the Internet.

In one embodiment, the portal module 308 is software or routines operational on the server 302 for creation and presentation of the Web portal. The portal module 308 is coupled to signal line 330 for communication with the server 302. In one embodiment, the web portal provides an access point for functionality including administration and maintenance of other components of the MMR gateway 104. In another embodiment, the web portal provides an area where users can share experiences related to MMR documents. In yet another embodiment, the web portal but an area where users can access business applications and the log 310 of usage.

The log 310 is a memory or storage area for storing a list of the retrieval requests received by the server 302 from mobile devices 102 and all corresponding responses sent by the server 302 to the mobile device. In another embodiment, the log 310 also stores a list of the image queries generated and sent to the MMR matching unit 106 and the recognition responses received from the MMR matching unit 106. The log 310 is coupled to signal line 330 for access by the server 302.

The one or more business applications 312 are software and routines for providing functionality related to the processing of MMR documents. In one embodiment the one or more business applications 312 are executable on the server 302. The business applications 312 can be any one of a variety of types of business applications adapted to utilize information related to the processing of retrieval requests and delivery of recognition responses such as but not limited to accounting, groupware, customer relationship management, human resources, outsourcing, loan origination, customer care, service relationships, etc.

The authentication module 314 is software and routines for maintaining a list of authorized users and granting access to the MMR system 100. In one embodiment, the authentication module 314 maintains a list of user IDs and passwords corresponding to individuals who have created an account in the system 100b, and therefore, are authorized to use MMR gateway 104 and the MMR matching unit 106 to process retrieval requests. The authentication module 314 is communicatively coupled by signal line 330 to the server 302. But as the server 302 receives retrieval requests, they can be processed and compared against information in the authentication module 314 before generating and sending the corresponding image query on signal line 134. In one embodiment, the authentication module 314 also generates messages for the server 302 to return to the mobile device 102 when the mobile device is not authorized, the mobile device has not established an account, or the account for the mobile device 102 is locked such as due to abuse or lack of payment.

The accounting module 316 is software and routines for performing accounting related to user accounts and use of the MMR system 100b. In one embodiment, the retrieval services are provided under a variety of different economic models such as but not limited to use of the MMR system 100b under a subscription model, a charge per retrieval request model or various other pricing models. In one embodiment, the MMR system 100b provides a variety of different pricing models and is similar to those currently offered for cell phones and data networks. The accounting module 316 is coupled to the server 302 by signal line 330 to receive an indication of any retrieval request received by the server 302. In one embodiment, the accounting module 316 maintains a record of transactions (retrieval request/recognition responses) processed by the server 302 for each mobile device 102. Although not shown, the accounting module 316 can be coupled to a traditional billing system for the generation of an electronic or paper bill.

The mail module 318 is software and routines for generating e-mail and other types of communication. The mail module 318 is coupled by signal at 330 to the server 302. In one embodiment, the mobile device 102 can issue retrieval requests that include a command to deliver a document or a portion of a document or other information via e-mail, facsimile or other traditional electronic communication means. The mail module 318 is adapted to generate and send such information from the MMR gateway 104 to an addressee as prescribed by the user. In one embodiment, each user profile has associated addressees which are potential recipients of information retrieved.

The analytics module 320 is software and routines for measuring the behavior of users of the MMR system 100b. The analytics module 320 is also software and routines for measuring the effectiveness and accuracy of feature extractors and recognition performed by the MMR matching unit 106. The analytics module 320 measures use of the MMR system 100b including which images are most frequently included as part of retrieval requests, which hotspot data is most often accessed, the order in which images are retrieved, the first image in the retrieval process, and other key performance indicators used to improve the MMR experience and/or a marketing campaign's audience response. In one embodiment, the analytics module 320 measures metrics of the MMR system 100b and analyzes the metrics used to measure the effectiveness of hotspots and hotspot data. The analytics module 320 is coupled to the server 302, the authentication module 314 and the accounting module 316 by signal line 330. The analytics module 320 is also coupled by the server 302 to signal line 134 and thus can access the components of the MMR matching unit 106 to retrieve recognition parameters, images features, quality recognition scores and any other information generated or used by the MMR matching unit 106. The analytics module 320 can also perform a variety of data retrieval and segmentation based upon parameters or criteria of users, mobile devices 102, page IDs, locations, etc.

In one embodiment, the MMR gateway 104 also includes a hotspot database 404. The hotspot database 404 is shown in FIG. 3 with dashed lines to reflect that inclusion in the MMR gateway 104 is an alternate embodiment. The hotspot database 404 is coupled by signal line 436 to receive the recognition responses via line 134. The hotspot database 404 uses these recognition responses to query the database and output via line 432 the hotspot content corresponding to the recognition responses. This hotspot content is sent to the server 302 so that it can be included with the recognition responses and sent to the requesting mobile device 102.

MMR Matching Unit 106

Figure 4A:
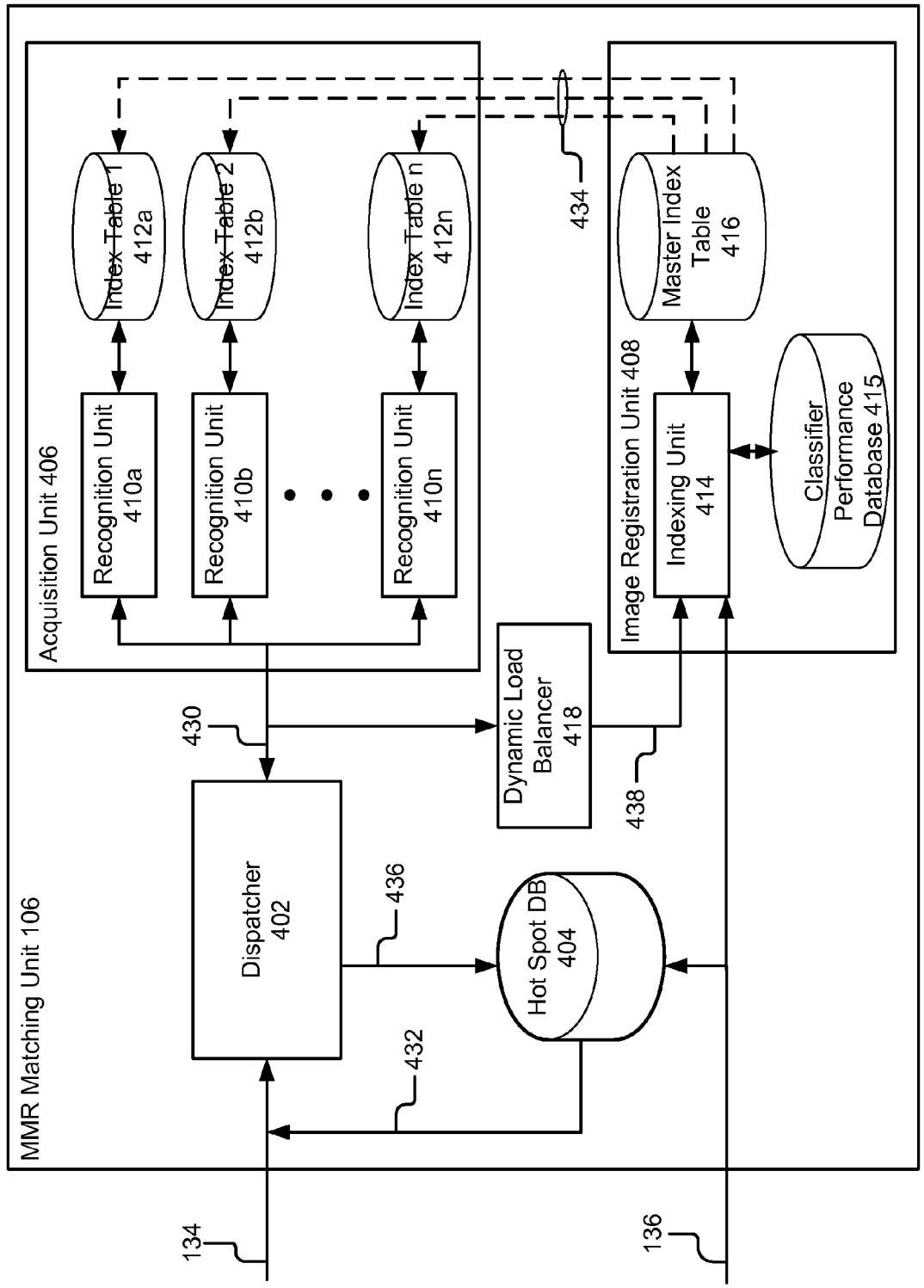
FIG. 4A is a block diagram of a first embodiment of a MMR matching unit in accordance with the present invention.
Figure 4B:
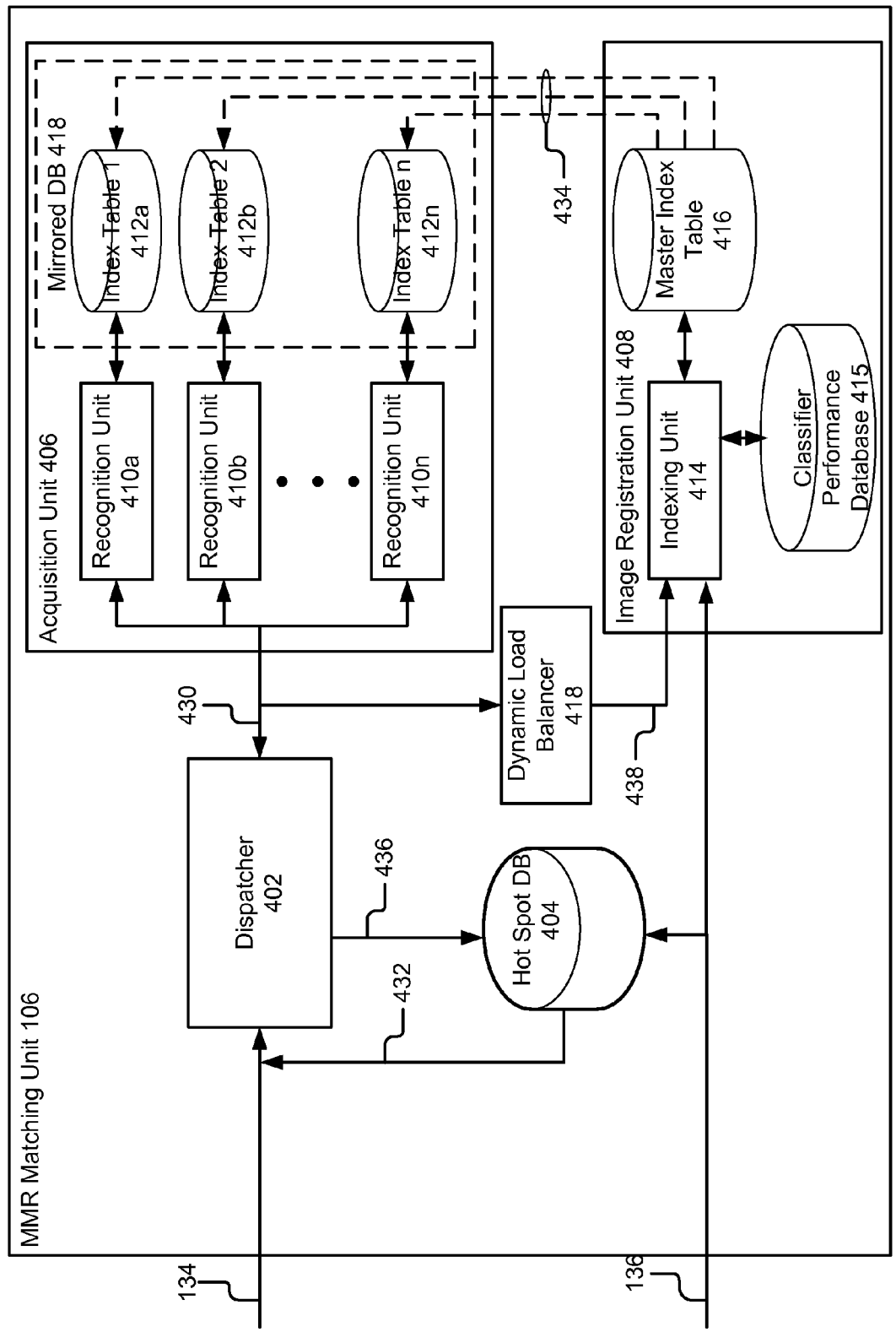
FIG. 4B is a block diagram of a second embodiment of the MMR matching unit in accordance with the present invention.

Referring now to FIGS. 4A and 4B, two embodiments for the MMR matching unit 106 will be described. The basic function of the MMR matching unit 106 is to receive an image query, send the image query for recognition, perform recognition on the images in the image query, retrieve hotspot information, combine the recognition result with hotspot information, and send it back to the pre-processing server 103 or MMR gateway 104.

FIG. 4A illustrates a first embodiment of the MMR matching unit 106. The first embodiment of the MMR matching unit 106 comprises a dispatcher 402, a hotspot database 404, an acquisition unit 406, an image registration unit 408, and a dynamic load balancer 418. The acquisition unit 406 further comprises a plurality of the recognition units 410a-410n and a plurality of index tables 412a-412n. The image registration unit 408 further comprises an indexing unit 414 and a master index table 416.

The dispatcher 402 is coupled to signal line 134 for receiving an image query from and sending recognition results to the pre-processing server 103 or MMR gateway 104. The dispatcher 402 is responsible for assigning and sending an image query to respective recognition units 410a-410n. In one embodiment, the dispatcher 402 receives an image query, generates a recognition unit identification number, and sends the recognition unit identification number and the image query to the acquisition unit 406 for further processing. The dispatcher 402 is coupled to signal line 430 to send the recognition unit identification number and the image query to the recognition units 410a-410n. The dispatcher 402 also receives the recognition results from the acquisition unit 406 via signal line 430. One embodiment for the dispatcher 402 will be described in more detail below with reference to FIG. 5.

An alternate embodiment for the hotspot database 404 has been described above with reference to FIGS. 3A-3B wherein the hotspot database is part of the pre-processing server 103 or MMR gateway 104. However, the preferred embodiment for the hotspot database 404 is part of the MMR matching unit 106 as shown in FIG. 4A. Regardless of the embodiment, the hotspot database 404 has a similar functionality. The hotspot database 404 is used to store hotspot information. Once an image query has been recognized and recognition results are produced, these recognition results are used as part of a query of the hotspot database 404 to retrieve hotspot information associated with the recognition results. The retrieved hotspot information is then output on signal line 134 to the pre-processing server 103 or MMR gateway 104 for packaging and delivery to the mobile device 102. As shown in FIG. 4A, the hotspot database 404 is coupled to the dispatcher 402 by signal line 436 to receive queries including recognition results. The hotspot database 404 is also coupled by signal line 432 and signal line 134 to the pre-processing server 103 or MMR gateway 104 for delivery of query results. The hotspot database 404 is also coupled to signal line 136 to receive new hotspot information for storage from the MMR publisher 108, according to one embodiment.

The acquisition unit 406 comprises the plurality of the recognition units 410a-410n and a plurality of index tables 412a-412n. Each of the recognition units 410a-410n has and is coupled to a corresponding index table 412a-412n. In one embodiment, each recognition unit 410/index table 412 pair is on the same server. The dispatcher 402 sends the image query to one or more recognition units 410a-410n. In one embodiment that includes redundancy, the image query is sent from the dispatcher 402 to a plurality of recognition units 410 for recognition and retrieval and the index tables 412a-n index the same data. In the serial embodiment, the image query is sent from the dispatcher 402 to a first recognition unit 410a. If recognition is not successful on the first recognition unit 410a, the image query is passed on to a second recognition unit 410b, and so on. In yet another embodiment, the dispatcher 402 performs some preliminary analysis of the image query and then selects a recognition unit 410a-410n best adapted and most likely to be successful at recognizing the image query. Those skilled in the art will understand that there are a variety of configurations for the plurality of recognition units 410a-410n and the plurality of index tables 412a-412n. Example embodiments for the acquisition unit 406 will be described in more detail below with reference to FIGS. 6A-6B. It should be understood that the index tables 412a-412n can be updated at various times as depicted by the dashed lines 434 from the master index table 416.

The image registration unit 408 comprises the indexing unit 414, the classifier performance database 415, and the master index table 416. The image registration unit 408 has an input coupled to signal on 136 to receive updated information from the MMR publisher 108, according to one embodiment, and an input coupled to signal line 438 to receive updated information from the dynamic load balancer 418. The image registration unit 408 is responsible for maintaining the master index table 416 and migrating all or portions of the master index table 416 to the index tables 412a-412n (slave tables) of the acquisition unit 406. In one embodiment, the indexing unit 414 receives images, unique page IDs, and other information; and converts it into index table information that is stored in the master index table 416. In one embodiment, the master index table 416 also stores the record of what is migrated to the index table 412. The indexing unit 414 also cooperates with the MMR publisher 108 according to one embodiment to maintain a unique page identification numbering system that is consistent across image pages generated by the MMR publisher 108, the image pages stored in the master index table 416, and the page numbers used in referencing data in the hotspot database 404. The image registration unit 408 also includes the classifier performance database 415 for storing performance data associated with various classifiers associated with index tables 412. The image registration unit 408, in conjunction with the classifier performance database 415 and the dynamic load balancer work together to perform both offline and online analyses and updates to the classifiers being used. Exemplary embodiments for the image registration unit 408 is shown and described in more detail below with reference to FIGS. 7A-7B.

The dynamic load balancer 418 has an input coupled to signal line 430 to receive the query image from the dispatcher 402 and the corresponding recognition results from the acquisition unit 406. The output of the dynamic load balancer 418 is coupled by signal line 438 to an input of the image registration unit 408. The dynamic load balancer 418 provides input to the image registration unit 408 that is used to dynamically adjust the index tables 412a-412n of the acquisition unit 406. In particular, the dynamic load balancer 418 monitors and evaluates the image queries that are sent from the dispatcher 402 to the acquisition unit 406 for a given period of time. Based on the usage, the dynamic load balancer 418 provides input to adjust the index tables 412a-412n. For example, the dynamic load balancer 418 may measure the image queries for a day. Based on the measured usage for that day, the index tables may be modified and configured in the acquisition unit 406 to match the usage measured by the dynamic load balancer 418.

FIG. 4B illustrates a second embodiment of the MMR matching unit 106. In the second embodiment, many of the components of the MMR matching unit 106 have the same or a similar function to corresponding elements of the first embodiment. Thus, like reference numbers have been used to refer to like components with the same or similar functionality. The second embodiment of the MMR matching unit 106 includes the dispatcher 402, the hotspot database 404, and the dynamic load balancer 418 similar to the first embodiment of the MMR matching unit 106. However, the acquisition unit 406 and the image registration unit 408 are different from that described above with reference to FIG. 4A. In particular, the acquisition unit 406 and the image registration unit 408 utilize a shared SQL database for the index tables and the master table. More specifically, there is the master index table 416 and a mirrored database 418 that includes the local index tables 412a-n. Moreover, a conventional functionality of SQL database replication is used to generate the mirror images of the master index table 416 stored in the index tables 412a-412n for use in recognition. The image registration unit 408 is configured so that when new images are added to the master index table 416 they are immediately available to all the recognition units 410. This is done by mirroring the master index table 416 across all the local index tables 412a-n using large RAM (not shown) and database mirroring technology.

Dispatcher 402

Figure 5:
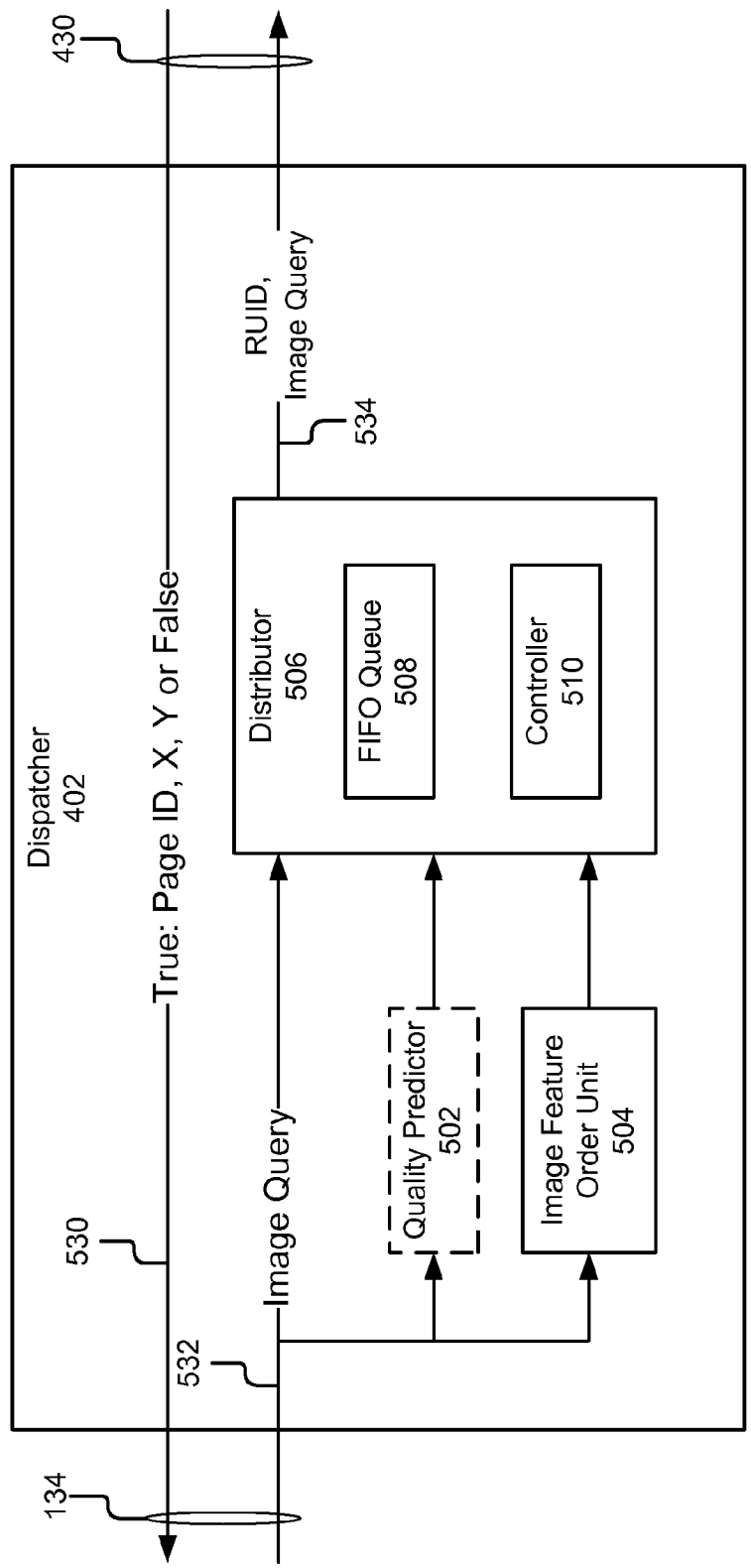
FIG. 5 is a block diagram of an embodiment of a dispatcher in accordance with the present invention.

Referring now to FIG. 5, an embodiment of the dispatcher 402 shown. The dispatcher 402 comprises a quality predictor 502, an image feature order unit 504, and a distributor 506. The quality predictor 502, the image feature order unit 504, and the distributor 506 are coupled to signal line 532 to receive image queries from the pre-processing server 103 or MMR gateway 104.

The quality predictor 502 receives image queries and generates a recognizability score used by the dispatcher 402 to route the image query to one of the plurality of recognition units 410. The dispatcher 402 also receives recognition results from the recognition units 410 on signal line 530. The recognition results include a Boolean value (true/false) and if true, a page ID, and a location on the page. In one embodiment, the dispatcher 402 merely receives and retransmits the data to the pre-processing server 103 or MMR gateway 104.

The image feature order unit 504 receives image queries and outputs an ordering signal. The image feature order unit 504 analyzes an input image query and predicts the time required to recognize an image by analyzing the image features it contains. The difference between the actual recognition time and the predicted time is used to adjust future predictions thereby improving accuracy. In the simplest of embodiments, simple images with few features are assigned to lightly loaded recognition units 410 so that they will be recognized quickly and the user will see the answer immediately. In one embodiment, the features used by the image feature order unit 504 to predict the time are different than the features used by recognition units 410 for actual recognition. For example, the number of corners detected in an image is used to predict the time required to analyze the image. The feature set used for prediction need only be correlated with the actual recognition time. In one embodiment, several different features sets are used and the correlations to recognition time measured over some period. Eventually, the feature set that is the best predictor and lowest cost (most efficient) would be determined and the other feature sets could be discarded.

The distributor 506 is also coupled to receive the output of the quality predictor 502 and image feature order unit 504. The distributor 506 includes a FIFO queue 508 and a controller 510. The distributor 506 generates an output on signal line 534 that includes the image query and a recognition unit identification number (RUID). Those skilled in the art will understand that in other embodiments the image query may be directed to any particular recognition unit using a variety of means other than the RUID. As image queries are received on the signal line 532, the distributor 506 receives the image queries and places them in the order in which they are received into the FIFO queue 508. The controller 510 receives a recognizability score for each image query from the quality predictor 502 and also receives an ordering signal from the image feature order unit 504. Using this information from the quality predictor 502 and the image feature order unit 504, the controller 510 selects image queries from the FIFO queue 508, assigns them to particular recognition units 410 and sends the image query to the assigned recognition unit 410 for processing. The controller 510 maintains a list of image queries assigned to each recognition unit 410 and the expected time to completion for each image (as predicted by the image feature order unit 504). The total expected time to empty the queue for each recognition unit 410 is the sum of the expected times for the images assigned to it. The controller 510 can execute several queue management strategies. In a simple assignment strategy, image queries are removed from the FIFO queue 508 in the order they arrived and assigned to the first available recognition unit 410. In a balanced response strategy, the total expected response time to each query is maintained at a uniform level and query images are removed from the FIFO queue 508 in the order they arrived, and assigned to the FIFO queue 508 for a recognition unit so that its total expected response time is as close as possible to the other recognition units. In an easy-first strategy, images are removed from the FIFO queue 508 in an order determined by their expected completion times—images with the smallest expected completion times are assigned to the first available recognition unit. In this way, users are rewarded with faster response time when they submit an image that's easy to recognize. This could incentivize users to carefully select the images they submit. Other queue management strategies are possible.

Acquisition Unit 406

Figure 6A:
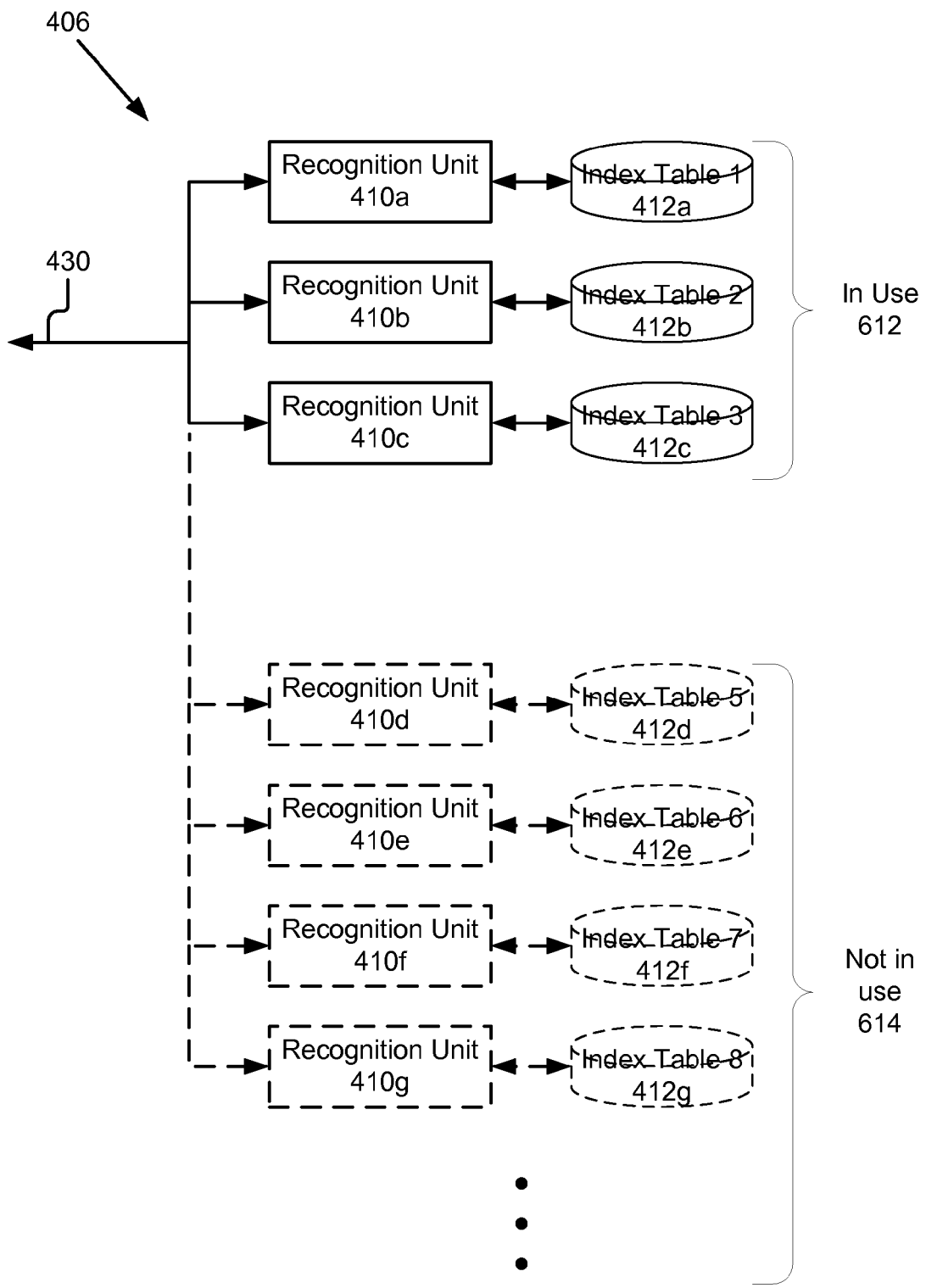
FIG. 6A is a block diagram of a first embodiment of an image retrieval unit in accordance with the present invention.
Figure 6B:
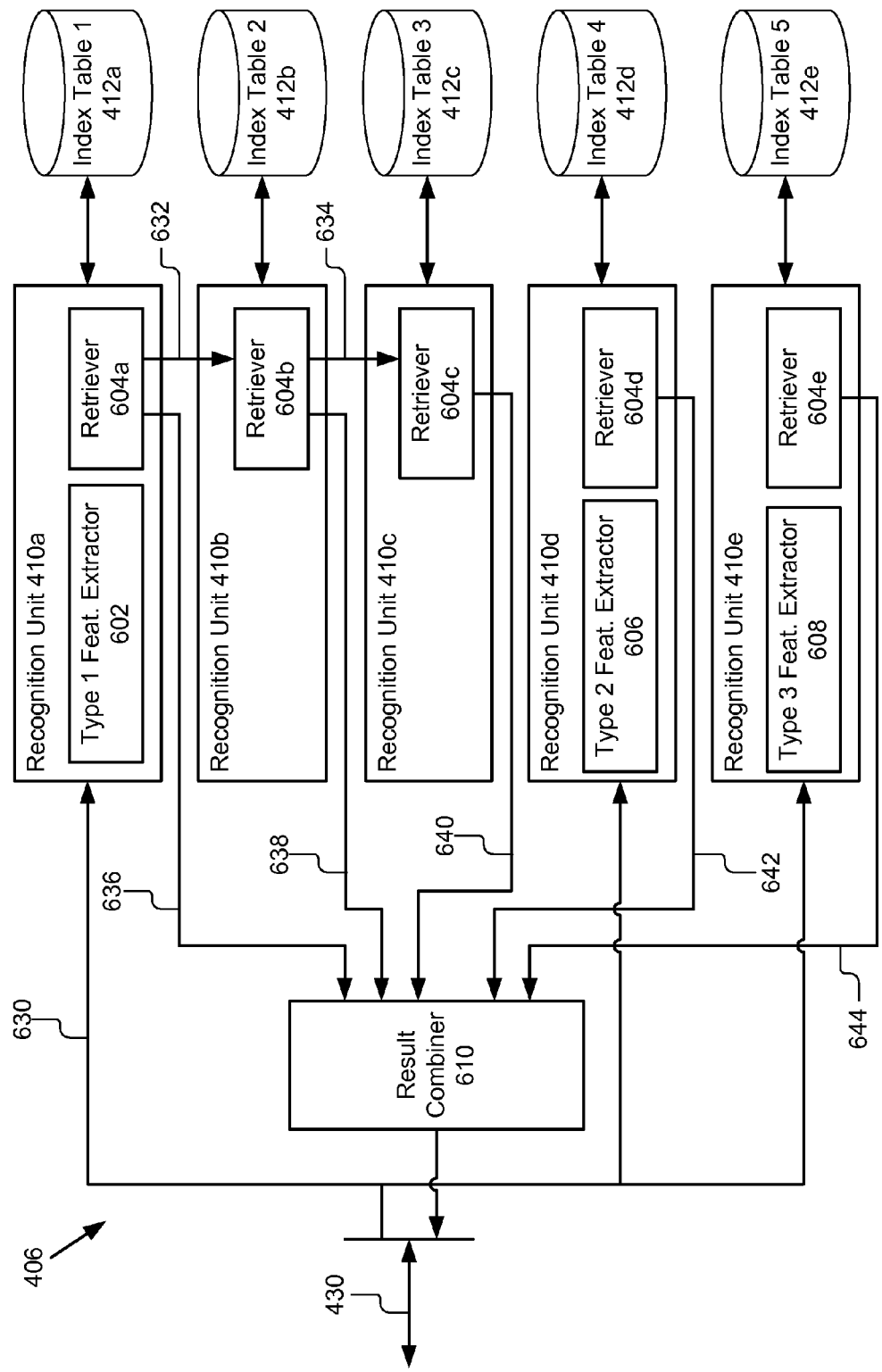
FIG. 6B is a block diagram of a second embodiment of the image retrieval unit in accordance with the present invention.

Referring now to FIGS. 6A and 6B, embodiments of the acquisition unit 406 will be described.

FIG. 6A illustrates one embodiment for the acquisition unit 406 where the recognition unit 410 and index table 412 pairs are partitioned based on whether the classifiers they contain are in use 612 as the current classifier set. As shown in FIG. 6A, the acquisition unit 406 comprises a plurality of recognition units 410a-g and a plurality of index tables 412a-g. The plurality of recognition units 410a-g is coupled to signal line 430 to receive image queries from the dispatcher 402. Each of the plurality of recognition units 410a-g is coupled to a corresponding index table 412a-g, and is associated with a particular classifier. The recognition units 410 extract features from the image query and compare those image features to the features stored in the index table according to the classifier to identify a matching page and location on that page. Various aspects of classifier selection and updating are described in conjunction with FIGS. 10-15B.

Example recognition and retrieval systems and methods are disclosed in U.S. patent application Ser. No. 11/461,017, titled "System And Methods For Creation And Use Of A Mixed Media Environment," filed Jul. 31, 2006, U.S. patent application Ser. No. 11/461,279, titled "Method And System For Image Matching In A Mixed Media Environment," filed Jul. 31, 2006; U.S. patent application Ser. No. 11/461,286, titled "Method And System For Document Fingerprinting Matching In A Mixed Media Environment," filed Jul. 31, 2006; U.S. patent application Ser. No. 11/461,294, titled "Method And System For Position-Based Image Matching In A Mixed Media Environment," filed Jul. 31, 2006; U.S. patent application Ser. No. 11/461,300, titled "Method And System For Multi-Tier Image Matching In A Mixed Media Environment," filed Jul. 31, 2006; U.S. patent application Ser. No. 11/461,147, titled "Data Organization and Access for Mixed Media Document System," filed Jul. 31, 2006; U.S. patent application Ser. No. 11/461,164, titled "Database for Mixed Media Document System," filed Jul. 31, 2006; U.S. patent application Ser. No. 11/461,109, titled "Searching Media Content For Objects Specified Using Identifiers," filed Jul. 31, 2006; U.S. patent application Ser. No. 12/059,583, titled "Invisible Junction Feature Recognition For Document Security Or Annotation," filed Mar. 31, 2008; U.S. patent application Ser. No. 12/121,275, titled "Web-Based Content Detection In Images, Extraction And Recognition," filed May 15, 2008; U.S. patent application Ser. No. 11/776,510, titled "Invisible Junction Features For Patch Recognition," filed Jul. 11, 2007; U.S. patent application Ser. No. 11/776,520, titled "Information Retrieval Using Invisible Junctions and Geometric Constraints," filed Jul. 11, 2007; U.S. patent application Ser. No. 11/776,530, titled "Recognition And Tracking Using Invisible Junctions," filed Jul. 11, 2007; and U.S. patent application Ser. No. 11/777,142, titled "Retrieving Documents By Converting Them to Synthetic Text," filed Jul. 12, 2007; and U.S. patent application Ser. No. 11/624,466, titled "Synthetic Image and Video Generation From Ground Truth Data," filed Jan. 18, 2007; which are incorporated by reference in their entirety.

As shown in FIG. 6A, the recognition unit 410/index table 412 pairs are grouped into two general categories: index tables 412 with classifiers currently in use 612 (412 a-c), and index tables 412 with classifiers not currently in use 614 (412*d-g*). It should be noted that the use of three recognition units 410 and index tables 412 as the first group 612 is merely by way example and used demonstrate a relative proportion as compared with the number of recognition units 410 and index tables 412 in the second group 614. The number of recognition units 410 and index tables 412 in any particular group 612, 614 may be modified based on the total number of recognition units 410 and index tables 412. Furthermore, the number of recognition units 410 and index tables 412 in any particular group 612, 614, may be adapted so that it matches the profile of all users sending retrieval request to the acquisition unit 406 for a given publication.

FIG. 6B illustrates a second embodiment for the acquisition unit 406 wherein the recognition units 410 and index tables 412 are partitioned based upon the type of recognition algorithm they implement. In the second embodiment, the recognition units 410 are also coupled such that the failure of a particular recognition unit to generate a registration result causes the input image query to be sent to another recognition unit for processing. Furthermore, in the second embodiment, the index tables 412 include feature sets that are varied according to different device and environmental factors of image capture devices (e.g., blur, etc.).

The second embodiment of the acquisition unit 406 includes a plurality of recognition units 410*a*-410*e*, a plurality of the index tables 412*a*-412*e* and a result combiner 610. In this embodiment, the recognition units 410*a*-410*e* each utilize a different type of recognition algorithm. For example, recognition units 410*a*, 410*b*, and 410*c* use a first recognition algorithm; recognition unit 410*d* uses a second recognition algorithm; and recognition unit 410*e* uses a third recognition algorithm for recognition and retrieval of page numbers and locations. Recognition units 410*a*, 410*d*, and 410*e* each have an input coupled signal line 430 by signal line 630 for receiving the image query. The recognition results from each of the plurality of recognition units 410*a*-410*e* are sent via signal lines 636, 638, 640, 642, and 644 to the result combiner 610. The output of the result combiner 610 is coupled to signal line 430.

In one embodiment, the recognition units 410*a*, 410*b*, and 410*c* cooperate together with index tables 1, 2, and 3, 412*a*-412*c* each storing image features corresponding to the same pages but with various modifications, e.g., due to different device and environmental factors. For example, index table 1 412*a* may store image features for pristine images of pages such as from a PDF document, while index table 2 412*b* stores images of the same pages but with a first level of modification, and index table 3 412*c* stores images of the same pages but with a second level of modification. In one embodiment, the index tables 1, 2, and 3, 412*a*-412*c* are quantization trees. The first recognition unit 410*a* receives the image query via signal line 630. The first recognition unit 410*a* comprises a first type of feature extractor 602 and a retriever 604*a*. The first type of feature extractor 602 receives the image query, extracts the Type 1 features, and provides them to the retriever 604*a*. The retriever 604*a* uses the extracted Type 1 features and compares them to the index table 1 412*a*. If the retriever 604*a* identifies a match, the retriever 604*a* sends the recognition results via signal line 636 to the result combiner 610. If however, the retriever 604*a* was unable to identify a match or identifies a match with low confidence, the retriever 604*a* sends the extracted Type 1 features to the retriever 604*b* of the second recognition unit 410*b* via signal line 632. It should be noted that since the Type 1 features already have been extracted, the second recognition unit 410*b* does not require a feature extractor 602. The second recognition unit 410*b* performs retrieval functions similar to the first recognition unit 410*a*, but cooperates with index table 2 412*b* that has Type 1 features for slightly blurry images. If the retriever 604*b* identifies a match, the retriever 604*b* sends the recognition results via signal line 638 to the result combiner 610. If the retriever 604*b* of the second recognition unit 410*b* is unable to identify a match or identifies a match with low confidence, the retriever 604*b* sends the extracted features to the retriever 604*c* of the third recognition unit 410*b* via signal line 634. The retriever 604*c* then performs a similar retrieval function but on index table 3 412*c*. Those skilled in the art will understand that while one pristine set of images and two levels of modification are provided, this is only by way of example and that any number of additional levels of modification from 0 to n may be used.

The recognition units 410*d* and 410*e* operate in parallel with the other recognition units 410*a-c*. The fourth recognition unit 410*d* comprises a second type of feature extractor 606 and a retriever 604*d*. The Type 2 feature extractor 606 received the image query, possibly with other image information, parses the bounding boxes or other feature identifiers, and generates Type 2 coding features. These Type 2 features are provided to the retriever 604d and the retriever 604d compares them to the features stored in index table 4 412d. In one embodiment, index table 4 412d is a hash table. The retriever 604d identifies any matching pages and returns the recognition results to the result combiner 610 via signal line 642. The fifth recognition unit 410e operates in a similar manner but for a third type of feature extraction. The fifth recognition unit 410e comprises a Type 3 feature extractor 608 and a retriever 604e. The Type 3 feature extractor 608 receives the image query, possibly with other image information, or other feature identifiers, parses the image and generates Type 3 features and the features that are provided to the retriever 604e and the retriever 604e compares them to features stored in the index table 5 412e. In one embodiment, the index table 5 412e is a SQL database of character strings. The retriever 604e identifies any matching strings and returns the recognition results to the result combiner 610 via signal line 644. In one exemplary embodiment the three types of feature extraction include the invisible junction recognition algorithm, brick wall coding, and path coding.

The result combiner 610 receives recognition results from the plurality of recognition units 410a-e and produces one or a small list of matching results. In one embodiment, each of the recognition results includes an associated confidence factor. In another embodiment, context information such as date, time, location, personal profile, or retrieval history is provided to the result combiner 610. These confidence factors along with other information are used by the result combiner 610 to select the recognition results most likely to match the input image query. The above described embodiments are not meant to be exclusive or limiting, and may be combined according to other embodiments.

Image Registration Unit 408

Figure 7A:
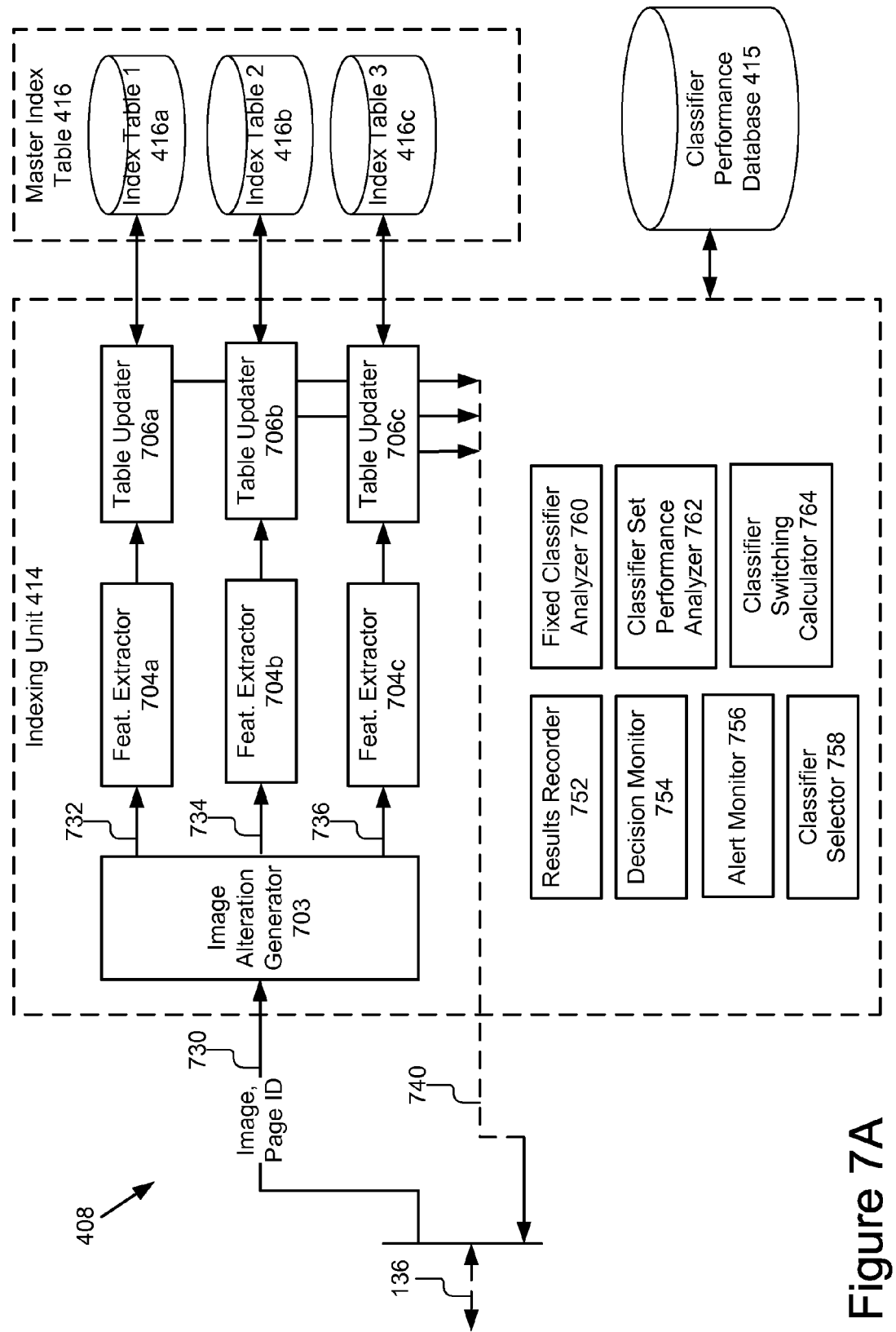
FIGS. 7A-7B are block diagrams of two exemplary embodiments of a registration unit in accordance with the present invention.

FIG. 7A shows an embodiment of the image registration unit 408. The image registration unit 408 comprises an indexing unit 414, a classifier performance database 415, and a master index table 416. The indexing unit 414 comprises an image alteration generator 703, a plurality of feature extractors 704a-c, modules 752-764, and a plurality of master index tables 416a-c. The image registration unit 408 also includes other control logic (not shown) that controls the updating of the index tables 412 from the master index table 416. The image registration unit 408 can update the index tables 412 of the acquisition unit 406 in a variety of different ways based on various criteria such performing updates on a periodic basis, performing updates when new content is added, performing updates based on usage, performing updates for storage efficiency, etc.

The classifier performance database 415 stores classifier set information and associated performance data for the classifiers sets as a group and as individual classifiers, including decision percentages for each classifier, an interval specification for specific time range, a pointer to the image queries associated with the internal, a classifier identification, and the listed decisions for the image query, such as identity, confidence value, and run time. The performance data for a set of classifiers includes percent correctly identified image queries, percent rejected in each queries, and percent error produced by the classifiers, as well as over all run time and time spent in each classifier.

The image alteration generator 703 of the indexing unit 414 has an input coupled in signal line 730 to receive an image and a page identification number. The image alteration generator 703 has a plurality of outputs and each output is coupled by signal lines 732, 734, and 736 to feature extractors 704a-c, respectively. The image alteration generator 703 passes a pristine image and the page identification number to the output and signal line 732. The image alteration generator 703 then generates a first altered image and outputs it and the page identification number on signal line 734 to feature extractor 704b, and a second altered image, altered differently than the first altered image, and outputs it and page identification number on signal line 736 to feature extractor 704c.

The feature extractors 704 receive the image and page ID, extract the features from the image and send them along with the page ID to a respective index table updater 706. The outputs of the plurality of feature extractors 704a-c are coupled to the plurality of index table updaters 706a-c. For example, the output of feature extractor 704a is coupled to an input of index table updater 706a. The remaining feature extractors 704b-c are similarly coupled to respective index table updaters 706b-c. The index table updaters 706 are responsible for formatting the extracted features and storing them in a corresponding master index table 416. While the master index table 416 is shown as three separate master index tables 416a-c, those skilled in the art will recognize that all the master index tables could be combined into a single master index table or into a few master index tables. In the embodiment including the MMR publisher 108, once the index table updaters 706 have stored the extracted features in the index table 416, they issue a confirmation signal that is sent via signal lines 740 and 136 back to the MMR publisher 108.

The indexing unit 414 further comprises a results recorder 752, a decision monitor 754, an alert monitor 756, a classifier selector 758, a fixed classifier analyzer 760, a classifier set performance analyzer 762, and a classifier switching calculator 764.

Figure 10:
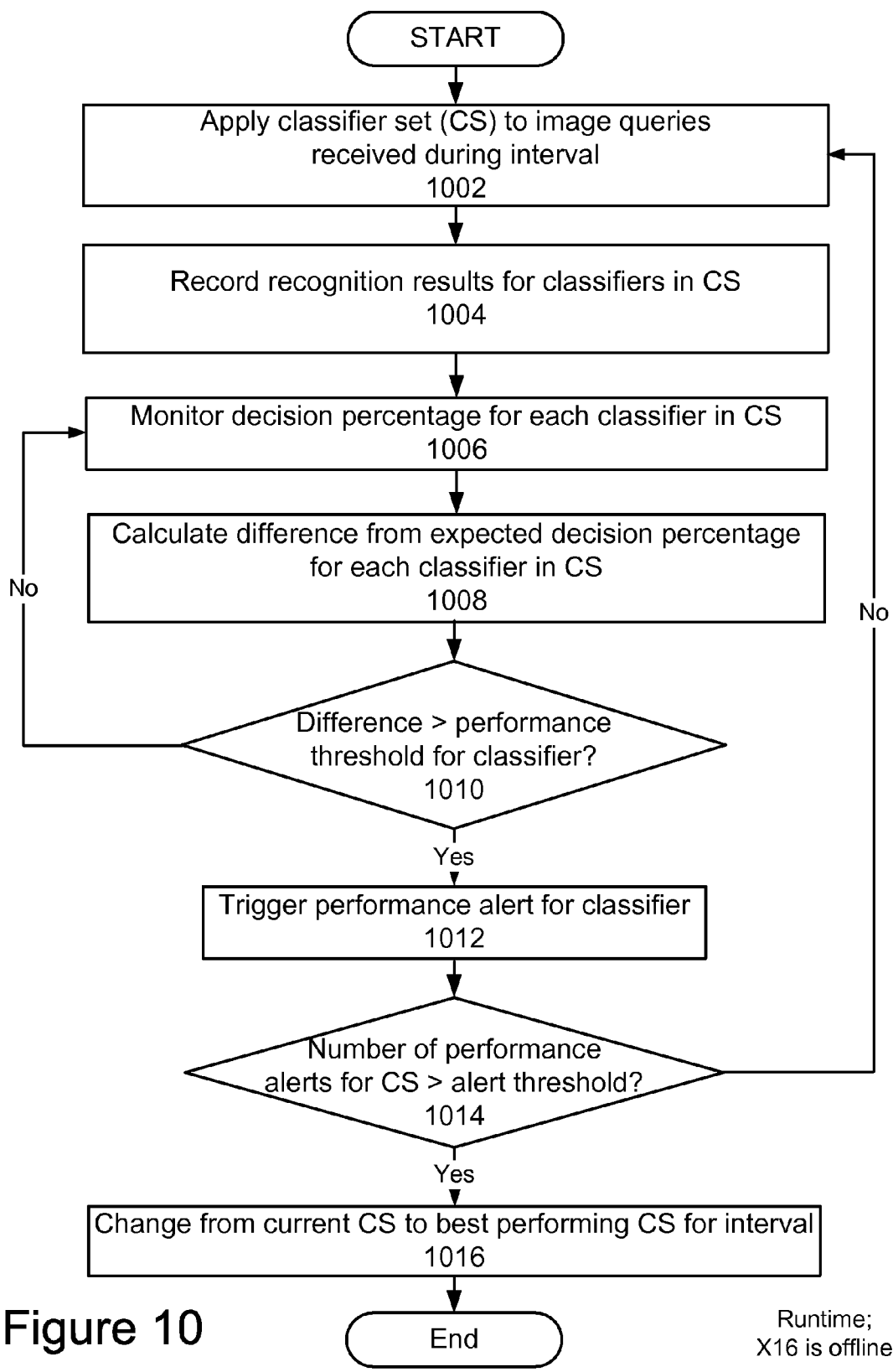
FIG. 10 is a flowchart showing a method for monitoring online performance of a multiple classifier image recognition system according to one embodiment of the present invention.

The results recorder 752 is software and routines for receiving and recording the results of the recognition according to a classifier set, e.g., as part of a method for monitoring online performance of a multiple-classifier image recognition system discussed in FIG. 10 according to one embodiment. The results may be received via dynamic load balancer 418. The recognition results may include, in addition to page identification and x, y location on the page where the image query occurs, the time when each image query arrived, metadata associated with the image query, e.g., model of camera used, optical characteristics of the camera, identifying information such as mobile device 102 owner, identification number for the mobile device 102, identities of the classifiers that provided decisions, and the classifier architecture used.

The decision monitor 754 is software and routines for monitoring decision percentages for the classifiers and comparing them to expected decision percentages for the classifiers. The alert monitor 756 triggers alerts to the system controller when various thresholds are exceeded. For example, if the difference between the actual and expected decision percentages exceed a predetermined threshold for a subinterval, an alert is triggered. Also, an alert is triggered when too many alerts are triggered during a short period of time such that they exceed an alert threshold.

Figure 12:
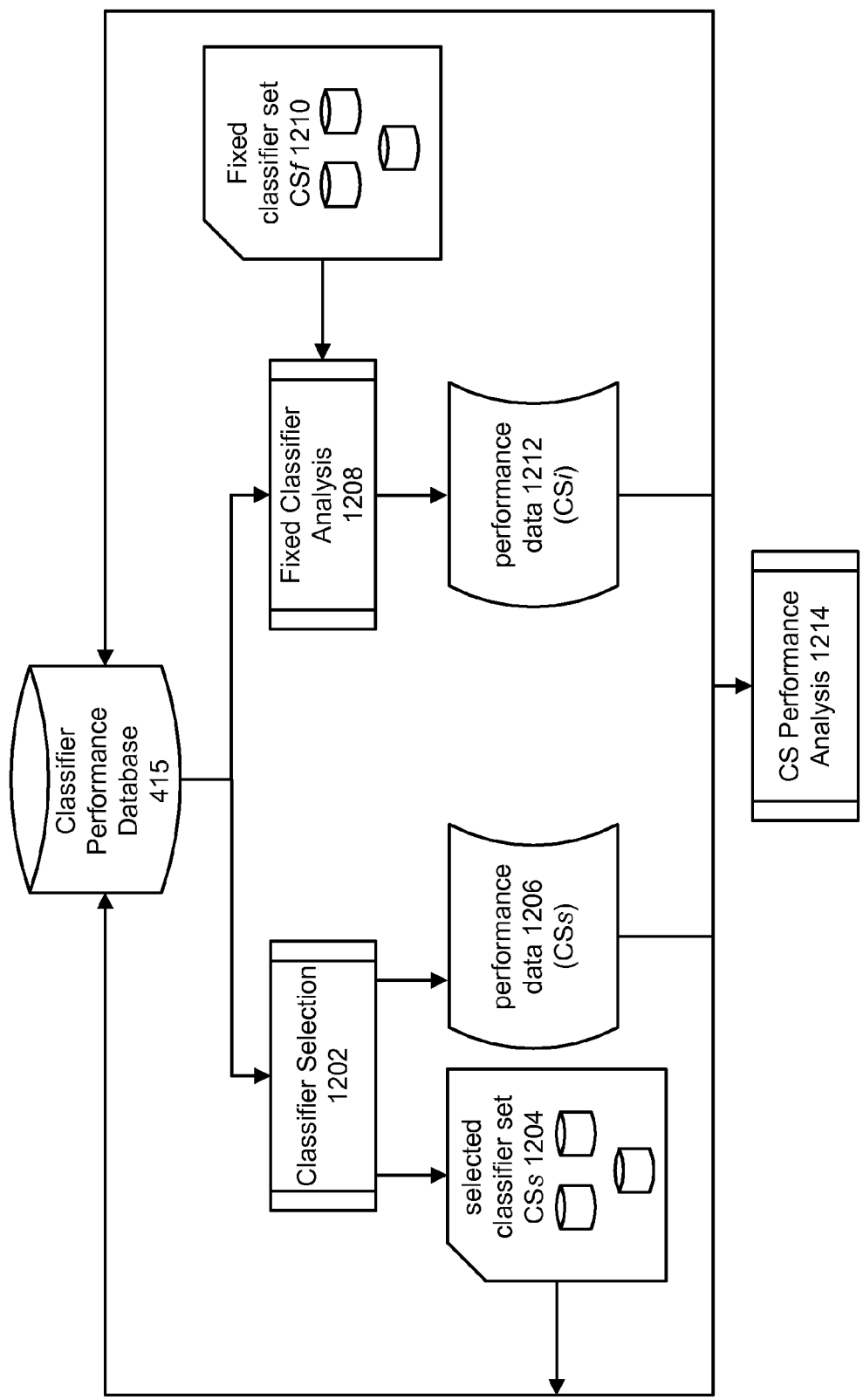
FIG. 12 is a flow diagram showing a conceptual model for classifier selection and comparison according to one embodiment of the present invention.
Figure 13A:
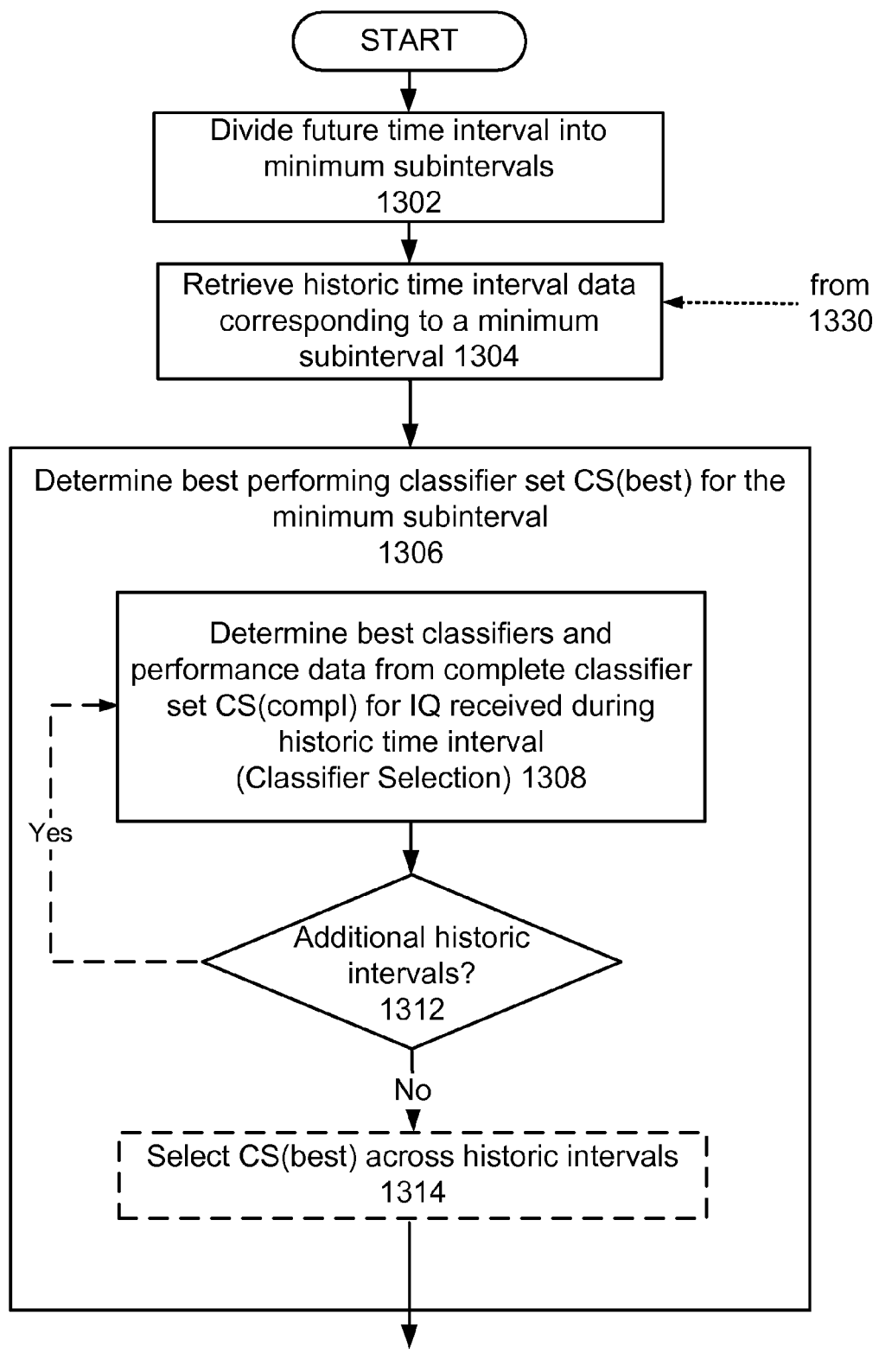
FIGS. 13A-13B show a flowchart of a method of offline classifier set prediction according to one embodiment of the present invention
Figure 13B:
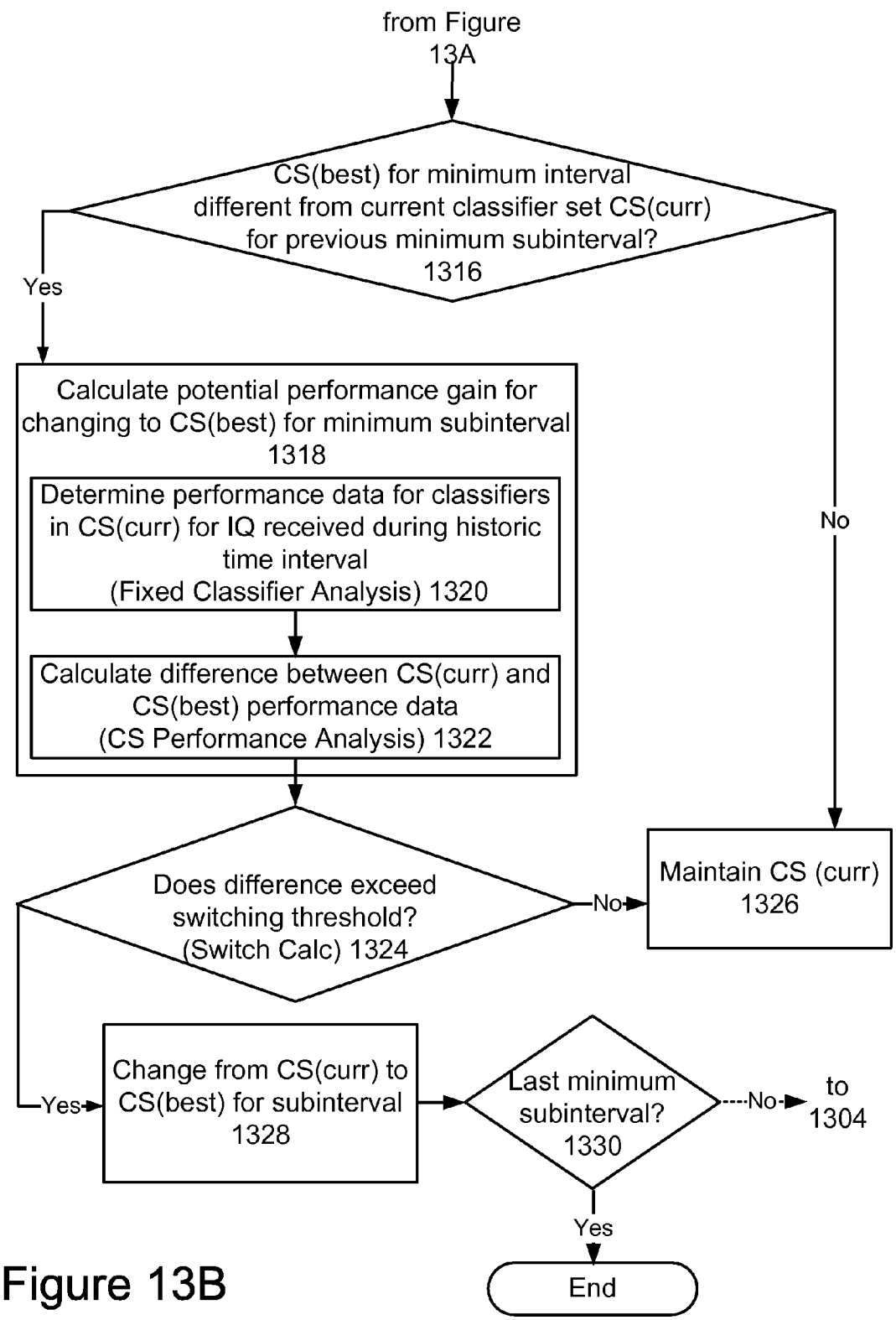

The classifier selector 758 is software and routines for performing the classifier selection process described in conjunction with FIGS. 12 and 13A-13B. The classifier selection process determines a set of classifiers for a set of image queries, and the performance data for the set of classifiers, by applying all available classifiers to the set of image queries. The performance data for the selected set includes percent correctly identified image queries, percent rejected, and percent error produced by the classifiers, as well as over all run time and time spent in each classifier.

The fixed classifier analyzer 760 is software and routines for performing the fixed classifier analysis described in conjunction with FIGS. 12 and 13-A-13B. The fixed classifier analyzer 760 applies a fixed set of classifiers to a set of image queries received during an interval, and outputs performance data associated with the fixed set of classifiers. The performance data includes percent correct, percent rejected, percent error, and run times The classifier set performance analyzer 762 is software and routines for performing the classifier set performance analysis as described in conjunction with FIGS. 12 and 13A-13B. The classifier set performance analysis compares the selected classifier set and its performance data with the fixed classifier set and its performance data. The classifier set performance analysis computes a distance measure between the respective performances of two classifier sets on the same set of image queries. This distance measure takes into account the algorithmic performance and the run times.

A classifier switching calculator 764 is software and routines for performing the classifier switching calculation described in conjunction with FIGS. 13A-13B. From the classifier set performance analysis on the classifier sets, the resulting best classifier set for the interval is compared to the classifier set for the previous interval to determine whether a change in classifier sets should be made.

Figure 7B:
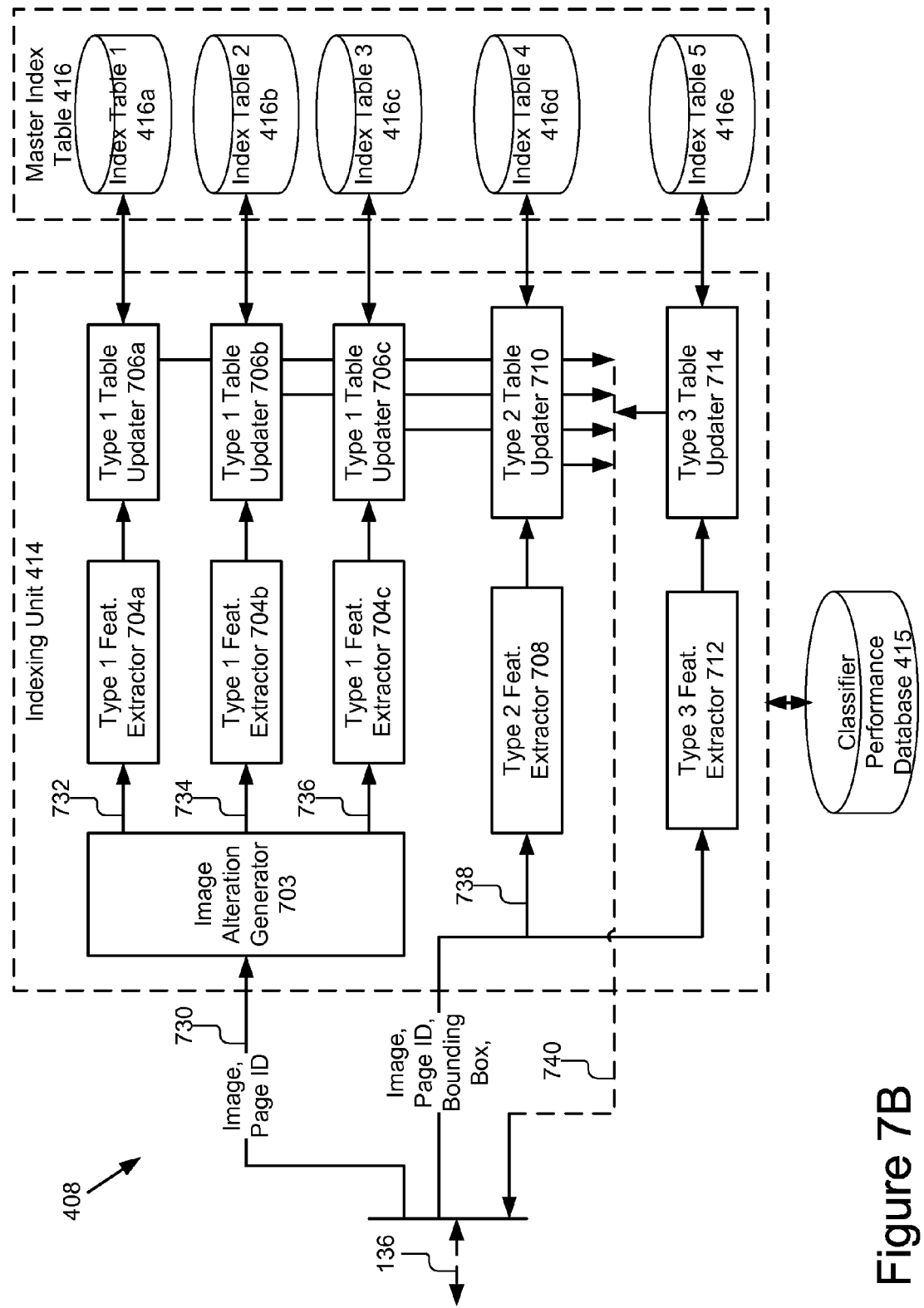

FIG. 7B shows an embodiment of the image registration unit 408. The image registration unit 408 comprises an image alteration generator 703, a plurality of Type 1 feature extractors 704a-c, a plurality of Type 1 index table updaters 706a-c, a Type 2 feature extractor 708, a Type 2 index table updater 710, a Type 3 feature extractor 712, a Type 3 index table updater 714 and a plurality of master index tables 416a-e. The image registration unit 408 also includes other control logic (not shown) that controls the updating of the working index tables 412 from the master index table 416. The image registration unit 408 can update the index tables 412 of the acquisition unit 406 in a variety of different ways based on various criteria such performing updates on a periodic basis, performing updates when new content is added, performing updates based on usage, performing updates for storage efficiency, etc.

The image alteration generator 703 has an input coupled in signal line 730 to receive an image and a page identification number. The image alteration generator 703 has a plurality of outputs and each output is coupled by signal lines 732, 734, and 736 to Type 1 extractors 704a-c, respectively. The image alteration generator 703 passes a pristine image and the page identification number to the output and signal line 732. The image alteration generator 703 then generates a first altered image and outputs it and the page identification number on signal line 734 to Type 1 feature extractor 704b, and a second altered image, altered differently than the first altered image, and outputs it and page identification number on signal line 736 to Type 1 feature extractor 704c.

The Type 1 feature extractors 704 receive the image and page ID, extract the Type 1 features from the image and send them along with the page ID to a respective Type 1 index table updater 706. The outputs of the plurality of Type 1 feature extractors 704a-c are coupled to input of the plurality of Type 1 index table updaters 706a-c. For example, the output of Type 1 feature extractor 704a is coupled to an input of Type 1 index table updater 706a. The remaining Type 1 feature extractors 704b-c are similarly coupled to respective Type 1 index table updaters 706b-c. The Type 1 index table updaters 706 are responsible for formatting the extracted features and storing them in a corresponding master index table 416. While the master index table 416 is shown as five separate master index tables 416a-e, those skilled in the art will recognize that all the master index tables could be combined into a single master index table or into a few master index tables. In the embodiment including the MMR publisher 108, once the Type 1 index table updaters 706 have stored the extracted features in the index table 416, they issue a confirmation signal that is sent via signal lines 740 and 136 back to the MMR publisher 108.

The Type 2 feature extractor 708 and the Type 3 feature extractor 712 operate in a similar fashion and are coupled to signal line 738 to receive the image, a page identification number, and bounding box information. The Type 2 feature extractor 708 extracts information from the input needed to update its associated index table 416d. The Type 2 index table updater 710 receives the extracted information from the Type 2 feature extractor 708 and stores it in the index table 416d. The Type 3 feature extractor 712 and the Type 3 index table updater 714 operate in a like manner but for Type 3's feature extraction algorithm. The Type 3 feature extractor 712 also receives the image, a page number, and bounding box information via signal line 738. The Type 3 feature extractor 712 extracts Type 3 information and passes it to the Type 3 index table updater 714. The Type 3 index table updater 714 stores the information in index table 5 416e. The architecture of the registration unit 408 is particularly advantageous because it provides an environment in which the index tables can be automatically updated, simply by providing images and page numbers to the image registration unit 408. According to one embodiment, Type 1 feature extraction is invisible junction recognition, Type 2 feature extraction is brick wall coding, and Type 3 feature extraction is path coding.

Figure 8:
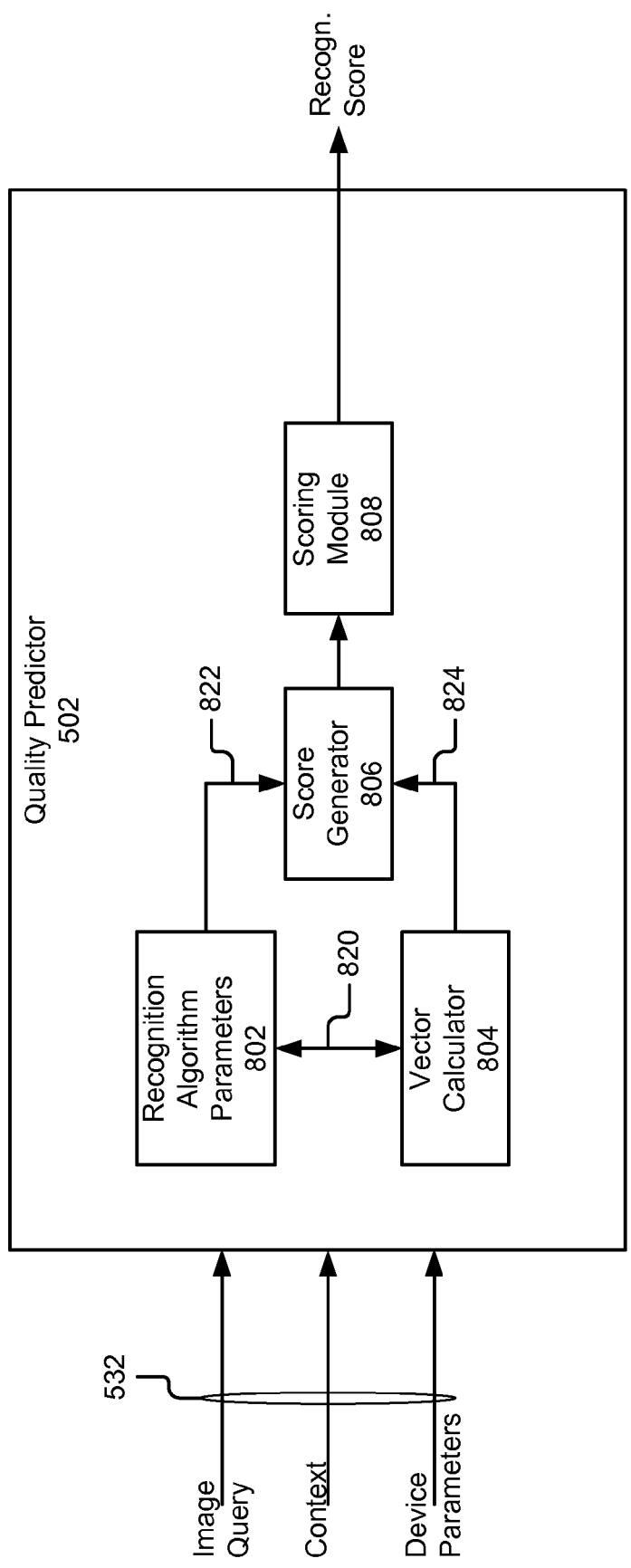
FIG. 8 is a block diagram of an embodiment of a quality predictor in accordance with the present invention.

As shown in FIG. 8, one embodiment of the quality predictor 502 comprises recognition algorithm parameters 802, a vector calculator 804, a score generator 806 and a scoring module 808. The quality predictor 502 has inputs coupled to signal line 532 to receive an image query, context and metadata, and device parameters. The image query may be video frames, a single frame or image features. The context and metadata includes time, date, location, environmental conditions, etc. The device parameters include brand, type, macro block on/off, gyro or accelerometer reading, aperture, time, exposure, flash, etc. Additionally, the quality predictor 502 uses certain parameters of the recognition algorithm parameters 802. These parameters of the recognition algorithm parameters 802 can be provided to the quality predictor 502 from the acquisition unit 406 or the image registration unit 408. The vector calculator 804 computes quality feature vectors from the image to measure its content and distortion, such as its blurriness, existence and amount of recognizable features, its luminosity, etc. The vector calculator 804 computes any number of quality feature vectors from one to n. In some cases, the vector calculator 804 requires knowledge of the recognition algorithm(s) to be used, and the vector calculator 804 is coupled by signal line 820 to the recognition algorithm parameters 802. For example, if an Invisible Junctions algorithm is employed, the vector calculator 804 computes the number of junction points in the image as a measure of its recognizability. All or some of these computed features are then input to score generator 806 via signal line 824. The score generator 806 is also coupled by signal line 822 to receive recognition parameters for the recognition algorithm parameters 802. The output of the score generator 806 is provided to the scoring module 808. The scoring module 808 generates a recognition score using the recognition scores provided by the score generator 806 and applies weights to those scores. In one embodiment, the result is a single recognizability score. In another embodiment, the result is a plurality of recognizability scores ranked from highest to lowest.

Methods

Figure 9:
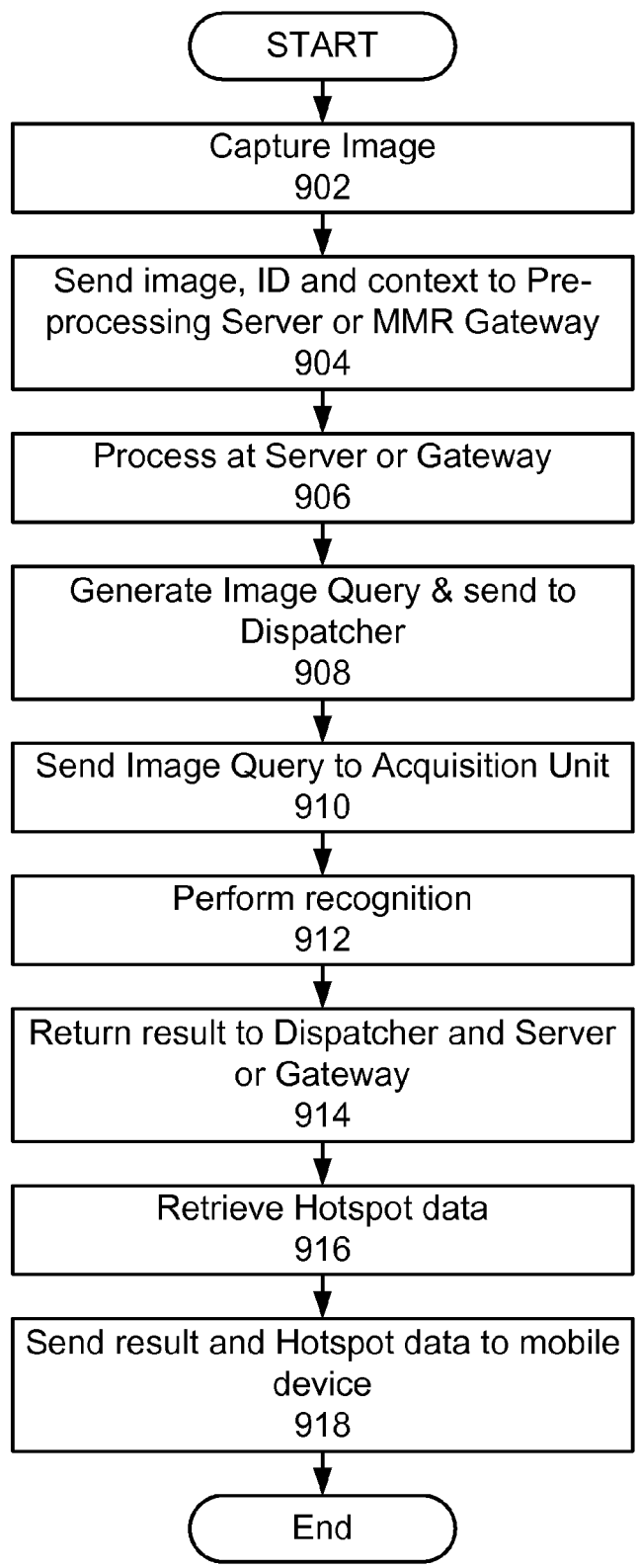
FIG. 9 is a flowchart of an embodiment of a method for retrieving a document and location from an input image in accordance with the present invention.

FIG. 9 is a flowchart of a general method for generating and sending a retrieval request and processing the retrieval request with an MMR system 100. The method begins with the mobile device 102 capturing 902 an image. A retrieval request that includes the image, a user identifier, and other context information is generated by the mobile device 102 and sent 904 to the pre-processing server 103 or MMR gateway 104. The pre-processing server 103 or MMR gateway 104 processes 906 the retrieval request by extracting the user identifier from the retrieval request and verifying that it is associated with a valid user. The pre-processing server 103 or MMR gateway 104 also performs other processing such as recording the retrieval request in the log 310, performing any necessary accounting associated with the retrieval request and analyzing any MMR analytics metrics. Next, the pre-processing server 103 or MMR gateway 104 generates 908 an image query and sends it to the dispatcher 402. The dispatcher 402 performs load-balancing and sends the image query to the acquisition unit 406. In one embodiment, the dispatcher 402 specifies the particular recognition unit 410 of the acquisition unit 406 that should process the image query. Then the acquisition unit 406 performs 912 image recognition to produce recognition results. The recognition results are returned 914 to the dispatcher 402 and in turn the pre-processing server 103 or MMR gateway 104. The recognition results are also used to retrieve 916 hotspot data corresponding to the page and location identified in the recognition results. Finally, the hotspot data and the recognition results are sent 918 from the pre-processing server 103 or MMR gateway 104 to the mobile device 102.

Referring now to FIG. 10, a method for monitoring online performance of the multiple-classifier image recognition system is shown according to one embodiment of the present invention. In general, the method monitors classifier performance during an interval of time, and triggers alerts if actual performance deviates from the expected performance for a classifier. The method begins by applying 1002 a classifier set to image queries received during a time interval. A classifier set includes multiple index tables 412, each corresponding to a classifier, e.g., as discussed in conjunction with FIG. 6A. As image queries are received by the acquisition unit 406, they are processed according to the classifiers associated with each index table 412. The recognition results produced by the classifiers are recorded 1004, e.g. in classifier performance database 415. According to one embodiment, in addition to the page identification and x, y location on the page where the image query occurs, the results include the time when each image query arrived, metadata associated with the image query, e.g., model of camera used, optical characteristics of the camera, identifying information such as mobile device 102 owner, identification number for the mobile device 102, identities of the classifiers that provided decisions, and the classifier architecture used. In addition, decision percentages for each classifier in the classifier set, i.e., what percentage of all image queries are processed by that classifier, are monitored 1006, e.g. by indexing unit 414.

Using an expected decision percentage for each classifier and the classifier set, the indexing unit 414 calculates 1008 the difference between the monitored decision percentage and an expected decision percentage. The expected decision percentage may be determined from stored classifier performance data resulting from a classifier selection process, as discussed in conjunction with FIG. 12. For example, the performance data may be stored in classifier performance database 415. Next, the indexing unit 414 determines 1010 whether the calculated difference is greater than the performance threshold for the classifier. If the difference is not greater, the process returns to step 1006, and monitoring continues. If the difference is greater than the performance threshold for the classifier, a performance alert is triggered 1012 for the classifier. The indexing unit 414 may further keep a record of performance alerts.

It is then determined 1014 whether the number of performance alerts for the classifier set is greater than an alert threshold. If it is not greater, the process returns to step 1002 and the classifier set continues to be applied. If the number of performance alerts is greater than the threshold, the indexing unit 414 may propagate a change 1016 from the current classifier set to a best performing classifier set for the interval. According to one embodiment, the best performing classifier set for the interval is determined in a similar manner as discussed in conjunction with FIGS. 12 and 13A-13B, except that it occurs online. In this example, a switching cost associated with the change from the current classifier set to the best performing classifier set could be lowered to propagate the change 1016.

Figure 11:
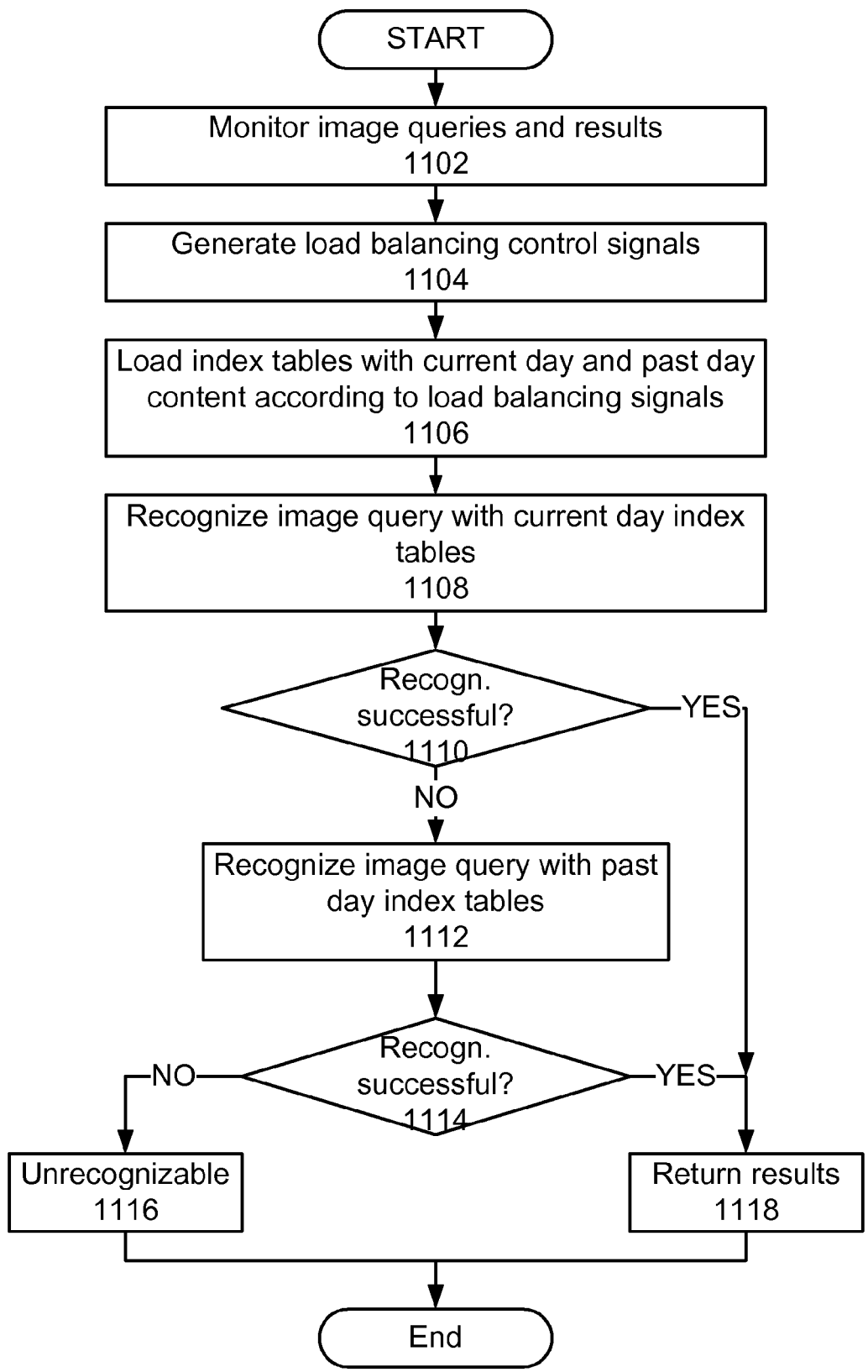
FIG. 11 is a flowchart showing a method for dynamic load balancing according to one embodiment of the present invention.

Referring now to FIG. 11, a method for dynamic load balancing according to one embodiment is described. This method relates generally to the operations performed by the dynamic load balancer 418 of FIG. 4A. The method begins by monitoring 1102 image queries and recognition results transferred between the dispatcher 402 and the acquisition unit 406 on signal line 430. The dynamic load balancer 418 monitors the image queries and corresponding recognition results for some pre-defined period such as a day. In particular, the actual distribution of images successfully found and in which index tables 412a-n they were found is monitored. The dynamic load balancer 418 generates 1104 load balancing control signals specifying a configuration for the working index tables 412a-n of the acquisition unit 406. For example, based on usage measured by the dynamic load balancer 418 for the prior day, expected usage can be predicted and the working index tables 412a-n of the acquisition unit 406 loaded with content appropriately. For example, n index tables are loaded with the newspaper content for the current day while m index tables are loaded with the newspaper content of past days. Thus there are a total of n+m servers. Based on past history, the present invention t expects n/(n+m) queries will be for the newspaper of the current day. The indexing unit 414 of the image registration unit 408 then receives new images for the current day's newspaper. Based upon the generated load balancing signals generated in step 1104, some (e.g., n) of the working index tables 412a-n are loaded with the new images while the existing information in the working index tables 412a-n are reconfigured such that they can be stored in the remaining (e.g., m=all working index tables−n) working index tables 412a-n that are not utilized to store the new images.

In one embodiment, operation of the acquisition unit 406 is modified or optimized to match the configuration of the working index tables 412a-n. In particular, the acquisition unit 406 upon receiving an image query, first attempts to recognize 1108 the image query with recognition units 410 and index tables 412 configured with the images of the current day's newspaper. Next, the method determines 1110 whether recognition was successful. If so the method returns 1118 the result and the method is complete. If not, the method attempts to recognize 1112 the image query with recognition units 410 and index tables 412 configured with images of past days newspapers. Again the method determines 1114 whether recognition was successful. If so, the method returns 1118 the result and the method is complete. If not, the method returns 1116 a signal indicating that recognition was unsuccessful and the method is complete. While the load balancing method was described above with reference to use of a periodic division of the data for a newspaper, those skilled in the art will understand that the load-balancing method may be applied for dividing the data based on any other usage criteria and that the image data may be any type of images other than newspapers.

Figure 15A:
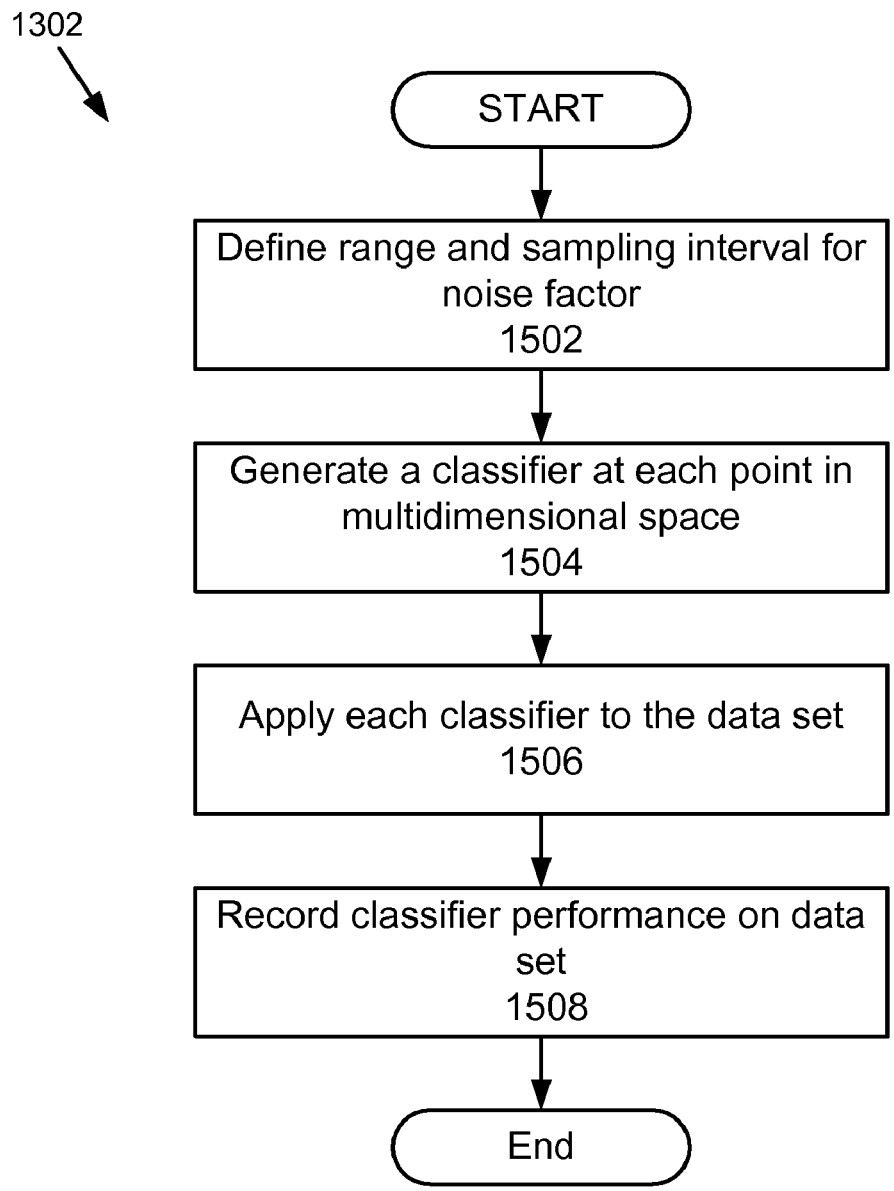
FIGS. 15A-15B are flowcharts showing two exemplary embodiments of methods for initialization and generation of classifiers.

Referring now to FIG. 15A, a generalized version of a method for initialization and generation of the classifier is shown. The method begins by defining 1502 a range and sampling interval for the noise factors (e.g., focus blur, motion blur, dynamic range, etc.). This method generates 1504 a classifier at each point in a multidimensional space. Each classifier is then applied 1506 to the data set (DT). Finally, a performance of the classifier on the data set is recorded 1508.

Figure 15B:
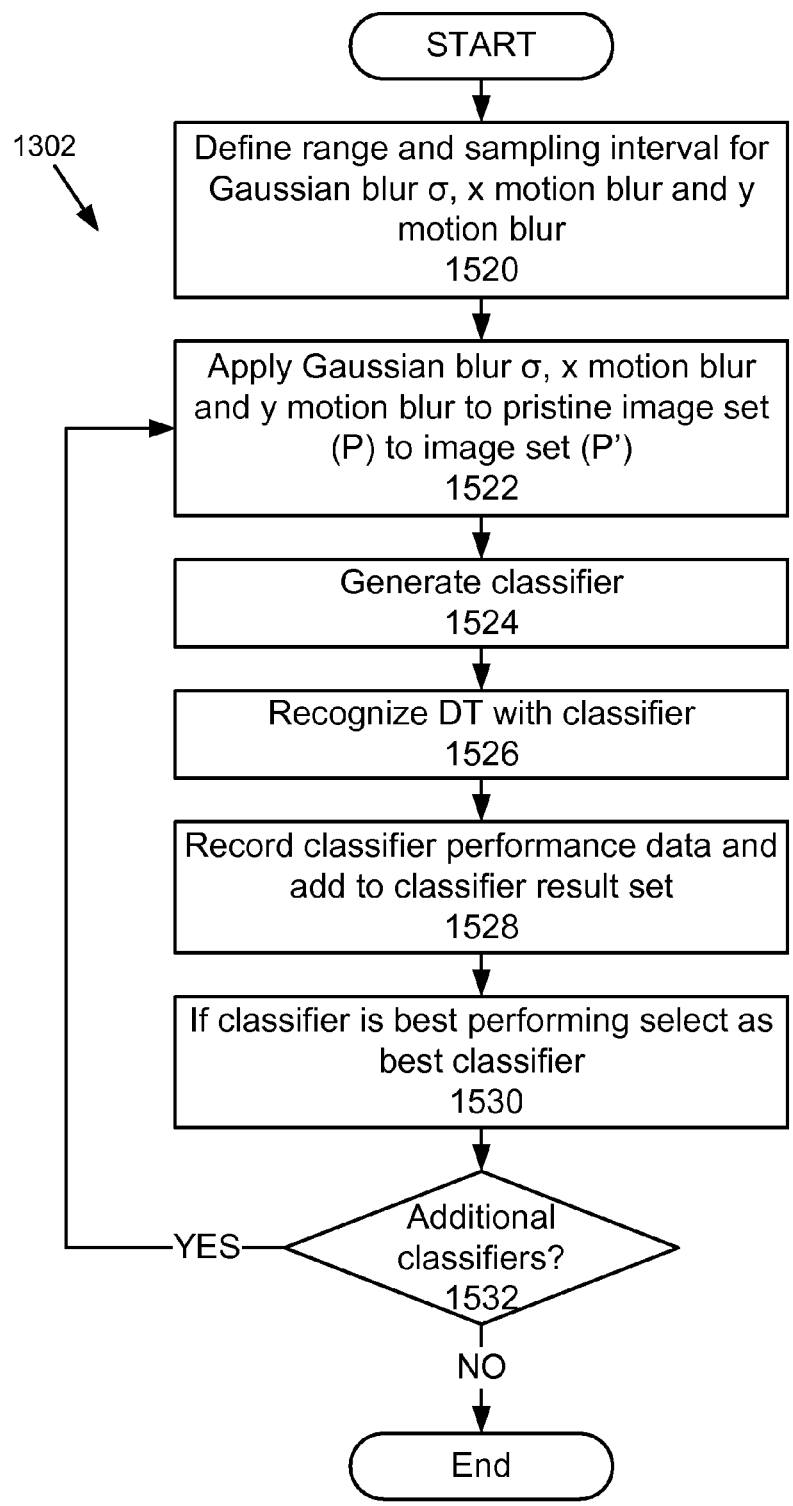

Referring now to FIG. 15B, another embodiment of the method for initialization and generation of classifiers is shown. The method FIG. 15B provides an example of classifier generation where the noise is Gaussian blur $\sigma$, x motion blur and y motion blur. The method begins by defining 1520 the range and sampling interval for the Gaussian blur $\sigma$, x motion blur and y motion blur. For example, the Gaussian blur $\sigma$ equals $s_0$ to $s_g$ by interval $s_i$; the motion blur in the x direction, $d_x$, equals $d_{x0}$ to $d_{xx}$ by interval $d_{xi}$; and the motion blur in the y direction, $d_y$, equals $d_{y0}$ to $d_{yy}$ by interval $d_{yi}$. Next the method applies 1522 the Gaussian blur $\sigma$, x motion blur and y motion blur to a pristine image set (P) to produce image set P'. For example, for each pristine object image p in the pristine image set P, this step applies Gaussian blur $\sigma$, $s_0$ to $s_g$ for each interval $s_i$, x motion blur $d_{x0}$ to $d_{xx}$ for each interval $d_{xi}$ and y motion blur $d_{y0}$ to $d_{yy}$ by interval $d_{yi}$, and adds the resulting images to image set P'. Next, the method generates 1524 a classifier from P'. For example, the method generates a classifier C for sigma, $d_x$, $d_y$ for a point in a multidimensional space. The method then applies the classifier C sigma, $d_x$, $d_y$ to recognize 1526 the images in training set DT. The method records 1528 the classifier performance including the number of images recognized, the identity of the images and an average confidence score, for example the average number of inliers for invisible junctions. Then the classifier C is added to a classifier results set (CR). Next, the method determines 1530 whether the classifier is the best performing and if so identifies 1530 the classifier as such (best classifier=(sigma, $d_x$, $d_y$)). For example, the classifier is the best performing if it has the highest number of images recognized and the highest average confidence score among all the classifiers tested up to this point. The method next determines 1532 whether there are any additional classifiers. In other words, the method determines whether there are any points in the multi-dimensional space of possible values for Gaussian blur, x motion blur and y motion blur for which a classifier has not been generated. If so, the method returns to step 1522 and generates a classifier for one of those points and repeats steps 1524 to step 1532. On the other hand, if there are no additional classifiers to be generated the method is complete and ends.

FIG. 12 is a flow diagram showing a conceptual model for classifier selection and comparison according to one embodiment of the present invention. Using result data stored in classifier performance database 415, a classifier selection process 1202 is performed. The classifier selection process 1202 determines a set of classifiers for a set of image queries, and the performance data for the set of classifiers, by applying all available classifiers to the set of image queries. The selected classifier set 1204 is stored in the classifier performance database 415, as is the associated performance data at 1206. According to one embodiment, the performance data stored in classifier performance database 415 for each classifier includes an interval specification for a specific time range, a pointer to the image queries associated with the interval, a classifier identification, and the listed decisions for the image query, such as identity, confidence value, and run time. The performance data for the selected set 1204 includes the percentage of correctly identified image queries, percent rejected, and percent error produced by the classifiers, as well as over all run time and time spent in each classifier. Note that the percentages should add up to 100%. An "error" means a false positive in which an image query is incorrectly recognized. In addition, the percentage of images recognized by each classifier is produced.

Using a fixed classifier set 1210, result data stored in classifier performance database 415 also is used for a fixed classifier analysis 1208. The fixed classifier analysis 1208 applies a fixed set of classifiers to a set of image queries received during an interval, and outputs performance data 1212 associated with the fixed set of classifiers. Similar set performance data is produced for the fixed classifier analysis 1208, including percent correct, percent rejected, percent error, and run times. In addition, a classifier set performance analysis 1214 can be performed that compares the selected classifier set 1204 and its performance data 1206 from the classifier selection process 1202 with the fixed classifier set 1210 and its performance data 1212 from the fixed classifier analysis 1208. The classifier set performance analysis 1214 computes a distance measure between the respective performances of two classifier sets on the same set of image queries. This distance measure takes into account the algorithmic performance and the run times. An example classifier selection performance (CSP) distance measure is CSP distance (CS1, CS2)=WR*(Reject % 1−Reject % 2)+WE*(Error % 1−Error % 2)+WT*(Time 1−Time 2), where WR, WE, and WT are weights that express the significance of rejects, errors, and run time differences in comparing the two sets of classifiers. In this example, the weights can be set as desired, e.g., the weights could be set to favor a low error rate.

FIGS. 13A-13B show a flowchart of a method of classifier set prediction according to one embodiment of the present invention. In general, the method computes a sequence of classifier sets that should be applied during a future time interval and the times during that interval when the sets should be changed. The predictions are based on historical time intervals corresponding to the future time intervals, on the assumption that one of the historical time intervals will predict the data that will be received during the future time interval. The method could be performed on a regular interval, e.g., at the end of each day. The method begins by dividing 1302 a future time interval into a number of subintervals determined by a minimum sub interval width, referred to as "minimum subintervals" herein. Next, historic time interval data corresponding to a minimum subinterval is retrieved 1304. One or more historic time intervals may be used. For example, a future time interval may be tomorrow, Sep. 17, 2008, and a minimum subinterval may be one hour. For the subinterval noon to 1 p.m., the historic intervals could be the same day and time last week, the same day and time last year, and the same time yesterday.

The method then determines (or selects) 1306 a best performing classifier set for the minimum subinterval. This determination in 1306 may include many substeps. First, classifier selection (1202) may be used to determine 1308 the best classifiers and performance data from a complete classifier set for image queries received during the historic time interval(s). In this example, a complete classifier set is all available classifiers. Then it is determined 1312 whether there are additional historic intervals for which to perform this determination. If not, the process proceeds to FIG. 13B. If there are additional historic intervals, the classifier selection determination 1308 repeats chronologically on the intervals, and once complete for the last historic interval, the best classifier set across the historic intervals is selected 1314. The process then proceeds to FIG. 13B. Next, the determination is made 1316 whether the best classifier set for the minimum interval is different from a current (or initial) classifier set for the immediately previous minimum subinterval. If the classifier sets are different, the potential performance gain for changing from the current classifier set to the best classifier set for the minimum subinterval is calculated 1318. This process 1318 includes a fixed classifier analysis 1208 and classifier set performance analysis 1214 according to one embodiment. First, performance data is determined 1320 for classifiers in the current classifier set for image queries received during the historic time interval. Next, the difference between the current classifier set performance data and the best classifier set performance data is calculated 1322. Then, a determination in 1324 is made whether the difference exceeds a switching threshold (classifier set switch calculation 1406). If the difference does not exceed the switching threshold, then the current classifier set is maintained 1326. This result also holds from a determination 1316 that the best classifier set for the minimum interval is not different from the current classifier set. If the difference does exceed the switching threshold, the classifier set will change 1328 from the current classifier sent to the best classifier set for the minimum subinterval when the minimum subinterval begins. Switching cost is the time and effect on system performance of switching from one set of classifiers to another. The switching costs can be high in a large image recognition system with hundreds of servers, in which switching could require replication of large numbers of databases across many computers, and can be affected by how recently the last switch was made. Switching costs may be higher following a switch, until the throughput of the system has stabilized to a rate at least as good as before the previous switch. Finally, a determination 1330 is made whether this is the last minimum subinterval in the interval, or is additional subintervals exist. If it is the last minimum subinterval, the process ends. If it is not the last minimum subinterval, the method returns to step 1304 and the process repeats for the next minimum subinterval.

Figure 14:
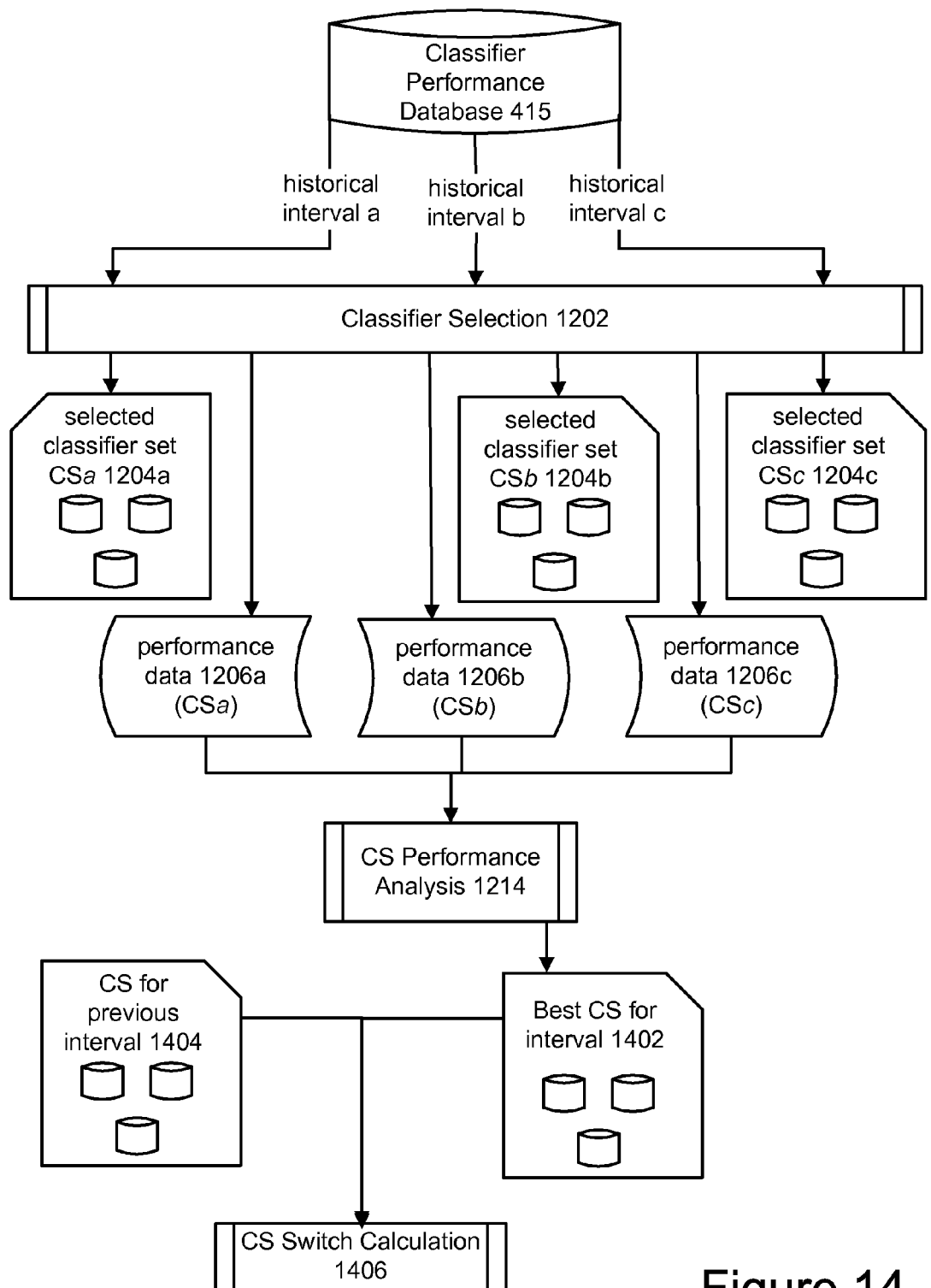
FIG. 14 is a flow diagram showing an embodiment of a conceptual model for the classifier set prediction method of FIGS. 13A-B.

FIG. 14 is a flow diagram showing an embodiment of a conceptual model for the classifier set prediction method of FIGS. 13A-13B and performance monitoring. Using data stored in the classifier performance database 415, data for historic intervals a, b, c are run through the classifier selection process 1202. The results are selected classifier sets 1204 and performance data 1206 corresponding to each of the historical intervals. Next, classifier set performance analysis 1214 is performed pairwise on the classifier sets. The result is the best classifier set for the interval 1402. This result is compared to the classifier set for the previous interval 1404 using the classifier set switch calculation 1406 to determine whether a change in classifier sets should be made.

The forgoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A computer-implemented method of classifier set prediction, comprising:
   dividing, by a computer, a future time interval into a plurality of minimum subintervals; and
   for a selected minimum subinterval:
     retrieving, by the computer, data for one or more historic time intervals corresponding to the selected minimum subinterval; and
     determining, by the computer, a best performing classifier set for the one or more historic time intervals corresponding to the selected minimum subinterval by comparing performing classifier sets for each historic time interval.

2. The method of claim 1, wherein determining the best performing classifier set for the one or more historic time intervals comprises:
   for each of the one or more historic time intervals, applying a complete set of classifiers to a set of image queries received during the historic time interval; and
   determining the best performing classifier set for the historic time interval.

3. The method of claim 2, wherein the complete set of classifiers is all available classifiers.

4. The method of claim 2, wherein a current classifier set corresponds to an immediately previous minimum subinterval, further comprising calculating a potential performance gain for changing from the current classifier set to the best performing classifier set.

5. The method of claim 4, wherein calculating the potential performance gain further comprises:
   determining performance data from an application of the current classifier set to the set of image queries received during the historic time interval;
   determining performance data from application of the best performing classifier set to the set of image queries received during the historic time interval; and
   calculating a difference between the best set performance data and the current classifier set performance data.

6. The method of claim 5, further comprising, in response to the potential performance gain exceeding a switching threshold, changing from the current classifier set to the best performing classifier set for the minimum subinterval.

7. The method of claim 6, further comprising, in response to a determination that additional subintervals exist, performing the method for the additional subintervals.

8. There method of claim 7, wherein the method is performed chronologically on the additional subintervals.

9. The method of claim 1, wherein the method is performed offline.

10. The method of claim 5, further comprising, in response to the potential performance gain being equal to or less than a switching threshold, maintaining the current classifier set.

11. The method of claim 1, further comprising determining whether the selected minimal subinterval is a last minimal subinterval.

12. The method of 11, further comprising, in response to the selected minimal subinterval being the last minimal subinterval, selecting a next minimal subinterval.

* * * * *